(12) United States Patent
Lee et al.

(10) Patent No.: US 12,448,624 B2
(45) Date of Patent: Oct. 21, 2025

(54) MODIFIED NUCLEIC ACID HAVING IMPROVED TREATMENT EFFICACY, AND ANTICANCER PHARMACEUTICAL COMPOSITION CONTAINING SAME

(71) Applicant: INTEROLIGO CORPORATION, Gyeonggi-do (KR)

(72) Inventors: Jung Hwan Lee, Gyeonggi-do (KR); Jong Ook Lee, Gyeonggi-do (KR)

(73) Assignee: INTEROLIGO CORPORATION, Gyeonggi-do (KR)

( * ) Notice: Subject to any disclaimer, the term of this patent is extended or adjusted under 35 U.S.C. 154(b) by 1156 days.

(21) Appl. No.: 17/286,655

(22) PCT Filed: Oct. 21, 2019

(86) PCT No.: PCT/KR2019/013834
§ 371 (c)(1),
(2) Date: Apr. 19, 2021

(87) PCT Pub. No.: WO2020/080912
PCT Pub. Date: Apr. 23, 2020

(65) Prior Publication Data
US 2021/0388361 A1    Dec. 16, 2021

Related U.S. Application Data

(60) Provisional application No. 62/747,807, filed on Oct. 19, 2018.

(30) Foreign Application Priority Data

Oct. 21, 2019  (KR) .................. 10-2019-0130669

(51) Int. Cl.
*C12N 15/115*   (2010.01)
*A61K 47/42*    (2017.01)
*A61P 35/00*    (2006.01)

(52) U.S. Cl.
CPC ............ *C12N 15/115* (2013.01); *A61K 47/42* (2013.01); *A61P 35/00* (2018.01)

(58) Field of Classification Search
CPC .. A61K 31/7088; A61K 31/01; C12N 15/113; C12N 15/115; C12N 2310/16;
(Continued)

(56) References Cited

U.S. PATENT DOCUMENTS

| 9,056,886 B2 | 6/2015 | Lee et al. |
| 9,309,515 B2 | 4/2016 | Lee et al. |
| 2008/0279961 A1 | 11/2008 | Burger |

FOREIGN PATENT DOCUMENTS

| CN | 101282986 A | 10/2008 |
| CN | 101827856 A | 9/2010 |

(Continued)

OTHER PUBLICATIONS

Office action issued on Sep. 16, 2020 from Korean Patent Office in a counterpart Korean Patent Application No. 10-2019-0130669 (English translation is also submitted herewith.).
(Continued)

*Primary Examiner* — Terra C Gibbs
(74) *Attorney, Agent, or Firm* — The PL Law Group, PLLC

(57) ABSTRACT

An oligonucleotide variant according to an embodiment of the present disclosure has a structure of Formula 1 may exhibit excellent in-vivo stability and anticancer effects:

$$(N)_x\text{-}[TGG]_m[TTG][TGG]_n\text{-}(M)_y \quad \text{[Formula 1]}$$

wherein, N and M are independently deoxyuridine (dU), deoxycytidine (dC), uridine (U), or cytidine (C), in which a halogen or hydroxy group is bound to 5- or 2'-position thereof; x and y are independently integers
(Continued)

of 0 to 10 (except when x and y are simultaneously 0), n is an integer of 1 to 10; and m is an integer of 1 to 10.

11 Claims, 29 Drawing Sheets

Specification includes a Sequence Listing.

(58) Field of Classification Search
CPC ........ C12N 2310/322; C12N 2310/335; C12N 15/01; C12N 2310/01
See application file for complete search history.

(56) References Cited

FOREIGN PATENT DOCUMENTS

| | | | |
|---|---|---|---|
| EP | 3 560 517 A2 | 12/2017 | |
| EP | 3 560 518 A2 | 12/2017 | |
| KR | 10-2010-0091978 A | 8/2010 | |
| KR | 10-0998365 B1 | 12/2010 | |
| KR | 10-2017-0055645 A | 5/2017 | |
| KR | 10-2017-0081129 A | 7/2017 | |
| KR | 20170081129 | * 7/2017 | |
| KR | 10-2017-0081129 | * 10/2017 | ............. A61K 47/48 |
| KR | 10-2018-0075133 A | 7/2018 | |
| WO | WO 2011/002200 A2 | 1/2011 | |
| WO | WO 2018/124548 A2 | 7/2018 | |

OTHER PUBLICATIONS

International Search Report for PCT/KR2019/013834 mailed on Feb. 5, 2020.

Zhao Hao et al. "Efficient Delivery of Micro RNA To Bone-Metastatic Prostate Tumors By Using Aptamer-Conjugated Atelocollagen in Vitro and in Vivo", Drug Deliv, vol. 23, No. 3, pp. 864-871, 2016.

Jun Young Park et al. "Gemcitabine-Incorporated G-Quadruplex Aptamer for Targeted Drug Delivery Into Pancreas Cancer", Molecular Therapy Nucleic Acids, vol. 12, pp. 543-553, Sep. 2018.

Chang Geng Peng et al., "G-quadruplex induced stabilization by 2'-deoxy-2'-fluoro-D-arabinonucleic acids (2'F-ANA)", Nucleic Acids Research, vol. 35(15), pp. 4977-4988, 2007.

Office action issued on Apr. 19, 2024 from China Patent Office in a counterpart China Patent Application No. 201980066805.7 (English translation is also submitted herewith.).

European Search Report For EP19874272.8 issued on Apr. 12, 2023 from European patent office in a counterpart European patent application.

* cited by examiner (a)

(b)

MODIFIED NUCLEIC ACID HAVING IMPROVED TREATMENT EFFICACY, AND ANTICANCER PHARMACEUTICAL COMPOSITION CONTAINING SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2019/013834, filed Oct. 21, 2019, which claims priority to the benefit of US Patent Application No. 62/747,807 filed on Oct. 19, 2018 and Korean Patent Application No. 10-2019-0130669 filed in the Korean Intellectual Property Office on Oct. 21, 2019, the entire contents of which are incorporated herein by reference.

TECHNICAL FIELD

The present invention relates to a nucleic acid variant with improved therapeutic efficacy and a pharmaceutical composition for anticancer use, including the same.

BACKGROUND ART

Since 1980s, research has been actively conducted to develop oligonucleotides as therapeutic agents. It is known that guanosine-enriched oligonucleotides have cell growth inhibitory effects on a wide range of cancer cells, and these oligonucleotides may have a structure of 4 strands through intramolecular bonds or intermolecular bonds. Instead of forming a double-helix structure through a hydrogen bond between adenosine and thiamine or guanosine and cytidine, four (4) guanosines are located on one plane to form the hydrogen bond in a form of a hoogsteen, thereby forming a G-quadruplex. Further, it is known that the oligonucleotide to form the G-quadruplex has a stable structure due to its structural characteristics, thereby exhibiting relatively high blood stability and cell permeability. Various research and developments are being conducted to further stabilize the G-quadruplex and increase anticancer effects by introducing modified nucleic acid for therapeutic use into the oligonucleotide having different functions as described above.

SUMMARY

An object of the present invention is to provide nucleic acid variants with therapeutic efficacy, and a pharmaceutical composition for anticancer use, including the same.

Another object of the present invention is to provide a pharmaceutical composition with excellent in-vivo stability and anticancer effects.

To achieve the above objects, the following technical solutions are adopted in the present invention.

1. An oligonucleotide variant having a structure of Formula 1 below:

[Formula 1]
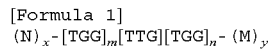

wherein, N and M are independently deoxyuridine (dU), deoxycytidine (dC), uridine (U), or cytidine (C), in which a halogen or hydroxy group is bound to 5- or 2'-position thereof; x and y are independently integers of 0 to 10 (except when x and y are simultaneously 0), n is an integer of 1 to 10; and m is an integer of 1 to 10.

2. The oligonucleotide variant according to the above 1, wherein N and M are independently selected from the group consisting of 5-fluorodeoxyuridine, 5-fluorouridine, 5-fluorodeoxycytidine, 5-fluorocytidine, 5-iododeoxyuridine, 5-iodouridine, 5-iododeoxycytidine, 5-iodocytidine, cytosine arabinoside, 2',2'-difluorodeoxycytidine, capecitabine and bromovinyldeoxyuridine.

3. The oligonucleotide variant according to the above 1, wherein the structure of Formula 1 is any one of the following Formula 2 to Formula 34:

[Formula 2]
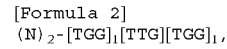

[Formula 3]
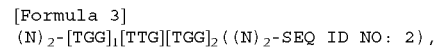

[Formula 4]
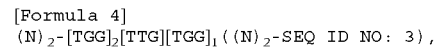

[Formula 5]
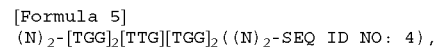

[Formula 6]
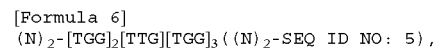

[Formula 7]
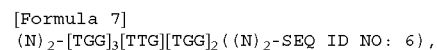

[Formula 8]
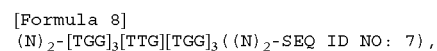

[Formula 9]
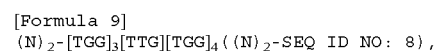

[Formula 10]
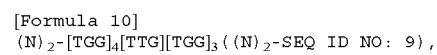

[Formula 11]
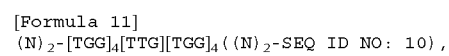

[Formula 12]
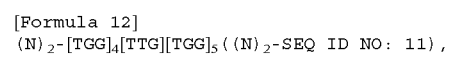

[Formula 13]
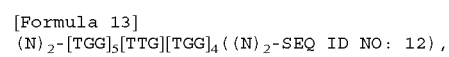

[Formula 14]
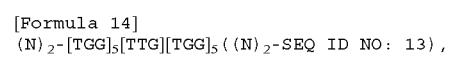

[Formula 15]
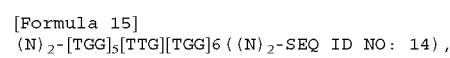

[Formula 16]
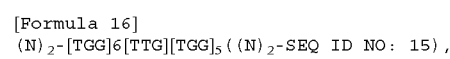

[Formula 17]
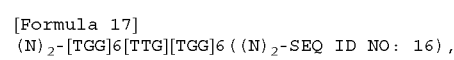

[Formula 18]
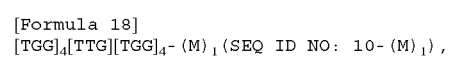

[Formula 19]

[Formula 20]
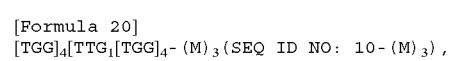

[Formula 21]
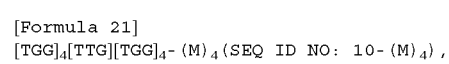

[Formula 22]
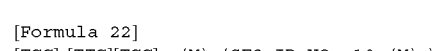

[Formula 23]

[Formula 24]
[TGG]₄[TTG][TGG]₅-(M)₂(SEQ ID NO: 11-(M)₂),

[Formula 25]
[TGG]₄[TTG][TGG]₅-(M)₃(SEQ ID NO: 11-(M)₃),

[Formula 26]
[TGG]₄[TTG][TGG]₅-(M)₄(SEQ ID NO: 11-(M)₄),

[Formula 27]
[TGG]₄[TTG][TGG]₅-(M)₅(SEQ ID NO: 11-(M)₅),

[Formula 28]
[TGG]₄[TTG][TGG]₄-(M)₁₀(SEQ ID NO: 10)-(M)₁₀),

[Formula 29]
(N)₁-[TGG]₄[TTG][TGG]₄-(M)₁((N)₁-SEQ ID NO: 10-(M)₁),

[Formula 30]
(N)₃-[TGG]₄[TTG][TGG]₄-(M)₃((N)₃-SEQ ID NO: 10-(M)₃),

[Formula 31]
(N)₅-[TGG]₄[TTG][TGG]₄-(M)₅((N)₅-SEQ ID NO: 10-(M)₅),

[Formula 32]
(N)₁-[TGG]₄[TTG][TGG]₅-(M)₁((N)₁-SEQ ID NO: 11-(M)₁),

[Formula 33]
(N)₃-[TGG]₄[TTG][TGG]₅-(M)₃((N)₃-SEQ ID NO: 11-(M)₃),

[Formula 34]
(N)₅-[TGG]₄[TTG][TGG]₅-(M)₅((N)₅-SEQ ID NO: 11-(M)₅).

4. The oligonucleotide variant according to the above 1, wherein n is an integer of 1 to 5, and m is an integer of 1 to 5.

5. The oligonucleotide variant according to the above 1, wherein x and y are independently an integer of 0 to 5 (except for the case where x and y are simultaneously 0).

6. A pharmaceutical composition for preventing or treating cancer, including the oligonucleotide variant according to any one the above 1 to 5 or a pharmaceutically acceptable salt thereof.

7. The pharmaceutical composition according to the above 6, wherein the cancer is selected from the group consisting of leukemia, lymphoma, breast cancer, liver cancer, stomach cancer, ovarian carcinoma, cervical carcinoma, glioma cancer, colon cancer, lung cancer, pancreatic cancer, prostate cancer, gastric cancer, uterine cancer, bladder cancer, thyroid cancer, ovarian cancer, melanoma and cervical cancer.

8. The pharmaceutical composition according to the above 6, wherein the composition is an atelocollagen dispersion formulation.

9. The pharmaceutical composition according to the above 8, wherein the atelocollagen dispersion contains 0.5 to 5.5 g of atelocollagen per 100 ml of PBS solution.

10. The pharmaceutical composition according to the above 6, wherein the composition is in a form of a sol-gel or a patch.

11. The pharmaceutical composition according to the above 8, wherein the atelocollagen is prepared by a process including: a) treating a collagen-containing animal tissue with at least one of alkalase, catalase, pepsin and papain to extract a material; b) firstly filtering the extracted material and salting it out by adding a neutral salt to the obtained filtrate, followed by performing second filtration; c) dissolving collagen salts obtained by the second filtration to adsorb fat, followed by performing third filtration; d) lyophilizing the obtained filtrate after the third filtration and recovering lyophilized powder; and e) dissolving and concentrating the lyophilized powder in diluted hydrochloric acid (dil-HCl), diluted acetic acid or phosphate buffer at pH 4 to pH 8 to prepare an atelocollagen solution, injecting the prepared atelocollagen solution in 5 to 20% by volume of a column bed volume into a column filled with polymer beads, and developing the same in diluted hydrochloric acid, diluted acetic acid or phosphate buffer at pH 4 to pH 8 thus to recover atelocollagen.

The oligonucleotide variant of the present invention can effectively target nucleolin present on the surface, cytoplasm or nucleus of a cancer cell.

The oligonucleotide variant of the present invention can inhibit the growth of cancer cells or kill cancer cells.

The oligonucleotide variant of the present invention can bind the modified nucleic acid (N) to oligonucleotide having a specific sequence, thereby reducing a rate of degradation of the modified nucleic acid by the enzyme in the body.

DETAILED DESCRIPTION

Figure 1:
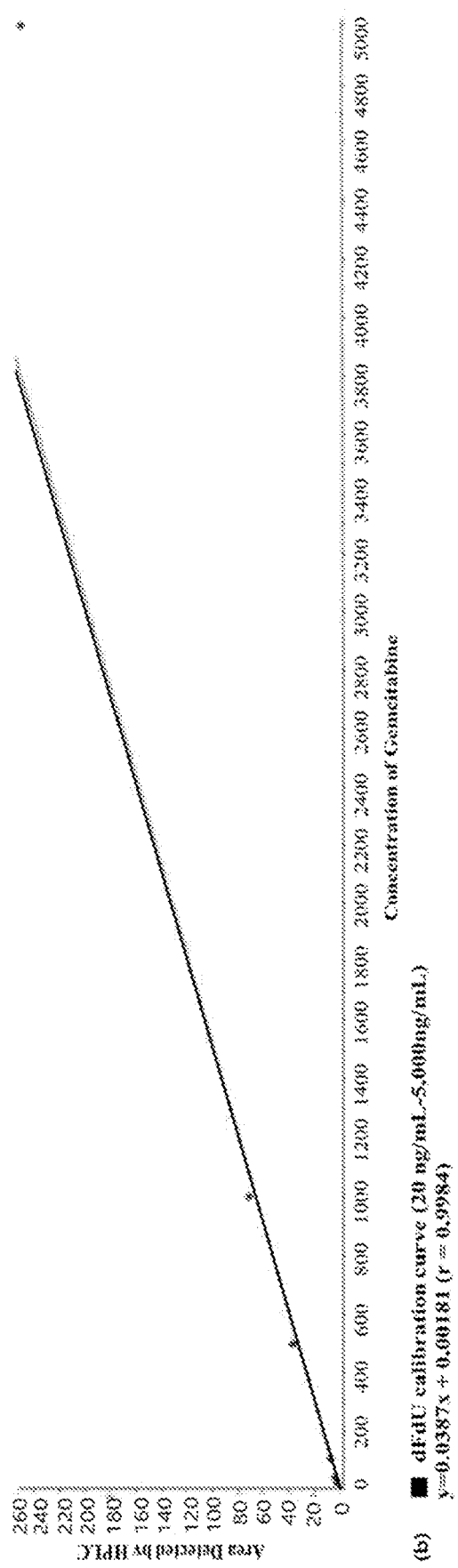
FIG. 1 illustrates calibration curves of dFdC and dFdU to determine a concentration of gemcitabine (dFdC) and a gemcitabine inactive metabolite, that is, 2,2'-difluorodeoxyuridine (dFdU) in plasma.
Figure 1:
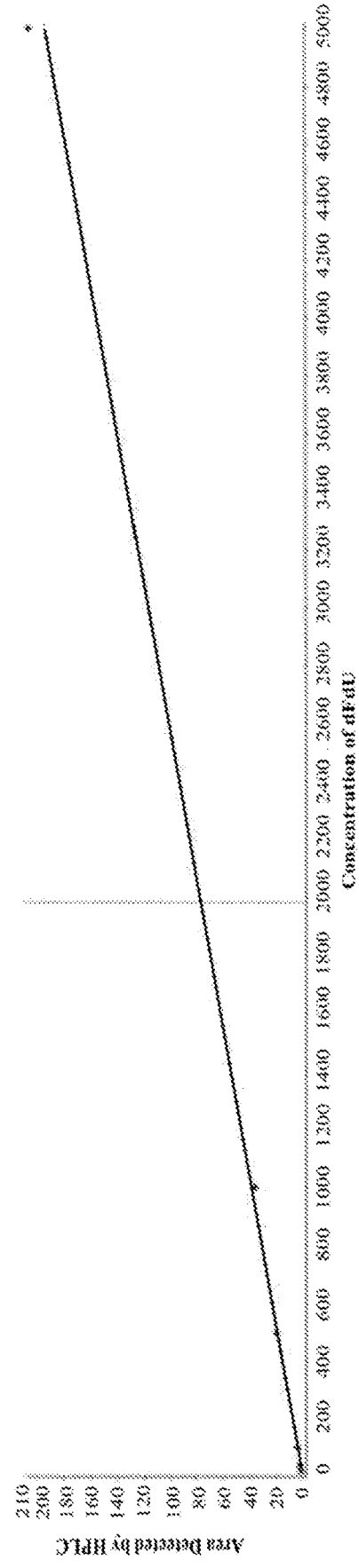

The present invention provides oligonucleotide variants in which oligonucleotides and modified nucleic acids are linked.

The oligonucleotide of the present invention has a sequence of $[TGG]_m[TTG][TGG]_n$.

Herein, n may be an integer of 1 to 10, 1 to 9, 1 to 8, 1 to 7, 1 to 6, 1 to 5, 1 to 4, 1 to 3 or 1 to 2. Further, n may be an integer of 1 to 10, 2 to 9, 3 to 8, 4 to 7 or 5 to 6.

m may be an integer of 1 to 10, 1 to 9, 1 to 8, 1 to 7, 1 to 6, 1 to 5, 1 to 4, 1 to 3 or 1 to 2. Further, m may be an integer of 1 to 10, 2 to 9, 3 to 8, 4 to 7 or 5 to 6.

The oligonucleotide of the present invention may be one of sequences listed in Table 1 below, but it is not limited thereto.

TABLE 1

| Sequence number | Oligonucleotide ($[TGG]_m[TTG][TGG]_n$) (5' → 3') |
|---|---|
| N/A | $[TGG]_1[TTG][TGG]_1$ |
| SEQ ID NO: 2 | $[TGG]_1[TTG][TGG]_2$ |
| SEQ ID NO: 3 | $[TGG]_2[TTG][TGG]_1$ |
| SEQ ID NO: 4 | $[TGG]_2[TTG][TGG]_2$ |
| SEQ ID NO: 5 | $[TGG]_2[TTG][TGG]_3$ |
| SEQ ID NO: 6 | $[TGG]_3[TTG][TGG]_2$ |
| SEQ ID NO: 7 | $[TGG]_3[TTG][TGG]_3$ |
| SEQ ID NO: 8 | $[TGG]_3[TTG][TGG]_4$ |
| SEQ ID NO: 9 | $[TGG]_4[TTG][TGG]_3$ |
| SEQ ID NO: 10 | $[TGG]_4[TTG][TGG]_4$ |
| SEQ ID NO: 11 | $[TGG]_4[TTG][TGG]_5$ |
| SEQ ID NO: 12 | $[TGG]_5[TTG][TGG]_4$ |
| SEQ ID NO: 13 | $[TGG]_5[TTG][TGG]_5$ |
| SEQ ID NO: 14 | $[TGG]_5[TTG][TGG]_6$ |
| SEQ ID NO: 15 | $[TGG]_6[TTG][TGG]_5$ |
| SEQ ID NO: 16 | $[TGG]_6[TTG][TGG]_6$ |
| SEQ ID NO: 17 | $[TGG]_6[TTG][TGG]_7$ |
| SEQ ID NO: 18 | $[TGG]_7[TTG][TGG]_6$ |
| SEQ ID NO: 19 | $[TGG]_7[TTG][TGG]_7$ |
| SEQ ID NO: 20 | $[TGG]_7[TTG][TGG]_8$ |
| SEQ ID NO: 21 | $[TGG]_8[TTG][TGG]_7$ |
| SEQ ID NO: 22 | $[TGG]_8[TTG][TGG]_8$ |
| SEQ ID NO: 23 | $[TGG]_8[TTG][TGG]_9$ |
| SEQ ID NO: 24 | $[TGG]_9[TTG][TGG]_8$ |
| SEQ ID NO: 25 | $[TGG]_9[TTG][TGG]_9$ |
| SEQ ID NO: 26 | $[TGG]_9[TTG][TGG]_{10}$ |
| SEQ ID NO: 27 | $[TGG]_{10}[TTG][TGG]_9$ |
| SEQ ID NO: 28 | $[TGG]_{10}[TTG][TGG]_{10}$ |

The oligonucleotide of the present invention is rich in guanosine to form a G-quadruplex structure and is an aptamer specific for nucleolins.

The term "nucleolin" as used herein is a protein expressed at a high level in transformed cells, and most tumor cells are known to express nucleolin in the cytoplasm and nucleus thereof, as well as exposing nucleolin to the cell surface. Nucleolin has a variety of functions in cells and may participate in ribosome production, cell growth and DNA replication.

The oligonucleotide of the present invention may be more selectively bound to cancer cells and inhibit the growth of cancer cells through various mechanisms in the cells.

One or more modified nucleic acids may be bound to the oligonucleotides of the present invention to stabilize the modified nucleic acids or prevent inactivation of the modified nucleic acids in the body.

Furthermore, when one or more modified nucleic acids are bound to the oligonucleotide, not only the cell growth inhibitory effect of the oligonucleotide itself but also the cell growth inhibitory effect of the modified nucleic acid may be exhibited, thereby improving anticancer effects.

The term "modified nucleic acid" as used herein may be a chemically modified nucleoside or nucleotide.

The modified nucleic acid may be deoxyuridine (dU), deoxycytidine (dC), uridine (U) or cytidine (C), in which at least one halogen or hydroxyl group is bound to 5- or 2'-position thereof. For example, the modified nucleic acids may be selected from the group consisting of 5-fluorodeoxyuridine, 5-fluorouridine, 5-fluorodeoxycytidine, 5-fluorocytidine, 5-iododeoxyuridine, 5-iodouridine, 5-iododeoxycytidine, 5-iodocytidine, cytosine arabinoside, 2', 2'-difluorodeoxycytidine, capecitabine and bromovinyl deoxyuridine, or derivatives thereof.

The modified nucleic acid may be linked in at least one of 5' and 3' directions of the oligonucleotide, and preferably, in the 5' direction of the oligonucleotide.

The modified nucleic acid may be linked in at least one of the 5' and 3' directions of the oligonucleotide by a linker.

The linker may be $[-(CH_2)_a-]$, $[-(CH_2CH_2O)_b-]$, [butylramidomethyl-1-(2-nitrophenyl)-ethyl]-2-cyanoethyl-], [1', 2'-dideoxyribose-] or $(PEG)_y$. Herein, a may be an integer of 1 to 10, 2 to 9, 3 to 8, 4 to 7 or 5 to 6. B may be an integer of 1 to 10, 2 to 9, 3 to 8, 4 to 7 or 5 to 6. y may be an integer of 1 to 20, 2 to 19, 3 to 18, 4 to 17, 5 to 16, 6 to 15, 7 to 14, 8 to 13, 9 to 12 or 10 to 11.

When the modified nucleic acid is linked in the 3' direction of the oligonucleotide, idT, LNA, PEG or 2'OMeNu may be further linked in the 3' direction of the modified nucleic acid.

By further linking idT, LNA, PEG or 2'OMeNu in the 3' direction of the modified nucleic acid, the 3' end of the oligonucleotide variant may be protected from attack of nucleases, thereby reducing a rate of in vivo degradation of the oligonucleotide variant. Accordingly, the modified nucleic acid may be bound to the oligonucleotide for a longer period of time, thereby increasing anticancer efficacy of the modified nucleic acid.

Specifically, the oligonucleotide variant of the present invention may be a compound having the structure of Formula 1:

[Formula 1]

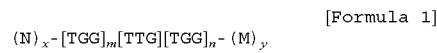

In Formula 1, N and M are modified nucleic acids, and N and M may be the same or different types of modified nucleic acids. The details of the modified nucleic acid are the same as described above.

In Formula 1, x and y may be independently an integer of 0 to 10, except when x and y are simultaneously 0.

For example, in Formula 1, x may be an integer of 0 to 10, 1 to 9, 2 to 8, 3 to 7 or 4 to 6, and y may be an integer of 0 to 10, 1 to 9, 2 to 8, 3 to 7 or 4 to 6. However, the case where x and y are simultaneously 0 is excluded.

In Formula 1, n may be an integer of 1 to 10, and m may be an integer of 1 to 10.

In Formula 1, n may be an integer of 1 to 10, 1 to 9, 1 to 8, 1 to 7, 1 to 6, 1 to 5, 1 to 4, 1 to 3 or 1 to 2. Further, in Formula 1, n may be an integer of 1 to 10, 2 to 9, 3 to 8, 4 to 7 or 5 to 6.

In Formula 1, m may be an integer of 1 to 10, 1 to 9, 1 to 8, 1 to 7, 1 to 6, 1 to 5, 1 to 4, 1 to 3 or 1 to 2. For another example, m in Formula 1 may be an integer of 1 to 10, 2 to 9, 3 to 8, 4 to 7, or 5 to 6.

For example, the oligonucleotide variant having the structure of Formula 1 may be compounds having structures of Formulae listed in Table 2 below.

TABLE 2

| Type of modified nucleic acid (N) | Oligonucleotide variants $((N)_x\text{-}[TGG]_m[TTG][TGG]_n)$ |
|---|---|
| 2',2'-difluorodeoxytidine | $(N)_1\text{-}[TGG]_4[TTG][TGG]_4((N)_1\text{-SEQ ID NO: 10})$ |
| | $(N)_2\text{-}[TGG]_4[TTG][TGG]_4((N)_2\text{-SEQ ID NO: 10})$ |
| | $(N)_3\text{-}[TGG]_4[TTG][TGG]_4((N)_3\text{-SEQ ID NO: 10})$ |
| | $(N)_4\text{-}[TGG]_4[TTG][TGG]_4((N)_4\text{-SEQ ID NO: 10})$ |
| | $(N)_5\text{-}[TGG]_4[TTG][TGG]_4((N)_5\text{-SEQ ID NO: 10})$ |
| | $(N)_1\text{-}[TGG]_4[TTG][TGG]_5((N)_1\text{-SEQ ID NO: 11})$ |
| | $(N)_2\text{-}[TGG]_4[TTG][TGG]_5((N)_2\text{-SEQ ID NO: 11})$ |
| | $(N)_3\text{-}[TGG]_4[TTG][TGG]_5((N)_3\text{-SEQ ID NO: 11})$ |
| | $(N)_4\text{-}[TGG]_4[TTG][TGG]_5((N)_4\text{-SEQ ID NO: 11})$ |
| | $(N)_5\text{-}[TGG]_4[TTG][TGG]_5((N)_5\text{-SEQ ID NO: 11})$ |
| 5-fluoro-deoxyuridine | $(N)_1\text{-}[TGG]_4[TTG][TGG]_4((N)_1\text{-SEQ ID NO: 10})$ |
| | $(N)_5\text{-}[TGG]_4[TTG][TGG]_4((N)_5\text{-SEQ ID NO: 10})$ |
| | $(N)_{10}\text{-}[TGG]_4[TTG][TGG]_4((N)_{10}\text{-SEQ ID NO: 10})$ |
| | $(N)_1\text{-}[TGG]_4[TTG][TGG]_5((N)_1\text{-SEQ ID NO: 11})$ |
| | $(N)_5\text{-}[TGG]_4[TTG][TGG]_5((N)_5\text{-SEQ ID NO: 11})$ |

TABLE 2-continued

| Type of nucleic acid (N) | Oligonucleotide variant |
|---|---|
| | (N)$_{10}$-[TGG]$_4$[TTG][TGG]$_5$((N)$_{10}$-SEQ ID NO: 11) |
| Cytosine arabinoside | (N)$_1$-[TGG]$_4$[TTG][TGG]$_4$((N)$_1$-SEQ ID NO: 10) |
| | (N)$_2$-[TGG]$_4$[TTG][TGG]$_4$((N)$_2$-SEQ ID NO: 10) |
| | (N)$_3$-[TGG]$_4$[TTG][TGG]$_4$((N)$_3$-SEQ ID NO: 10) |
| | (N)$_1$-[TGG]$_4$[TTG][TGG]$_5$((N)$_1$-SEQ ID NO: 11) |
| | (N)$_2$-[TGG]$_4$[TTG][TGG]$_5$((N)$_2$-SEQ ID NO: 11) |
| | (N)$_3$-[TGG]$_4$[TTG][TGG]$_5$((N)$_3$-SEQ ID NO: 11) |

| Type of nucleic acid (N) | Oligonucleotide variant ([TGG]$_m$[TTG][TGG]$_n$-(N)$_x$) |
|---|---|
| 2',2'-difluorodeoxytidine | [TGG]$_4$[TTG][TGG]$_4$-(N)$_1$((N)$_1$-SEQ ID NO: 10) |
| | [TGG]$_4$[TTG][TGG]$_4$-(N)$_2$((N)$_2$-SEQ ID NO: 10) |
| | [TGG]$_4$[TTG][TGG]$_4$-(N)$_3$((N)$_3$-SEQ ID NO: 10) |
| | [TGG]$_4$[TTG][TGG]$_4$-(N)$_4$((N)$_4$-SEQ ID NO: 10) |
| | [TGG]$_4$[TTG][TGG]$_4$-(N)$_5$((N)$_5$-SEQ ID NO: 10) |
| | [TGG]$_4$[TTG][TGG]$_5$-(N)$_1$((N)$_1$-SEQ ID NO: 11) |
| | [TGG]$_4$[TTG][TGG]$_5$-(N)$_2$((N)$_2$-SEQ ID NO: 11) |
| | [TGG]$_4$[TTG][TGG]$_5$-(N)$_3$((N)$_3$-SEQ ID NO: 11) |
| | [TGG]$_4$[TTG][TGG]$_5$-(N)$_4$((N)$_4$-SEQ ID NO: 11) |
| | [TGG]$_4$[TTG][TGG]$_5$-(N)$_5$((N)$_5$-SEQ ID NO: 11) |
| 5-fluoro-deoxyuridine | [TGG]$_4$[TTG][TGG]$_4$-(N)$_1$((N)$_1$-SEQ ID NO: 10) |
| | [TGG]$_4$[TTG][TGG]$_4$-(N)$_5$((N)$_5$-SEQ ID NO: 10) |
| | [TGG]$_4$[TTG][TGG]$_4$-(N)$_{10}$((N)$_{10}$-SEQ ID NO: 10) |
| | [TGG]$_4$[TTG][TGG]$_5$-(N)$_1$((N)$_1$-SEQ ID NO: 11) |
| | [TGG]$_4$[TTG][TGG]$_5$-(N)$_5$((N)$_5$-SEQ ID NO: 11) |
| | [TGG]$_4$[TTG][TGG]$_5$-(N)$_{10}$((N)$_{10}$-SEQ ID NO: 11) |
| Cytosine arabinoside | [TGG]$_4$[TTG][TGG]$_4$-(N)$_1$((N)$_1$-SEQ ID NO: 10) |
| | [TGG]$_4$[TTG][TGG]$_4$-(N)$_2$((N)$_2$-SEQ ID NO: 10) |
| | [TGG]$_4$[TTG][TGG]$_4$-(N)$_3$((N)$_3$-SEQ ID NO: 10) |
| | [TGG]$_4$[TTG][TGG]$_5$-(N)$_1$((N)$_1$-SEQ ID NO: 11) |
| | [TGG]$_4$[TTG][TGG]$_5$-(N)$_2$((N)$_2$-SEQ ID NO: 11) |
| | [TGG]$_4$[TTG][TGG]$_5$-(N)$_3$((N)$_3$-SEQ ID NO: 11) |

TABLE 2-continued

| Type of nucleic acid (N) | Oligonucleotide variant $((N)_x\text{-}[TGG]_m[TTG][TGG]_n\text{-}(N)_y)$ |
|---|---|
| 2',2'-difluorodeoxytidine | $(N)_1\text{-}[TGG]_4[TTG][TGG]_4\text{-}(N)_1((N)_1\text{-}$ SEQ ID NO: 10) |
| | $(N)_3\text{-}[TGG]_4[TTG][TGG]_4\text{-}(N)_3((N)_3\text{-}$ SEQ ID NO: 10) |
| | $(N)_5\text{-}[TGG]_4[TTG][TGG]_4\text{-}(N)_5((N)_5\text{-}$ SEQ ID NO: 10) |
| | $(N)_1\text{-}[TGG]_4[TTG][TGG]_5\text{-}(N)_1((N)_1\text{-}$ SEQ ID NO: 11) |
| | $(N)_3\text{-}[TGG]_4[TTG][TGG]_5\text{-}(N)_3((N)_3\text{-}$ SEQ ID NO: 11) |
| | $(N)_5\text{-}[TGG]_4[TTG][TGG]_5\text{-}(N)_5((N)_5\text{-}$ SEQ ID NO: 11) |
| 5-fluoro-deoxyuridine | $(N)_1\text{-}[TGG]_4[TTG][TGG]_4\text{-}(N)_1((N)_1\text{-}$ SEQ ID NO: 10) |
| | $(N)_3\text{-}[TGG]_4[TTG][TGG]_4\text{-}(N)_3((N)_3\text{-}$ SEQ ID NO: 10) |
| | $(N)_5\text{-}[TGG]_4[TTG][TGG]_4\text{-}(N)_5((N)_5\text{-}$ SEQ ID NO: 10) |
| | $(N)_1\text{-}[TGG]_4[TTG][TGG]_5\text{-}(N)_1((N)_1\text{-}$ SEQ ID NO: 11) |
| | $(N)_3\text{-}[TGG]_4[TTG][TGG]_5\text{-}(N)_3((N)_3\text{-}$ SEQ ID NO: 11) |
| | $(N)_5\text{-}[TGG]_4[TTG][TGG]_5\text{-}(N)_5((N)_5\text{-}$ SEQ ID NO: 11) |
| Cytosine arabinoside | $(N)_1\text{-}[TGG]_4[TTG][TGG]_4\text{-}(N)_1((N)_1\text{-}$ SEQ ID NO: 10) |
| | $(N)_3\text{-}[TGG]_4[TTG][TGG]_4\text{-}(N)_3((N)_3\text{-}$ SEQ ID NO: 10) |
| | $(N)_5\text{-}[TGG]_4[TTG][TGG]_4\text{-}(N)_5((N)_5\text{-}$ SEQ ID NO: 10) |
| | $(N)_1\text{-}[TGG]_4[TTG][TGG]_5\text{-}(N)_1((N)_1\text{-}$ SEQ ID NO: 11) |
| | $(N)_3\text{-}[TGG]_4[TTG][TGG]_5\text{-}(N)_3((N)_3\text{-}$ SEQ ID NO: 11) |
| | $(N)_5\text{-}[TGG]_4[TTG][TGG]_5\text{-}(N)_5((N)_5\text{-}$ SEQ ID NO: 11) |

According to one embodiment, the oligonucleotide variant of the present invention may be one in which gemcitabine (which can be expressed as 2',2'-difluorodeoxytidine) is bound in at least one of the 5' and 3' directions of the oligonucleotide including the sequence as set forth in SEQ ID NO: 10. For example, the oligonucleotide variant of the present invention may be one in which 10 or less, 9 or less, 8 or less, 7 or less, 6 or less, 5 or less, 4 or less, 3 or less, or 2 or less gemcitabines are bound in the 5' direction of the oligonucleotide including the sequence as set forth in SEQ ID NO: 10.

According to another embodiment, the oligonucleotide variant of the present invention may be one in which at least one gemcitabine is linked in the 5' or 3' direction of the oligonucleotide including the sequence as set forth in SEQ ID NO: 11. For example, the oligonucleotide variant of the present invention may be one in which 10 or less, 9 or less, 8 or less, 7 or less, 6 or less, 5 or less, 4 or less, 3 or less, or 2 or less gemcitabines are bound in the 5' direction of the oligonucleotide including the sequence as set forth in SEQ ID NO: 11.

One method for linking the oligonucleotide and the modified nucleic acid may include a step of binding the modified nucleic acid described above to at least one of the 5' end and 3' end of the above-described oligonucleotide.

Another method for linking the oligonucleotide and the modified nucleic acid may include: linking a linker to at least one of the 5' end and 3' end of the oligonucleotide described above through chemical synthesis; then, binding the modified nucleic acid to the above linker.

The binding of the modified nucleic acid to prepare an oligonucleotide variant may include use of a solid phase reactor.

Further, the present invention provides a pharmaceutical composition for preventing or treating cancer, which includes the above-described oligonucleotide variant or a pharmaceutically acceptable salt thereof.

Oligonucleotide variants are the same as described above.

The cancer described above may be nucleolin-related cancers such as solid cancer and leukemia. For example, the cancer may be selected from the group consisting of leukemia, lymphoma, myeloproliferative disease, carcinomas of solid tissue, sarcoma, melanoma, adenoma, hypoxic tumors, squamous cell carcinoma of the mouth, squamous cell carcinoma of the throat, squamous cell carcinoma of the larynx, squamous cell carcinoma of the lung, uterine cancer, bladder cancer, hematopoietic cancers, head and neck cancer, nervous system cancer, and papilloma, but it is not limited thereto. In addition, the nucleolin-related cancer may be selected from the group consisting of leukemia, lymphoma, breast cancer, liver cancer, stomach cancer, ovarian carcinoma, cervical carcinoma, glioma cancer, colon cancer, lung cancer, pancreatic cancer, prostate cancer, hepatoma, gastric cancer, uterine cancer, bladder cancer, thyroid cancer, ovarian cancer, melanoma and cervical cancer, but it is not limited thereto.

A content of the oligonucleotide variant or a pharmaceutically acceptable salt thereof included in the pharmaceutical composition for preventing or treating cancer may be an amount capable of exhibiting effects on prevention or treatment of cancer, and can be suitably adjusted according to conditions of subjects and/or severities of diseases.

Atelocollagen dispersion may contain 0.5 to 5.5 g, 1 to 4.5 g or 2 to 3.5 g of atelocollagen per 100 ml of PBS solution. An atelocollagen concentration of the atelocollagen dispersion may be 0.5 to 5.5%, 1 to 4.5%, or 2 to 3.5%.

Depending on the concentration of atelocollagen included in the pharmaceutical composition of the present invention, a difference in duration or therapeutic effects of the drug may occur. Therefore, atelocollagen should be included at an appropriate concentration in the composition.

The atelocollagen included in the pharmaceutical composition of the present invention may be present in a form of surrounding the oligonucleotide variant included in the composition.

The atelocollagen of the present invention may be prepared by a process including the following steps of: a) swelling fresh pig skin in acetic acid, removing a fat layer, crushing a dermal portion and suspending the same in the acetic acid, followed by adding at least one of alkalase, catalase, pepsin and papain to the suspension to extract a material; b) firstly filtering the extracted material and salting it out by adding a neutral salt to the obtained filtrate, followed by performing second filtration; c) dissolving residues obtained by the second filtration to adsorb fat using fumed silica, followed by performing third filtration; and d) lyophilizing the filtrate obtained by the third filtration and to obtain high-purity atelocollagen.

The atelocollagen of the present invention may be prepared by a process including the following steps of: a) treating a collagen-containing animal tissue with at least one of alkalase, catalase, pepsin and papain to extract a material; b) firstly filtering the extracted material; c) adding a neutral salt to the filtrate obtained by the first filtration and salting the same out, followed by performing second filtration; d) dissolving collagen salts obtained by the second filtration to adsorb fat, followed by performing third filtration; e) lyophilizing the filtrate obtained by the third filtration and recovering lyophilized powder; and f) dissolving and concentrating the lyophilized powder in diluted hydrochloric acid (dil-HCl), diluted acetic acid or phosphate buffer at pH 4 to pH 8 to prepare an atelocollagen solution, injecting the prepared atelocollagen solution into a column filled with polymer beads, and developing the same in diluted hydrochloric acid, diluted acetic acid or phosphate buffer at pH 4 to pH 8, thus to recover atelocollagen by molecular weight.

The neutral salt used in the method for preparing atelocollagen may be a sodium chloride solution.

In the method for preparing atelocollagen, the lyophilized powder may be dissolved in dilute acetic acid at a concentration of 10 mM or phosphate buffer solution at a concentration of 10 mM.

In the method for preparing atelocollagen, the lyophilized powder may be concentrated with MWCO 100K Daltons.

In the method for preparing atelocollagen, the polymer beads into which the atelocollagen solution is injected may be Sephadex G-200 Sephacryl.

In the method for preparing atelocollagen, a volume of the atelocollagen solution injected into the column filled with polymer beads may be 5 to 20% of a column bed volume.

In the method for preparing atelocollagen, the atelocollagen solution may be injected into the column filled with polymer beads, and then developed with dilute acetic acid at a concentration of 10 mM or phosphate buffer at a concentration of 10 mM to recover atelocollagen.

The pharmaceutical composition of the present invention may be used in various formulations.

For example, the formulations may include powder, granule, tablet, emulsion, syrup, aerosol, soft or hard gelatin capsule, sterile injectable solution, sterile powder, sol-gel form, scaffold form or patch form (disk form), but it is not limited thereto. The pharmaceutical composition of the present invention may be an atelocollagen dispersion formulation.

The pharmaceutical composition of the present invention may be administered to a subject in need of treatment and/or inhibition of abnormally proliferating cells.

The pharmaceutical composition may be administered as an individual therapeutic agent or in combination with other therapeutic agents. Further, when administering in combination with other therapeutic agents, they may be administered sequentially or simultaneously, and may be administered in single or multiple doses. When administering the pharmaceutical composition of the present invention, it is important to administer an amount capable of ensuring maximum effects in a minimal amount without side effects, which can be easily determined by those skilled in the art.

Administration may be oral or parenteral administration, for example, may include intravenous injection, subcutaneous injection or intramuscular injection, but it is not limited thereto.

The subject to be administered may be mammals such as primates, mouse, rat, hamster, rabbit, horse, cow, dog or cat, but it is not limited thereto.

Further, the present invention provides a method for production of a pharmaceutical composition for preventing or treating cancer as described above.

The method for production of a pharmaceutical composition according to the present invention may include preparing a dispersion in which the above-described oligonucleotide variants are dispersed.

The dispersion in which the oligonucleotide variant is dispersed may be prepared by mixing the oligonucleotide variant with PBS.

The method for production of a pharmaceutical composition according to the present invention may further include the step of mixing the dispersion in which the above-described oligonucleotide variant is dispersed with the atelocollagen dispersion.

The dispersion in which the oligonucleotide variant is dispersed may be prepared by mixing the oligonucleotide variant with PBS.

The atelocollagen dispersion may be prepared by adding atelocollagen to a NaOAc/HAc (acetic acid) buffer solution.

The atelocollagen dispersion may be prepared by adding 0.5 to 5.5 g, 1 to 4.5 g, or 2 to 3.5 g of atelocollagen per 100 ml of a buffer solution.

The buffer solution may be in a condition of 0.3M NaOAc and 45% HAC.

The atelocollagen added to the buffer solution may be lyophilized atelocollagen.

The step of mixing the dispersion in which the oligonucleotide variant is dispersed with the atelocollagen dispersion may include mixing 0.1 to 3 mg of the dispersion in which the oligonucleotide variant is dispersed per 400 µL of the atelocollagen dispersion.

For example, the dispersion in which the oligonucleotide variant is dispersed may be mixed in an amount of 0.1 to 3 mg, 0.5 to 2.5 mg or 1 to 2 mg per 400 µL of the atelocollagen dispersion.

Hereinafter, examples will be described in detail to specifically describe the present invention. However, the following examples are for illustrating the present invention only, and the contents of the present invention are not limited by the examples.

Example 1, Preparation of Oligonucleotide Variant

Example 1-1. Synthesis of Gemcitabine-Containing Oligonucleotide 28 types of oligonucleotides were designed and prepared. Further, gemcitabine was bound with each of the prepared oligonucleotides to produce oligonucleotide variants. The designed 28 types of oligonucleotide sequences and 28 types of oligonucleotide variants in which modified nucleic acids are bound to oligonucleotides, are listed in Table 3 below. In the following description, gemcitabine may also be referred to as Gem.

TABLE 3

| | Oligonucleotide (5'→3') | Oligonucleotide variant (5'→3') |
|---|---|---|
| 1 | $[TGG]_1[TTG][TGG]_1$ | $(Gem)_2\text{-}[TGG]_1[TTG][TGG]_1$ (compound 1) |
| 2 | $[TGG]_1[TTG][TGG]_2$ (SEQ ID NO: 2) | $(Gem)_2\text{-}[TGG]_1[TTG][TGG]_2$ (compound 2) ((Gem)$_2$-SEQ ID NO: 2) |
| 3 | $[TGG]_2[TTG][TGG]_1$ (SEQ ID NO: 3) | $(Gem)_2\text{-}[TGG]_2[TTG][TGG]_1$ (compound 3) ((Gem)$_2$-SEQ ID NO: 3) |
| 4 | $[TGG]_2[TTG][TGG]_2$ (SEQ ID NO: 4) | $(Gem)_2\text{-}[TGG]_2[TTG][TGG]_2$ (compound 4) ((Gem)$_2$-SEQ ID NO: 4) |
| 5 | $[TGG]_2[TTG][TGG]_3$ (SEQ ID NO: 5) | $(Gem)_2\text{-}[TGG]_2[TTG][TGG]_3$ (compound 5) ((Gem)$_2$-SEQ ID NO: 5) |
| 6 | $[TGG]_3[TTG][TGG]_2$ (SEQ ID NO: 6) | $(Gem)_2\text{-}[TGG]_3[TTG][TGG]_2$ (compound 6) ((Gem)$_2$-SEQ ID NO: 6) |
| 7 | $[TGG]_3[TTG][TGG]_3$ (SEQ ID NO: 7) | $(Gem)_2\text{-}[TGG]_3[TTG][TGG]_3$ (compound 7) ((Gem)$_2$-SEQ ID NO: 7) |
| 8 | $[TGG]_3[TTG][TGG]_4$ (SEQ ID NO: 8) | $(Gem)_2\text{-}[TGG]_3[TTG][TGG]_4$ (compound 8) ((Gem)$_2$-SEQ ID NO: 8) |
| 9 | $[TGG]_4[TTG][TGG]_3$ (SEQ ID NO: 9) | $(Gem)_2\text{-}[TGG]_4[TTG][TGG]_3$ (compound 9) ((Gem)$_2$-SEQ ID NO: 9) |
| 10 | $[TGG]_4[TTG][TGG]_4$ (SEQ ID NO: 10) | $(Gem)_2\text{-}[TGG]_4[TTG][TGG]_4$ (compound 10) ((Gem)$_2$-SEQ ID NO: 10) |
| 11 | $[TGG]_4[TTG][TGG]_5$ (SEQ ID NO: 11) | $(Gem)_2\text{-}[TGG]_4[TTG][TGG]_5$ (compound 11) ((Gem)$_2$-SEQ ID NO: 11) |
| 12 | $[TGG]_5[TTG][TGG]_4$ (SEQ ID NO: 12) | $(Gem)_2\text{-}[TGG]_5[TTG][TGG]_4$ (compound 12) ((Gem)$_2$-SEQ ID NO: 12) |
| 13 | $[TGG]_5[TTG][TGG]_5$ (SEQ ID NO: 13) | $(Gem)_2\text{-}[TGG]_5[TTG][TGG]_5$ (compound 13) ((Gem)$_2$-SEQ ID NO: 13) |
| 14 | $[TGG]_5[TTG][TGG]_6$ (SEQ ID NO: 14) | $(Gem)_2\text{-}[TGG]_5[TTG][TGG]_6$ (compound 14) ((Gem)2-SEQ ID NO: 14) |
| 15 | $[TGG]_6[TTG][TGG]_5$ (SEQ ID NO: 15) | $(Gem)_2\text{-}[TGG]_6[TTG][TGG]_5$ (compound 15) ((Gem)$_2$-SEQ ID NO: 15) |
| 16 | $[TGG]_6[TTG][TGG]_6$ (SEQ ID NO: 16) | $(Gem)_2\text{-}[TGG]_6[TTG][TGG]_6$ (compound 16) ((Gem)$_2$-SEQ ID NO: 16) |
| 17 | $[TGG]_6[TTG][TGG]_7$ (SEQ ID NO: 17) | $(Gem)_2\text{-}[TGG]_6[TTG][TGG]_7$ (compound 17) ((Gem)$_2$-SEQ ID NO: 17) |
| 18 | $[TGG]_7[TTG][TGG]_6$ (SEQ ID NO: 18) | $(Gem)_2\text{-}[TGG]_7[TTG][TGG]_6$ (compound 18) ((Gem)$_2$-SEQ ID NO: 18) |
| 19 | $[TGG]_7[TTG][TGG]_7$ (SEQ ID NO: 19) | $(Gem)_2\text{-}[TGG]_7[TTG][TGG]_7$ (compound 19) ((Gem)$_2$-SEQ ID NO: 19) |
| 20 | $[TGG]_7[TTG][TGG]_8$ (SEQ ID NO: 20) | $(Gem)_2\text{-}[TGG]_7[TTG][TGG]_8$ (compound 20) ((Gem)$_2$-SEQ ID NO: 20) |
| 21 | $[TGG]_8[TTG][TGG]_7$ (SEQ ID NO: 21) | $(Gem)_2\text{-}[TGG]_8[TTG][TGG]_7$ (compound 21) ((Gem)$_2$-SEQ ID NO: 21) |
| 22 | $[TGG]_8[TTG][TGG]_8$ (SEQ ID NO: 22) | $(Gem)_2\text{-}[TGG]_8[TTG][TGG]_8$ (compound 22) ((Gem)$_2$-SEQ ID NO: 22) |

TABLE 3-continued

| Oligonucleotide (5'→3') | Oligonucleotide variant (5'→3') |
|---|---|
| 23 [TGG]$_8$[TTG][TGG]$_9$ (SEQ ID NO: 23) | (Gem)$_2$-[TGG]$_8$[TTG][TGG]$_9$ (compound 23)((Gem)$_2$-SEQ ID NO: 23 |
| 24 [TGG]$_9$[TTG][TGG]$_8$ (SEQ ID NO: 24) | (Gem)$_2$-[TGG]$_9$[TTG][TGG]$_8$ (compound 24)((Gem)$_2$-SEQ ID NO: 24) |
| 25 [TGG]$_9$[TTG][TGG]$_9$ (SEQ ID NO: 25) | (Gem)$_2$-[TGG]$_9$[TTG][TGG]$_9$ (compound 25)((Gem)$_2$-SEQ ID NO: 25) |
| 26 [TGG]$_9$[TTG][TGG]$_{10}$ (SEQ ID NO: 26) | (Gem)$_2$-[TGG]$_9$[TTG][TGG]$_{10}$ (compound 26)((Gem)$_2$-SEQ ID NO: 26) |
| 27 [TGG]$_{10}$[TTG][TGG]$_9$ (SEQ ID NO: 27) | (Gem)$_2$-[TGG]$_{10}$[TTG][TGG]$_9$ (compound 27)((Gem)$_2$-SEQ ID NO: 27) |
| 28 [TGG]$_{10}$[TTG][TGG]$_{10}$ (SEQ ID NO: 28) | (Gem)$_2$-[TGG]$_{10}$[TTG][TGG]$_{10}$ (compound 28)((Gem)$_2$-SEQ ID NO: 28) |

"Gemcitabine-containing oligonucleotide" (oligonucleotide variant) was synthesized by solid-phase phosphoramidite chemistry using a Mermade 12 DNA synthesizer (BioAutomation Manufacturing, Irging, TX).

Desalting was performed using Biotage MPLC, C18 Cartridge. After dissolving the compound in D.W., the solution was subjected to separation and purification at a flow rate of 0.3 mL/min using Waters Acquity UPLC H-Class under conditions of Xbridge Oligonucleotide BEH C18130A, 1.7 μm, 2.1×50 mm column, at a column oven temperature 50° C., mobile phase A solvent (0.1M TEAA), B solvent (100 ACN). The molecular weight was identified by Waters G2-XS Q-TOF Mass Spectrometer. Synthesis of all oligonucleotides was performed according to internal protocols.

1-2. Synthesis of Different Types of Oligonucleotide Variants

According to the same procedure described in the above 1-1, (N)$_x$-[TGG]$_4$[TTG][TGG]$_{4 \text{ or } 5}$ ((N)$_x$-(SEQ ID NO: 10 or 11), ([TGG]$_4$[TTG][TGG]$_{4 \text{ or } 5}$-(N)$_x$) (SEQ ID NO: 10 or 11) —(N)$_x$) and ((N)$_x$-[TGG]$_4$[TTG][TGG]$_{4 \text{ or } 5}$-(N)$_y$ ((N)$_x$-(SEQ ID NO: 10 or 11)-(N)$_x$ were synthesized (see Table 4 below).

TABLE 4

| Type of modified nucleic acid (N) | Oligonucleotide variant | Obs. MW (g/mol) | Exact MW (g/mol) |
|---|---|---|---|
| 2',2'-difluorodeoxytidine | (N)$_1$-[TGG]$_4$[TTG][TGG]$_4$((N)$_1$-SEQ ID NO: 10) | 8906.63 | 8897.4251 |
| | (N)$_2$-[TGG]$_4$[TTG][TGG]$_4$((N)$_2$-SEQ ID NO: 10) | 9221.80 | 9222.4526 |
| | (N)$_3$-[TGG]$_4$[TTG][TGG]$_4$((N)$_3$-SEQ ID NO: 10) | 9556.97 | 9547.4801 |
| | (N)$_4$-[TGG]$_4$[TTG][TGG]$_4$((N)$_4$-SEQ ID NO: 10) | 9871.13 | 9872.5077 |
| | (N)$_5$-[TGG]$_4$[TTG][TGG]$_4$((N)$_5$-SEQ ID NO: 10) | 10206.30 | 10197.5352 |
| | (N)$_1$-[TGG]$_4$[TTG][TGG]$_5$((N)$_1$-SEQ ID NO: 11) | 9858.24 | 9859.5762 |
| | (N)$_2$-[TGG]$_4$[TTG][TGG]$_5$((N)$_2$-SEQ ID NO: 11) | 10183.41 | 10184.6037 |
| | (N)$_3$-[TGG]$_4$[TTG][TGG]$_5$((N)$_3$-SEQ ID NO: 11) | 10509.57 | 10509.6312 |
| | (N)$_4$-[TGG]$_4$[TTG][TGG]$_5$((N)$_4$-SEQ ID NO: 11) | 10833.74 | 10834.6587 |
| | (N)$_5$-[TGG]$_4$[TTG][TGG]$_5$((N)$_5$-SEQ ID NO: 11) | 11158.90 | 11159.6863 |
| 5-fluoro-deoxyuridine | (N)$_1$-[TGG]$_4$[TTG][TGG]$_4$((N)$_1$-SEQ ID NO: 10) | 8879.63 | 8880.4185 |
| | (N)$_5$-[TGG]$_4$[TTG][TGG]$_4$((N)$_5$-SEQ ID NO: 10) | 10111.26 | 10112.5024 |
| | (N)$_{10}$-[TGG]$_4$[TTG][TGG]$_4$((N)$_{10}$-SEQ ID NO: 10) | 11651.05 | 11652.6072 |
| | (N)$_1$-[TGG]$_4$[TTG][TGG]$_5$((N)$_1$-SEQ ID NO: 11) | 9841.23 | 9842.5696 |
| | (N)$_5$-[TGG]$_4$[TTG][TGG]$_5$((N)$_5$-SEQ ID NO: 11) | 11073.87 | 11074.6535 |
| | (N)$_{10}$-[TGG]$_4$[TTG][TGG]$_5$((N)10-SEQ ID NO: 11) | 12613.66 | 12614.7583 |

TABLE 4-continued

| | | | |
|---|---|---|---|
| Cytosine arabinoside | $(N)_1$-$[TGG]_4[TTG][TGG]_4$($(N)_1$-SEQ ID NO: 10) | 8877.66 | 8878.4466 |
| | $(N)_2$-$[TGG]_4[TTG][TGG]_4$($(N)_2$-SEQ ID NO: 10) | 9183.85 | 9184.4958 |
| | $(N)_3$-$[TGG]_4[TTG][TGG]_4$($(N)_3$-SEQ ID NO: 10) | 9490.04 | 9490.5449 |
| | $(N)_1$-$[TGG]_4[TTG][TGG]_5$($(N)_1$-SEQ ID NO: 11) | 9839.26 | 9840.5977 |
| | $(N)_2$-$[TGG]_4[TTG][TGG]_5$($(N)_2$-SEQ ID NO: 11) | 10145.45 | 10146.6469 |
| | $(N)_3$-$[TGG]_4[TTG][TGG]_5$($(N)_3$-SEQ ID NO: 11) | 10451.64 | 10452.6960 |

| Type of modified nucleic acid (N) | Oligonucleotide variant ($[TGG]_m[TTG][TGG]_n$-$(N)_x$) | | |
|---|---|---|---|
| 2',2'-difluorodeoxytidine | $[TGG]_4[TTG][TGG]_4$-$(N)_1$($(N)_1$-SEQ ID NO: 10) | 8906.63 | 8897.4251 |
| | $[TGG]_4[TTG][TGG]_4$-$(N)_2$($(N)_2$-SEQ ID NO: 10) | 9221.80 | 9222.4526 |
| | $[TGG]_4[TTG][TGG]_4$-$(N)_3$($(N)_3$-SEQ ID NO: 10) | 9546.97 | 9547.4801 |
| | $[TGG]_4[TTG][TGG]_4$-$(N)_4$($(N)_4$-SEQ ID NO: 10) | 9871.13 | 9872.5077 |
| | $[TGG]_4[TTG][TGG]_4$-$(N)_5$($(N)_5$-SEQ ID NO: 10) | 10196.30 | 10197.5352 |
| | $[TGG]_4[TTG][TGG]_5$-$(N)_1$($(N)_1$-SEQ ID NO: 11) | 9858.24 | 9859.5762 |
| | $[TGG]_4[TTG][TGG]_5$-$(N)_2$($(N)_2$-SEQ ID NO: 11) | 10183.41 | 10184.6037 |
| | $[TGG]_4[TTG][TGG]_5$-$(N)_3$($(N)_3$-SEQ ID NO: 11) | 10508.57 | 10509.6312 |
| | $[TGG]_4[TTG][TGG]_5$-$(N)_4$($(N)_4$-SEQ ID NO: 11) | 10833.74 | 10834.6587 |
| | $[TGG]_4[TTG][TGG]_5$-$(N)_5$($(N)_5$-SEQ ID NO: 11) | 11158.90 | 11159.6863 |
| 5-fluoro-deoxyuridine | $[TGG]_4[TTG][TGG]_4$-$(N)_1$($(N)_1$-SEQ ID NO: 10) | 8880.63 | 8880.4185 |
| | $[TGG]_4[TTG][TGG]_4$-$(N)_5$($(N)_5$-SEQ ID NO: 10) | 10111.26 | 10112.5024 |
| | $[TGG]_4[TTG][TGG]_4$-$(N)_{10}$($(N)_{10}$-SEQ ID NO: 10) | 11651.05 | 11652.6072 |
| | $[TGG]_4[TTG][TGG]_5$-$(N)_1$($(N)_1$-SEQ ID NO: 11) | 9841.23 | 9842.5696 |
| | $[TGG]_4[TTG][TGG]_5$-$(N)_5$($(N)_5$-SEQ ID NO: 11) | 11073.87 | 11074.6535 |
| | $[TGG]_4[TTG][TGG]_5$-$(N)_{10}$($(N)_{10}$-SEQ ID NO: 11) | 12613.66 | 12614.7583 |
| Cytosine arabinoside | $[TGG]_4[TTG][TGG]_4$-$(N)_1$($(N)_1$-SEQ ID NO: 10) | 8877.66 | 8878.4466 |
| | $[TGG]_4[TTG][TGG]_4$-$(N)_2$($(N)_2$-SEQ ID NO: 10) | 9183.85 | 9184.4958 |
| | $[TGG]_4[TTG][TGG]_4$-$(N)_3$($(N)_3$-SEQ ID NO: 10) | 9490.04 | 9490.5449 |
| | $[TGG]_4[TTG][TGG]_5$-$(N)_1$($(N)_1$-SEQ ID NO: 11) | 9839.26 | 9840.5977 |
| | $[TGG]_4[TTG][TGG]_5$-$(N)_2$($(N)_2$-SEQ ID NO: 11) | 10145.45 | 10146.6469 |
| | $[TGG]_4[TTG][TGG]_5$-$(N)_3$($(N)_3$-SEQ ID NO: 11) | 10451.64 | 10452.6960 |

| Type of modified nucleic acid (N) | Oligonucleotide variant ($(N)_x$-$[TGG]_m[TTG][TGG]_n$-$(N)_x$) | | |
|---|---|---|---|
| 2',2'-difluorodeoxytidine | $(N)_1$-$[TGG]_4[TTG][TGG]_4$-$(N)_1$($(N)_1$-SEQ ID NO: 10) | 9221.80 | 9222.4526 |
| | $(N)_3$-$[TGG]_4[TTG][TGG]_4$-$(N)_3$($(N)_3$-SEQ ID NO: 10) | 10521.46 | 10522.5627 |
| | $(N)_5$-$[TGG]HD 4[TTG][TGG]_4$-$(N)_5$($(N)_5$-SEQ ID NO: 10) | 11821.13 | 11822.6728 |
| | $(N)_1$-$[TGG]_4[TTG][TGG]_5$-$(N)_1$($(N)_1$-SEQ ID NO: 11) | 10183.41 | 10184.6037 |
| | $(N)_3$-$[TGG]_4[TTG][TGG]_5$-$(N)_3$($(N)_3$-SEQ ID NO: 11) | 11483.07 | 11484.7138 |
| | $(N)_5$-$[TGG]_4[TTG][TGG]_5$-$(N)_5$($(N)_5$-SEQ ID NO: 11) | 12783.73 | 12784.8239 |

TABLE 4-continued

| | | | |
|---|---|---|---|
| 5-fluoro-deoxyuridine | (N)$_1$-[TGG]$_4$[TTG][TGG]$_4$-(N)$_1$((N)$_1$-SEQ ID NO: 10) | 9187.79 | 9188.4395 |
| | (N)$_3$-[TGG]$_4$[TTG][TGG]$_4$-(N)$_3$((N)$_3$-SEQ ID NO: 10) | 10419.42 | 10420.5233 |
| | (N)$_5$-[TGG]$_4$[TTG][TGG]$_4$-(N)$_5$((N)$_5$-SEQ ID NO: 10) | 11651.05 | 11652.6072 |
| | (N)$_1$-[TGG]$_4$[TTG][TGG]$_5$-(N)$_1$((N)$_1$-SEQ ID NO: 11) | 10149.39 | 10150.5906 |
| | (N)$_3$-[TGG]$_4$[TTG][TGG]$_5$-(N)$_3$((N)$_3$-SEQ ID NO: 11) | 11381.03 | 11382.6744 |
| | (N)$_5$-[TGG]$_4$[TTG][TGG]$_5$-(N)$_5$((N)$_5$-SEQ ID NO: 11) | 12613.66 | 12614.7583 |
| Cytosine arabinoside | (N)$_1$-[TGG]$_4$[TTG][TGG]$_4$-(N)$_1$((N)$_1$-SEQ ID NO: 10) | 9183.85 | 9184.4958 |
| | (N)$_3$-[TGG]$_4$[TTG][TGG]$_4$-(N)$_3$((N)$_3$-SEQ ID NO: 10) | 10407.60 | 10408.6922 |
| | (N)$_5$-[TGG]$_4$[TTG][TGG]$_4$-(N)$_5$((N)$_5$-SEQ ID NO: 10) | 11631.36 | 11632.8887 |
| | (N)$_1$-[TGG]$_4$[TTG][TGG]$_5$-(N)$_1$((N)$_1$-SEQ ID NO: 11) | 10145.45 | 10146.6469 |
| | (N)$_3$-[TGG]$_4$[TTG][TGG]$_5$-(N)$_3$((N)$_3$-SEQ ID NO: 11) | 11369.21 | 11370.8433 |
| | (N)$_5$-[TGG]$_4$[TTG][TGG]$_5$-(N)$_5$((N)$_5$-SEQ ID NO: 11) | 12694.97 | 12595.0398 |

Example 2. Confirmation of In Vitro Stability of Oligonucleotide Variants

Gemcitabine (2,2'-difluorodeoxycytidine, dFdC) is transformed into an inactive metabolite, that is, 2,2'-difluorodeoxyuridine (dFdU) by cytidine deaminase in plasma, and in this case, in vivo anti-cancer efficacy is reduced. In order to confirm degradation inhibitory effects of gemcitabine in vivo by cytidine deaminase when gemcitabine is bound to oligonucleotide, concentrations of dFdC and dFdU in plasma were measured.

2-1. Liquid Chromatography-Tandem Mass Spectrometry (LC-MS/MS) Analysis to Determine Plasma Concentration of dFdC and dFdU By modifying liquid chromatography-tandem mass spectrometry (LC-MS/MS) assay in order to confirm the concentrations of gemcitabine triphosphate (dFdCTP) as an active metabolite of gemcitabine as well as dFdC, dFdU in mouse plasma, a mouse plasma and tissue assay was established. From the chromatogram obtained by the established LC-MS/MS assay method, peak area ratios of dFdC, dFdU and dFdCTP to a peak area of the internal standard substance were estimated, followed by calculating a concentration in the mouse plasma and a concentration in tissues from a previously created calibration curve.

2-1-1. Preparation of Tetrahydrouridine (THU) Treated Blood 1 mL of mouse blood was collected and placed in a 1.5 mL Eppendorf tube containing 10 µL of 10 mg/mL (in DW) tetrahydrouridine (THU). After centrifugation under conditions of 14,000 rpm and 4° C. for 2 minutes using a centrifuge, only plasma was taken and transferred to another vial and stored at −80° C. After transferring 50 µL of plasma to a 1.5 mL amber Eppendorf tube, 150 µL of an internal standard substance (meltform 1.29 µg/mL in ACN) was added and vortexed for 10 minutes. Centrifugation was conducted using a centrifuge under conditions of 14,000 rpm and 4° C. for 20 minutes. In the centrifuged tube, 150 µL of sample was transferred to another 1.5 mL amber Eppendorf tube. An organic solvent was dried using a GeneVac EZ-2 automated evaporation system (GeneVac Ltd., Ipswich, UK). (GeneVac HPLC mode, max temperature 35° C., 1 hr). The organic solvent was reconstituted by adding 125 µL DW to a 1.5 mL dried amber Eppendorf tube. After vortexing for 5 minutes, centrifugation was conducted using a centrifuge under conditions of 14,000 rpm and 4° C. for 5 minutes. The supernatant of the centrifuged solution was added in an amount of 100 µL to each vial for LC-MS/MS using a PTFE (hydrophilic) 0.2 µm syringe filter (Toyo Toshi, Japan). Specifically, 5 µL of the supernatant was injected into each LC-MS/MS.

2-1-2. LC-MS/MS Analysis Condition

For mass spectrometry, AB SCIEX QTRAP 5500, Electrospray ion mode (Sciex, Framingham, MA, USA) was used. Quantification conditions are listed in Table 5 below.

TABLE 5

| Analysis target | Parent ion (m/z) | Product ion (m/z) | Collision energy (eV) | Polarity | Retention time (minute) |
|---|---|---|---|---|---|
| Gemcitabine | 264.31 | 112.0 | 20 | Positive | 2.10 |
| dFdU | 265.00 | 113.0 | 35 | Positive | 4.23 |
| Metformin (IS) | 130.40 | 71.50 | 47 | Positive | 1.25 |

Chromatography was performed using an Agilent 1200 series separation module (Agilent Technologies, Waldbronn, Germany). Further, Hypersil gold C18, 1.9 µm, 100×2.1 mm$^2$ column was used (ThermoScientific, Matriks, Oslo, Norway). An injection volume was 5 µL, a mobile phase was a gradient eluent system [A: 100% ACN, B: 0.1% formic acid in DW], and a total running time was 20 minutes. A calibration range was set to be 20 to 5,000 ng/mL. The chromatographic conditions are listed in Table 6 below.

TABLE 6

| | Total time (minute) | Flow rate (μL/min) | A (%) | B (%) |
|---|---|---|---|---|
| 0 | 0.00 | 220 | 5 | 95 |
| 1 | 5.00 | 220 | 5 | 95 |
| 2 | 5.10 | 220 | 100 | 0 |
| 3 | 9.10 | 220 | 100 | 0 |
| 4 | 9.20 | 220 | 5 | 95 |
| 5 | 20.00 | 220 | 5 | 95 |

FIG. 1 shows a dFdC calibration curve and a dFdU calibration curve. In (a) of FIG. 1, x is a gemcitabine concentration and y is an area in HPLC. In addition, in (b) of FIG. 1, x is a dFdU concentration and y is an area in HPLC.

2-1-3. LC-MS/MS Analysis Result

Each sample was treated according to the above 2-1-1 and 2-1-2, and a ratio of dFdC/dFdU in rat plasma was measured in regard to the compound types of $(Gem)_x\text{-}[TGG]_m[TTG][TGG]_n$. The measured results are listed in Table 7 below (Gem=gemcitabine).

TABLE 7

| Oligonucleotide variant | Obs. MS (g/mole) | Exact MS (g/mole) | dFdC Blood concentration (pg/mL) | dFdU Blood concentration (pg/mL) | dFdC/dFdU ratio |
|---|---|---|---|---|---|
| $(Gem)_2$-$[TGG]_1[TTG][TGG]_1$ (compound 1) | 3448.1697 | 3449.5460 | 273 | 155 | 1.76 |
| $(Gem)_2$-$[TGG]_1[TTG][TGG]_2$ (compound 2) ($(Gem)_2$-SEQ ID NO: 2) | 4410.7747 | 4411.6970 | 280 | 139 | 2.01 |
| $(Gem)_2$-$[TGG]_2[TTG][TGG]_1$ (compound 3) ($(Gem)_2$-SEQ ID NO: 3) | 4411.7747 | 4411.6970 | 282 | 128 | 2.20 |
| $(Gem)_2$-$[TGG]_2[TTG][TGG]_2$ (compound 4) ($(Gem)_2$-SEQ ID NO: 4) | 5372.3798 | 5373.8482 | 310 | 119 | 2.61 |
| $(Gem)_2$-$[TGG]_2[TTG][TGG]_3$ (compound 5) ($(Gem)_2$-SEQ ID NO: 5) | 6334.9849 | 6335.9993 | 296 | 106 | 2.79 |
| $(Gem)_2$-$[TGG]_3[TTG][TGG]_2$ (compound 6) ($(Gem)_2$-SEQ ID NO: 6) | 6334.9849 | 6335.9993 | 310 | 109 | 2.84 |
| $(Gem)_2$-$[TGG]_3[TTG][TGG]_3$ (compound 7) ($(Gem)_2$-SEQ ID NO: 7) | 7297.5899 | 7298.1504 | 313 | 95 | 3.29 |
| $(Gem)_2$-$[TGG]_3[TTG][TGG]_4$ (compound 8) ($(Gem)_2$-SEQ ID NO: 8) | 8259.1950 | 8260.3015 | 334 | 88 | 3.80 |
| $(Gem)_2$-$[TGG]_4[TTG][TGG]_3$ (compound 9) ($(Gem)_2$-SEQ ID NO: 9) | 8259.1950 | 8260.3015 | 344 | 57 | 6.04 |
| $(Gem)_2$-$[TGG]_4[TTG][TGG]_4$ (compound 10) ($(Gem)_2$-SEQ ID NO: 10) | 9221.8000 | 9222.4525 | 396 | 33 | 12.00 |
| $(Gem)_2$-$[TGG]_4[TTG][TGG]_5$ (compound 11) ($(Gem)_2$-SEQ ID NO: 11) | 10183.4051 | 10184.6036 | 409 | 29 | 14.10 |
| $(Gem)_2$-$[TGG]_5[TTG][TGG]_4$ (compound 12) ($(Gem)_2$-SEQ ID NO: 12) | 10183.4051 | 10184.6036 | 409 | 30 | 13.63 |

TABLE 7-continued

| Oligonucleotide variant | Obs. MS (g/mole) | Exact MS (g/mole) | dFdC Blood concentration (pg/mL) | dFdU Blood concentration (pg/mL) | dFdC/ dFdU ratio |
|---|---|---|---|---|---|
| (Gem)$_2$-[TGG]$_5$[TTG][TGG]$_5$ (compound 13)((Gem)$_2$-SEQ ID NO: 13) | 11145.0102 | 11146.7547 | 403 | 34 | 11.85 |
| (Gem)$_2$-[TGG]$_5$[TTG][TGG]$_6$ (compound 14)((Gem)$_2$-SEQ ID NO: 14) | 12107.6152 | 12108.9058 | 371 | 32 | 11.59 |
| (Gem)$_2$-[TGG]$_6$[TTG][TGG]$_5$ (compound 15)((Gem)$_2$-SEQ ID NO: 15) | 12107.6152 | 12108.9058 | 410 | 30 | 13.67 |
| (Gem)$_2$-[TGG]$_6$[TTG][TGG]$_6$ (compound 16)((Gem)$_2$-SEQ ID NO: 16) | 13070.2203 | 13071.0569 | 394 | 29 | 13.59 |

Several compounds having high dFdC/dFdU ratios (compound 10; hereinafter also referred to as IO101, and compound 11; hereinafter also referred to as IO101L) were selected, followed by performing additional experiments to determine effects of oligonucleotide variants. Further, in order to compare effects of IO101 and IO101L with other oligonucleotide variants, the experiments were performed using the oligonucleotide variants of different sequences such as [(Gem)$_2$-[TCC]$_4$[TTG][TCC]$_4$ ((Gem)$_2$-SEQ ID NO: 10); IO101-Con(CRO), (Gem)$_2$-GGTGGTGGTGGTTGTGGTGGTGGTGGTGG (Gem)$_2$-SEQ ID NO: 1]; IO100 and (Gem)$_2$-CCTCCTCCTCCTTCTCCTCCTCCTCCTCC ((Gem)$_2$-SEQ ID NO: 29]; IO100-Con ((Gem)$_2$-CRO)) and gemcitabine which is not bound to oligonucleotides.

Example 3. Assessment of In Vitro Efficacy of Oligonucleotide Variants Against Cancer Cell Lines 3-1. Confirmation of Anti-Cancer Effect of IO101 on Pancreatic Cancer Cell Lines BxPC3, PANC-1, Miapaca-2, and Capan-1 were cultured as pancreatic cancer cell lines, respectively. When the cells were stable after several subcultures, 1×10$^3$ cells were seeded in 96 well plates to verify drug effects. On the next day, IO101, IO100, IO100-Con, IO101-Con and Gem at the highest concentration of 100 μM were diluted by 1/10 per each well, and prepared at a concentration of 4 points up to 100 nM. Then, the cells seeding in the 96 well plates were treated using the above prepared variants. After 48 hours, 10 μl of WST-1 solution was added to the wells and incubated in a 37° C. incubator for 1 hour. Subsequently, each sample was measured at 440 nm in a micro plate reader (VERSA Max). After calculation of the measured values, a cell survival rate graph for each treatment concentration was drawn up.

Figure 2:
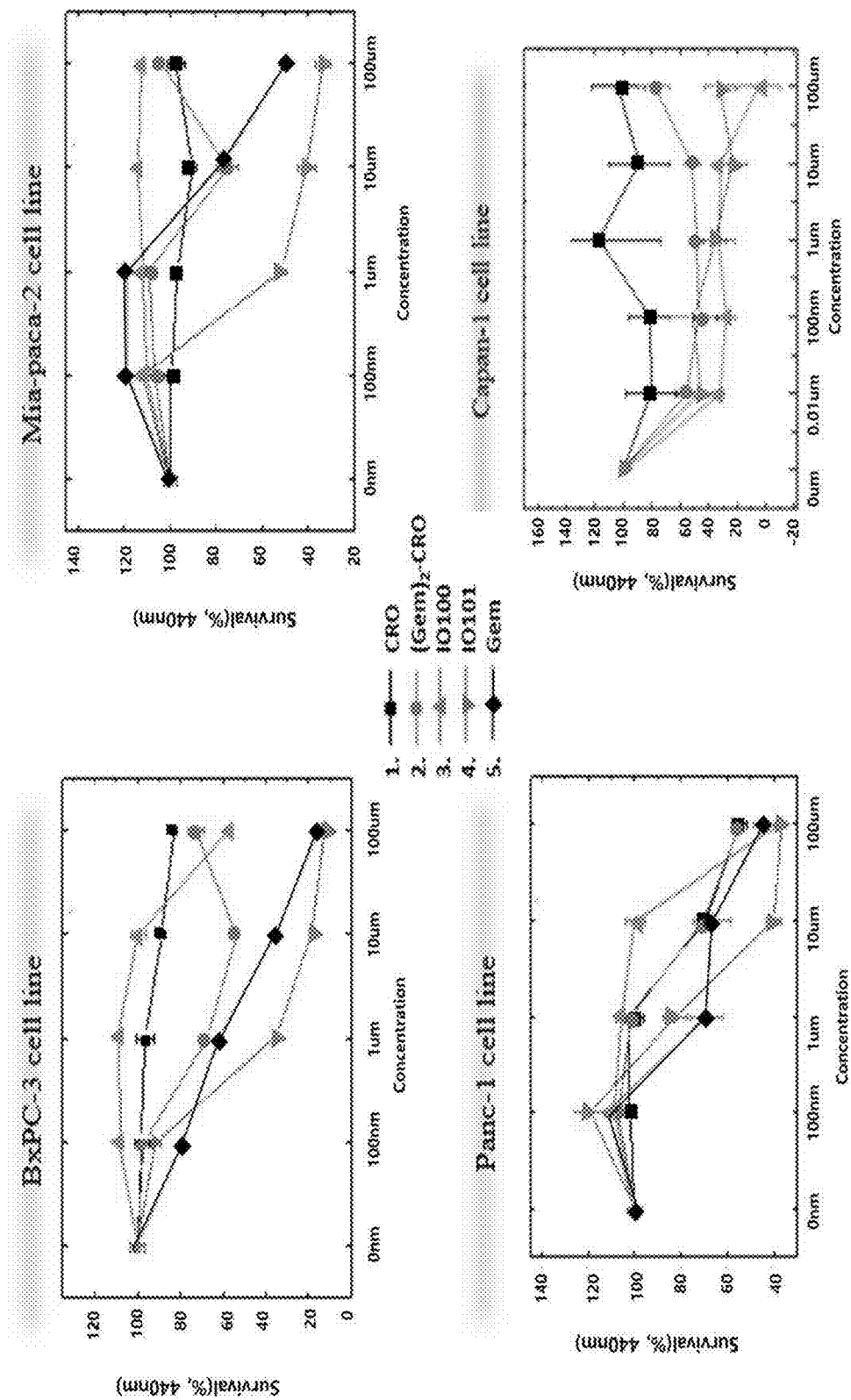
FIG. 2 shows results of evaluating in vitro anticancer efficacy of (Gem)₂-[TGG]₄[TTG][TGG]₄ ((Gem)₂-SEQ ID NO: 10) (IO101) to pancreatic cancer cell lines.
Figure 3:
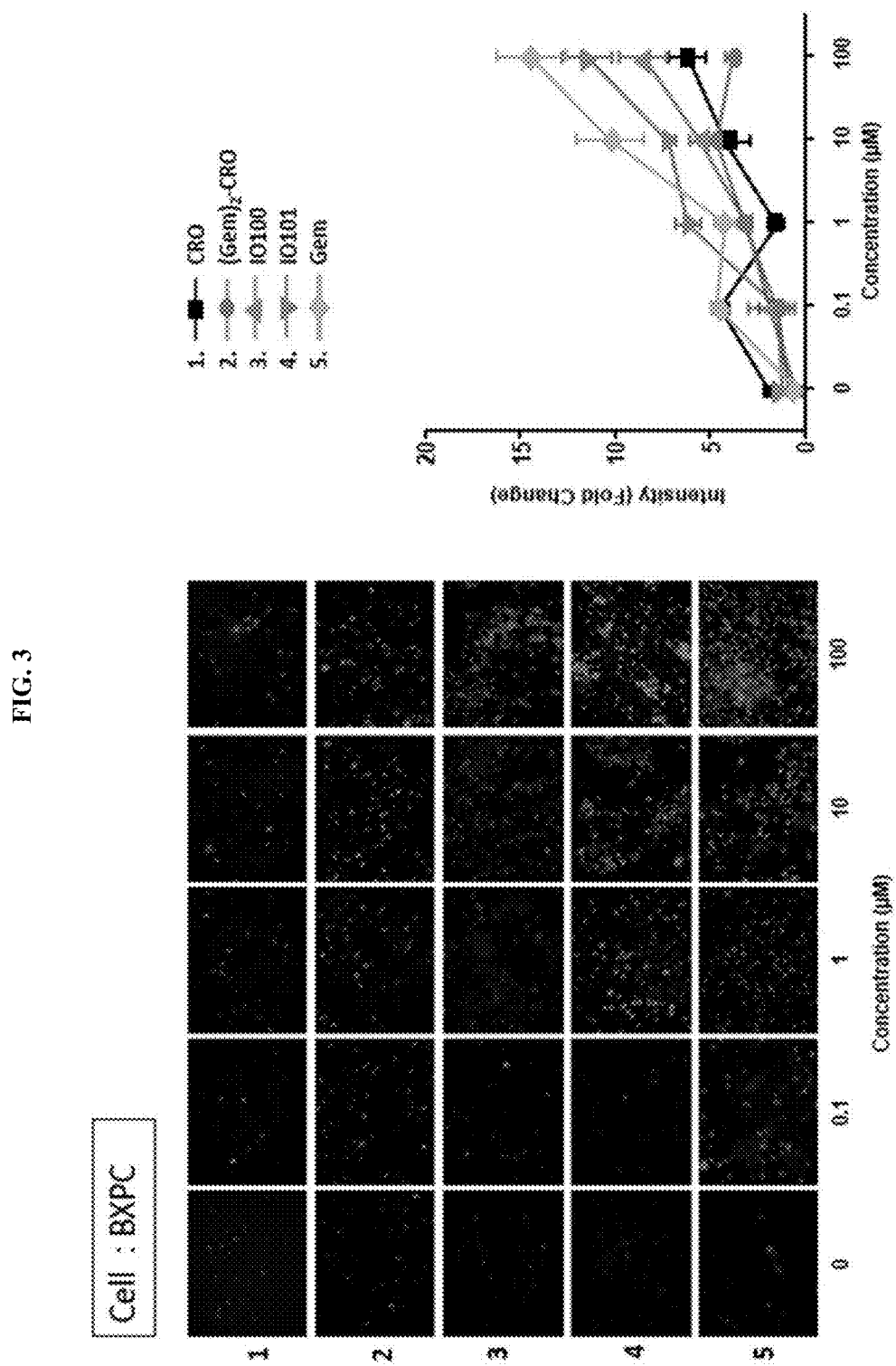
FIG. 3 shows results of confirming apoptosis of pancreatic cancer cell line BXPC according to IO101 treatment.
Figure 4:
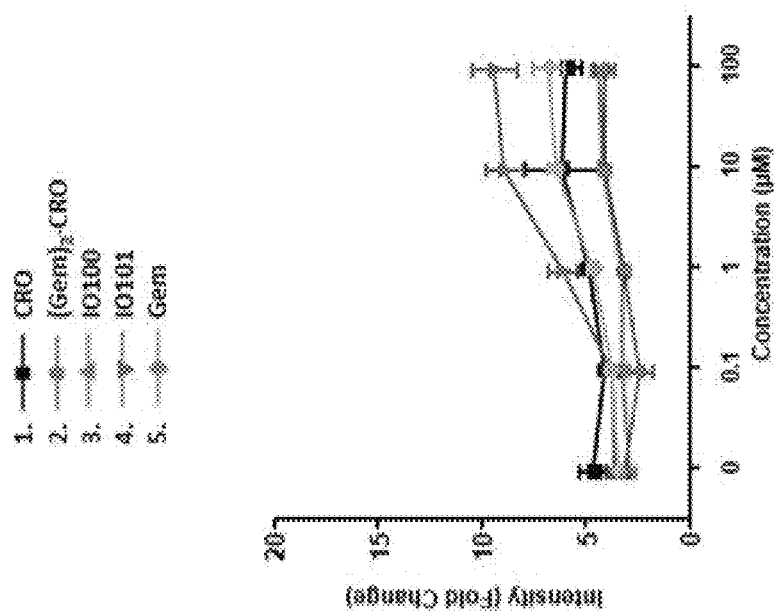
FIG. 4 shows results of confirming apoptosis of pancreatic cancer cell line mia-paca-2 according to IO101 treatment.
Figure 4:
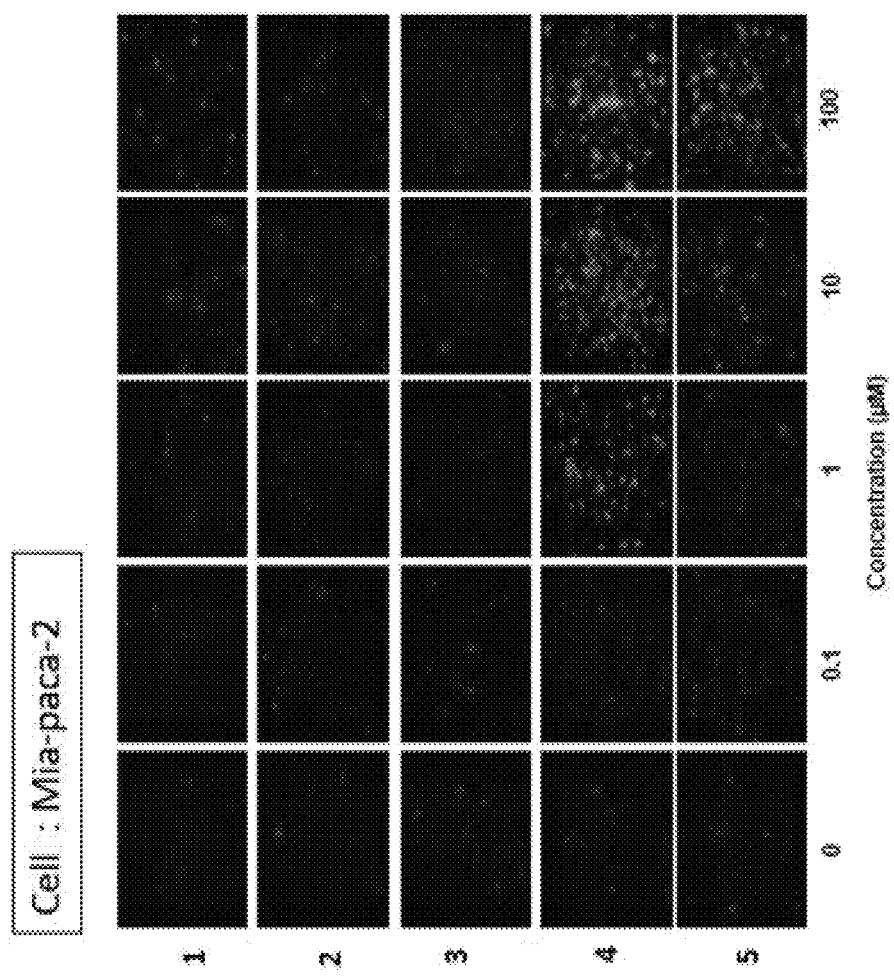
Figure 5:
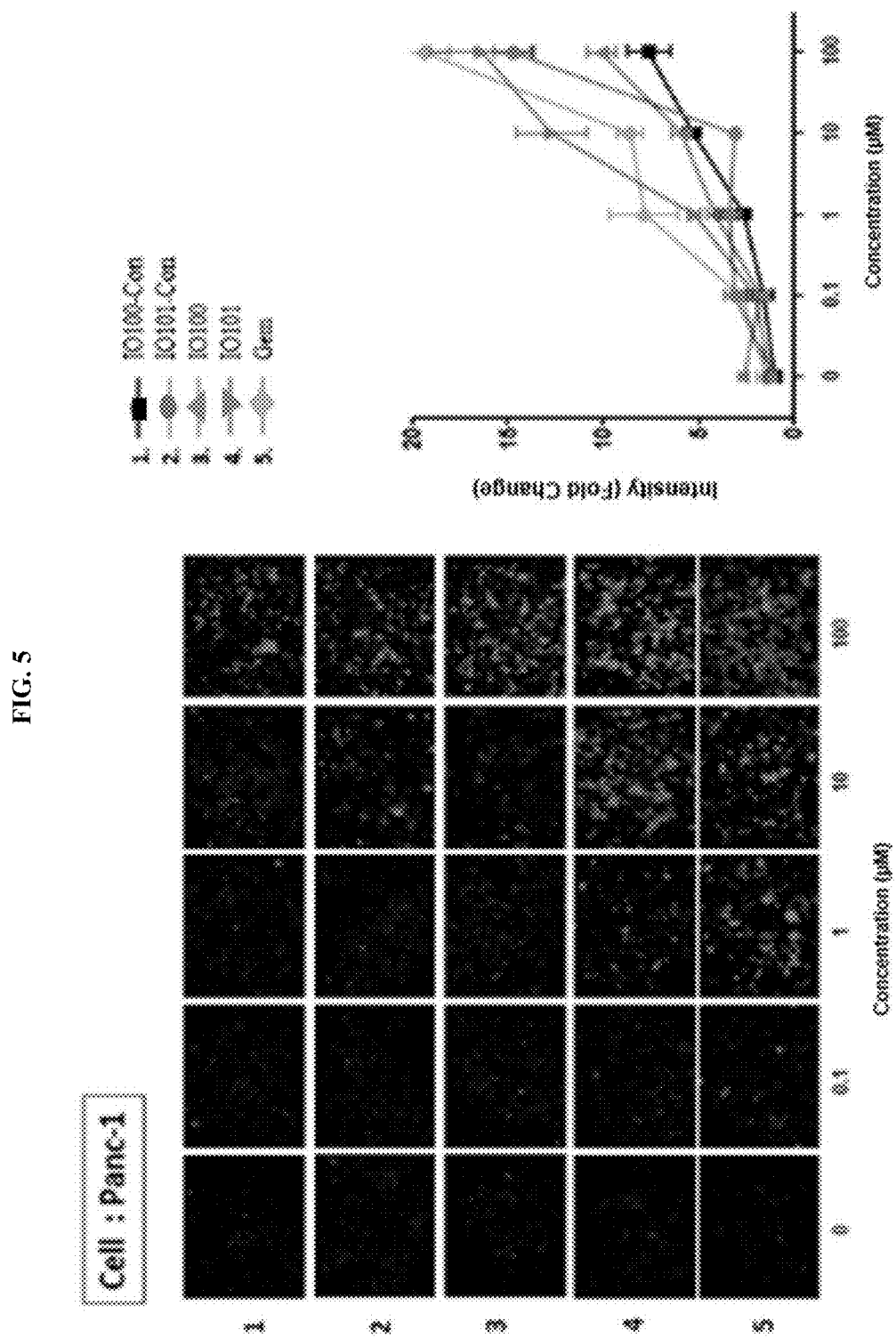
FIG. 5 shows results of confirming apoptosis of the pancreatic cancer cell line Panc-1 according to IO101 treatment.
Figure 6:
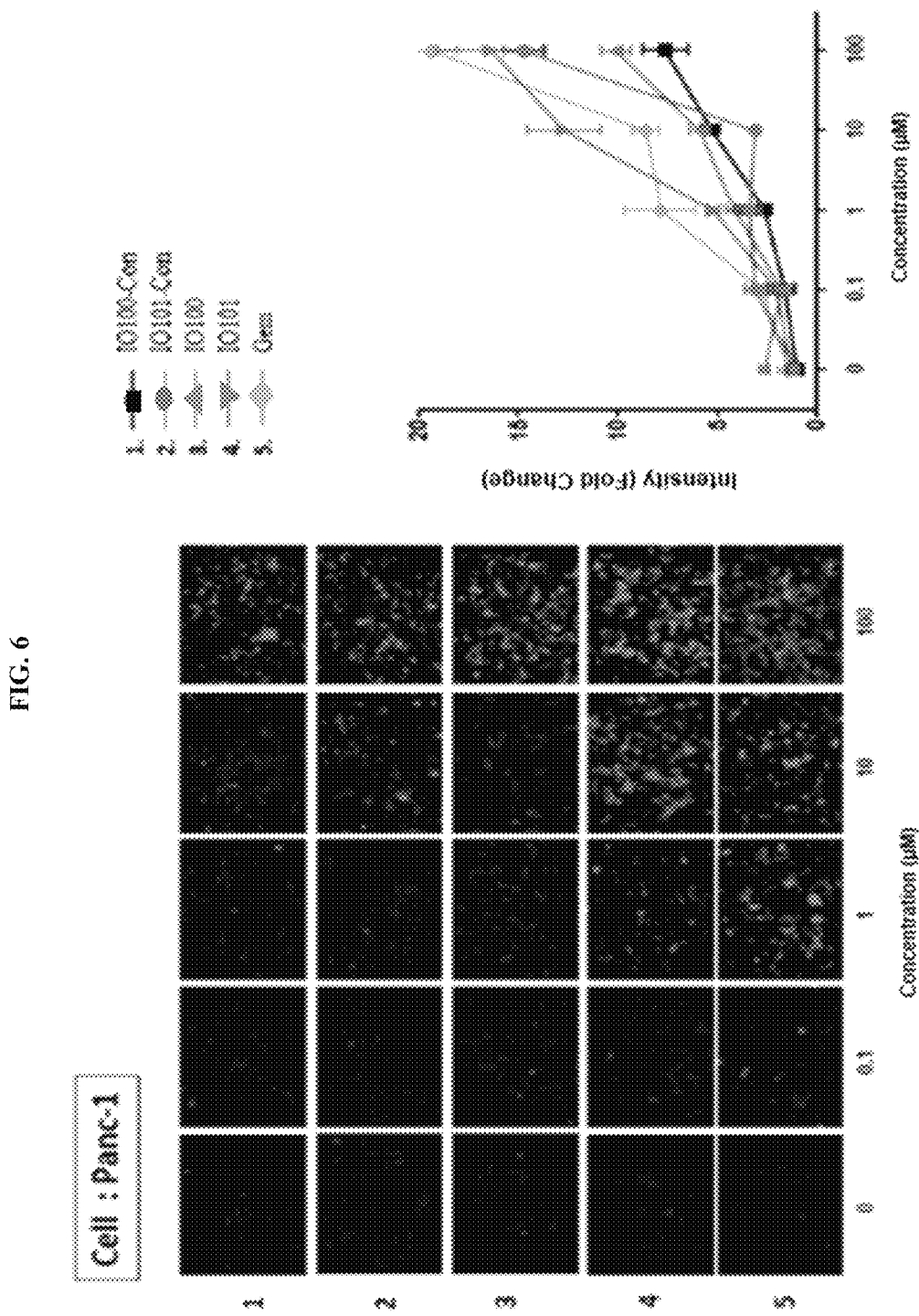
FIG. 6 shows results of confirming apoptosis of pancreatic cancer cell line Capan-1 according to IO101 treatment.

As compared with IO100, IO100-Con, IO101-Con, and Gem in all four pancreatic cancer cell lines, it was observed that (Gem)$_2$-[TGG][TTG][TGG]$_4$ ((Gem)$_2$-SEQ ID NO: 10) (IO101) effectively inhibits pancreatic cancer cell growth in proportion to a drug concentration (see FIG. 2).

After seeding 4 types of pancreatic cancer cell lines at 1×10$^4$ cells/well, respectively, and then treating the same with IO101, the treated cell line was labeled with a red probe and imaged within 48 hours to observe apoptosis of cancer cells. FIGS. 3 to 6 show results of confirming apoptosis of 4 types of pancreatic cancer cells according to IO101 treatment. The intensity value is a death cell index, and is indicated as fold change.

Figure 7:
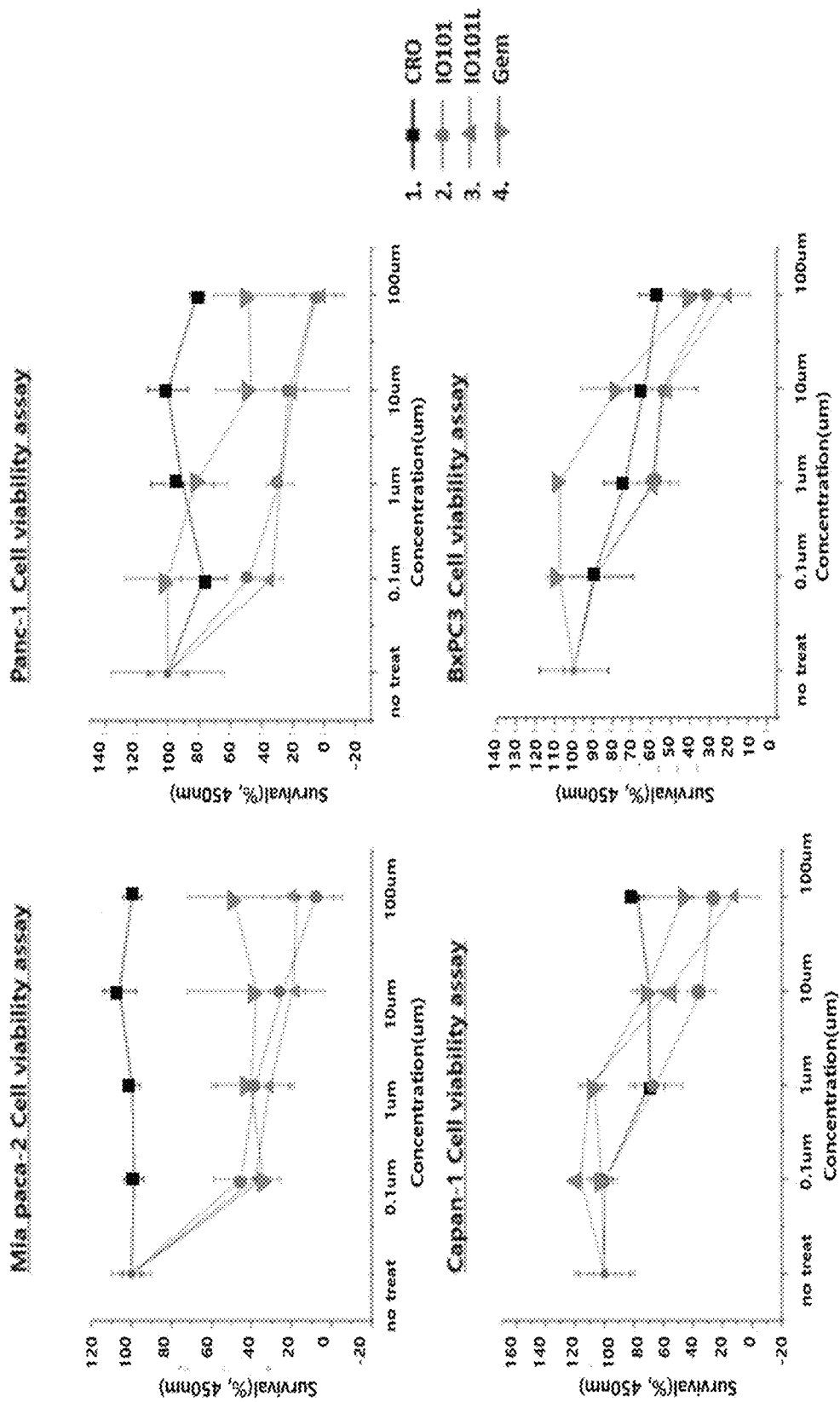
FIG. 7 shows results of evaluating in vitro anti-cancer efficacy of (Gem)₂-[TGG]₄[TTG][TGG]₅ ((Gem)₂-SEQ ID NO: 11) (IO101L) to pancreatic cancer cell lines.

3-2. Confirmation of Anti-Cancer Effect of IO101L on Pancreatic Cancer Cell Lines In the same manner as the efficacy assessment in 3-1 described above, efficacy of (Gem)$_2$-[TGG]$_4$[TTG][TGG]$_5$ ((Gem)$_2$-SEQ ID NO: 11) (IO101L) was verified on the pancreatic cancer cell lines by cell viability assay. As a result, pancreatic cancer cell growth was effectively inhibited by IO101L compared to the control in all four pancreatic cancer cell lines (see FIG. 7).

Example 4. Confirmation of In Vivo Stability of Oligonucleotide Variants

Gemcitabine was injected intravenously (8 mg/kg) in rats, or (Gem)$_x$-[TGG]$_m$[TTG][TGG]$_n$ as a new agent prepared by binding gemcitabine with oligonucleotide was injected intravenously (160 mg/kg, which corresponds to 8 mg/kg based on the gemcitabine), thus to compare pharmacokinetic changes between gemcitabine and its metabolite, that is, 2',2-difluorodeoxyuridine (dFdU) cyanidin-3-glucoside.

4-1. Intravenous Injection of Oligonucleotide Variants or Gemcitabine in Rats

Sprague-Dawley male rats were subjected to induced anesthesia with isoflurane, which is an inhalation anesthetic, then a polyethylene (PE) tube (Clay Adams, Becton Dickinson, NJ, USA) was inserted into a carotid artery (for blood collection) and sutured with a suture, followed by fixing an end of the suture behind the neck. During surgery, anesthesia was maintained using ether and about 0.5 mL of physiological saline containing heparin (20 units/mL) was injected to prevent blood from clotting in a cannula. After the surgery is finished, the rats were placed in metabolic cages and allowed to recover completely from the anesthetic condition (4 to 5 hours), respectively. Thereafter, the animals were divided into (Gem)$_2$-[TGG]$_4$[TTG][TGG]$_5$ ((Gem)$_2$-SEQ ID NO: 11) administration group (N=4) and gemcitabine administration group (N=4), and the corresponding drugs were administered to these groups. After weighing gemcitabine and (Gem)$_2$-[TGG]$_4$[TTG][TGG]$_5$ ((Gem)$_2$-SEQ ID NO: 11) to a dosage (8 mg/kg and 160 mg/kg) on an electronic balance (CP224S, Sartorius, GER), each of the drugs was dissolved and prepared in 0.9% of sterile physiological saline. 1 and 2 ml/kg of drugs were administered intravenously. Immediately before the administration of (Gem)$_2$-[TGG]$_4$[TTG][TGG]$_5$ ((Gem)$_2$-SEQ ID NO: 11) and gemcitabine (0 min) and 1. 5. 15. 30, 45, 60, 120, 360 and 720 minutes after the administration, 0.3 mL of blood was each collected through a jugular vein. Further, in order to prevent gemcitabine in blood from being metabolized by cytidine deaminase, the collected blood was put into the Eppendorf tube in which 10 μL of distilled water was previously placed wherein the distilled water contains tetrahydrouridine (THU) as a cytidine deaminase inhibitor dissolved at a concentration of 10 mg/mL per 1 mL of blood. Then, the blood in the Eppendorf tube was immediately centrifuged, followed by storing the plasma. Since gemcitabine is known to be degradable by light, all plasma samples were placed in brown Eppendorf tubes by 50 μL for each tube, and stored at −80° C. until LC-MS/MS analysis is performed.

4-2. Analysis of Plasma Concentrations of Gemcitabine and its Metabolite dFdU Sample treatment and analysis of the plasma concentrations of gemcitabine and dFdU were performed by LC-MS/MS using an Agilent 1200 series analyzer (Agilent Technologies) in AB SCIEX QTRAP 5500, Electrospray ion mode (Sciex, Framingham, MA, USA) after pre-treatment by plasma protein precipitation using a pre-established acetonitrile plasma. All analytical procedures were implemented under conditions of shielding the tube. That is, all procedures were performed under quantification condition: SRM (selected reaction monitoring) mode (see Table 5 above), fixed phase condition: Hypersil gold C18, 1.9 μm, 100×2.1 mm$^2$ (Thermo Scientific, Matriks, Oslo, Norway), and mobile phase condition: distilled water (A) containing 0.1% formic acid and acetonitrile (B) (see Table 6 above).

4-3. Creating a Plasma Calibration Curve

Gemcitabine and dFdU were respectively dissolved in distilled water to prepare a storage solution of 1 mg/mL, stored frozen and diluted with tertiary distilled water so as to prepare a working solution having gemcitabine concentrations of 200, 400, 800, 2000, 10000, 20000 are 100000 ng/mL and dFdU concentrations of 200, 400, 800, 2000, 10000, 20000 and 50000 ng/mL, followed by storage in a refrigerator. Metformin as an internal standard substance (IS) was dissolved in acetonitrile to prepare another working solution of 645 ng/mL. Gemcitabine and dFdU working solutions were respectively added to empty plasma of the rats, and standard plasma samples were prepared so that the plasma concentrations of gemcitabine and dFdU are 10, 20, 40, 100, 500, 1000 and 5000 ng/mL, and 10, 20, 40, 100, 500, 1000 and 2500 ng/mL, respectively.

4-4. Treatment Method of Plasma Sample

150 μL of the internal standard, that is, metformin was added to 50 μL of plasma (645 ng/mL in acetonitrile) and vortexed for 10 minutes, followed by performing centrifugation at 15,000 rpm and −4° C. for 20 minutes. Thereafter, 150 μL of the supernatant was taken and transferred to another Eppendorf tube, and then the organic solvent was dried under a nitrogen stream. Then, 125 μL of tertiary distilled water was added to the dried Eppendorf tube, allowed to be redissolved. Then, the solution was vortexed for 5 minutes, centrifuged at 15,000 rpm and −4° C. for 5 minutes. Thereafter, 100 μL of the supernatant was transferred to the vial for LC-MS/MS, 5 μL of the supernatant was injected and analyzed by LC-MS/MS.

4-5. Determination of Analytical Suitability

In order to determine the suitability of the analytical process, a sample for creating a calibration curve was analyzed for each batch of analytical samples during sample treatment, and then, a sample for analytical suitability was analyzed twice (for gemcitabine, minimum quantification limit: LLoQ, 10 ng/mL, low concentration: LoQC, 30 ng/mL, medium concentration: MiQC, 900 ng/mL, high concentration: HiQC, 4000 ng/mL; and for dFdU, minimum quantification limit: LLoQ, 10 ng/mL, low concentration: LoQC, 30 ng/mL, medium concentration: MiQC, 900 ng/mL, high concentration: HiQC, 2000 ng/mL). At least 67% of 6 suitable samples (e.g.: 4 out of 6) should be within ±15% of a theoretical value, and it was investigated whether 50% or more at the same concentration was within ±15% of the theoretical value.

4-6. Pharmacokinetic Parameter Calculation and Statistical Processing

Pharmacokinetic parameters of gemcitabine were obtained by Winnonlin Professional program (Pharsight, Mountain View, Calif., USA). Values of an area under the plasma concentration-time curve (AUC$_t$) were calculated using a log-linear trapezoidal equation from the plasma concentration-time curves after the administration of drug to the final quantification time (specifically, the linear-trapezoidal equation is used in a section where the plasma concentration is increased, while in another section where plasma concentration is decreased, the trapezoidal equation is used by log transforming the concentration value). After oral administration, the highest plasma concentration (C$_{max}$) and the time to reach the highest plasma concentration (T$_{max}$) were determined from the plasma concentration-time curve. Values of the area (AUC$_{inf}$) under the plasma concentration till infinite time-time curve were determined using the following equation. A terminal elimination rate constant (γZ) and half-life (t$_{1/2}$) were determined from a slope of elimination of the plasma concentration.

$$AU_{inf} = AUC_t + C_t/\gamma Z (C_t: \text{final quantification concentration, } \gamma Z: \text{terminal elimination rate constant})$$

For comparison of pharmacokinetic parameters between two groups, an independent sample t-test was conducted using SPSS (version 19, Chicago, IL, USA).

Figure 8:
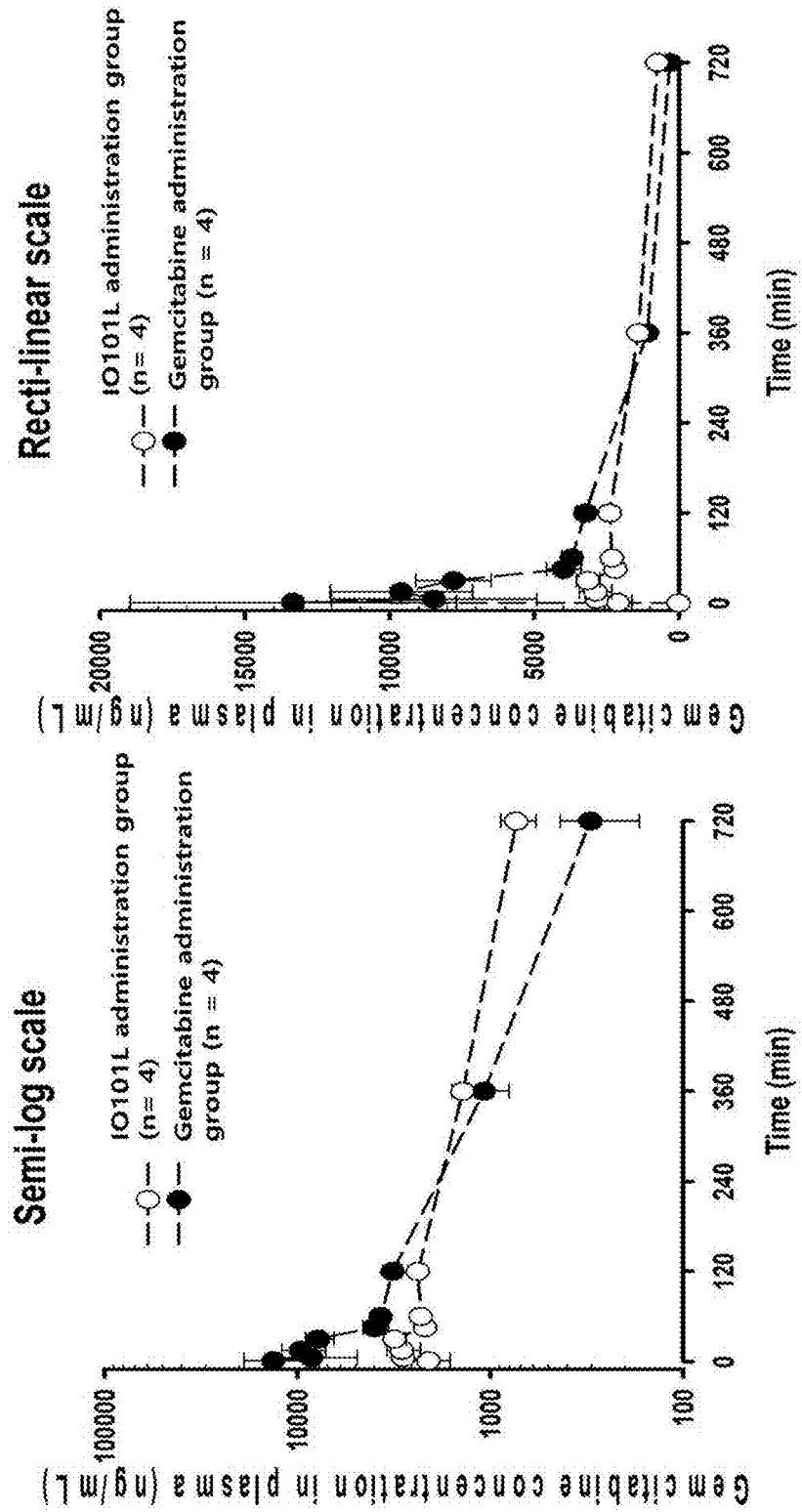
FIG. 8 illustrates a change in a plasma concentration of gemcitabine after the administration of gemcitabine (●, n=4) or IO101L (○, n=4) to rats.
Figure 9:
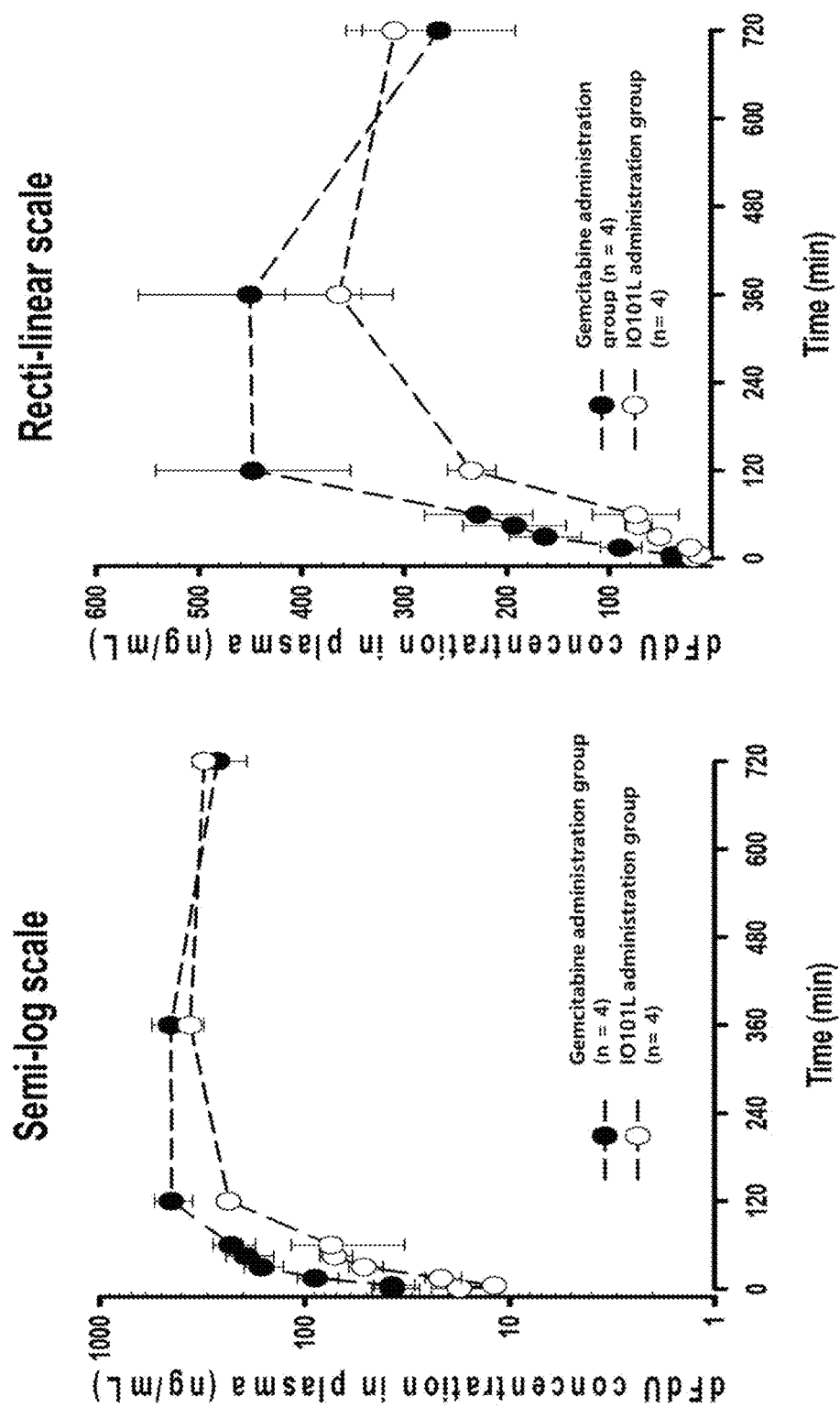
FIG. 9 illustrates the plasma concentration of dFdU after the administration of gemcitabine (●, n=4) or IO101L (○, n=4) to rats.

4-7. Comparison of In Vivo Pharmacokinetic Properties Between Gemcitabine and dFdU With regard to intravenous injection of gemcitabine (8 mg/kg) or (Gem)$_2$-[TGG]$_4$[TTG][TGG]$_5$ ((Gem)$_2$-SEQ ID NO: 11) (160 mg/kg, which corresponds to 8 mg/kg based on the gemcitabine), a plasma concentration of gemcitabine is shown in FIG. 8, while a plasma concentration of dFdU concentrations is shown in FIG. 9. Further, in intravenous injection of gemcitabine or (Gem)$_2$-[TGG]$_4$[TTG][TGG]$_5$ ((Gem)$_2$-SEQ ID NO: 11), the pharmacokinetic parameter values of gemcitabine and dFdU are listed in Table 8 as mean values±standard deviation. In Table 8 below, AUC$_t$ is an area under the curve from 0 min to the last blood collection time, t$_{1/2}$ is a terminal half-life (plasma elimination half-life), CL is a total body clearance, Vd$_{ss}$ is a distribution volume in the body, and MRT is a mean residence time of drug in the body, T$_{max}$ is median (ranges), and the metabolic conversion ratio value is a value calculated by dividing the dFdU AUC$_t$ value by the gemcitabine AUC$_t$ value.

TABLE 8

| Parameter | Gemcitabine (N = 4) | IO101L (N = 4) | P |
|---|---|---|---|
| *Gemcitabine* | | | |
| AUC$_t$ (μg min/mL) | 1390 ± 219 | 1130 ± 86.1 | 0.109 |
| AUC$_\infty$ (μg min/mL) | 1470 ± 259 | 1520 ± 230 | 0.796 |
| t$_{1/2}$ (min) | 177 ± 28.5 | 360 ± 54.8 | 0.00218 |
| CL(mL/min/kg) | 5.59 ± 0.860 | 5.35 ± 0.692 | 0.720 |
| Vd$_{ss}$ (mL/kg) | 1150 ± 223 | 2670 ± 139 | 0.00000585 |
| MRT (min) | 209 ± 38.9 | 509 ± 85.0 | 0.00144 |
| C$_{max}$ (ng/mL) | 13.3 ± 5.64 | 3.24 ± 0.345 | 0.0213 |
| T$_{max}$ (min) | 1 | 10 (5-30) | 0.0742 |
| *dFdU* | | | |
| AUC$_t$ (μg min/mL) | 265 ± 57.1 | 2050 ± 26.0 | 0.146 |
| C$_{max}$ (ng/mL) | 477 ± 87.9 | 364 ± 52.3 | 0.134 |
| T$_{max}$ (min) | 240 (120-360) | 360 | 0.103 |
| Metabolic conversion ratio | 0.190 ± 0.019 | 0.181 ± 0.0124 | 0.500 |

As a result of the experiments, a gemcitabine administration group reached the highest plasma concentration immediately after the administration of drug as in the general pharmacokinetic pattern after the intravenous injection of the drug. However, (Gem)$_2$-[TGG]$_4$[TTG][TGG]$_5$ ((Gem)$_2$-SEQ ID NO: 11) administration group reached C$_{max}$ between 5 and 30 minutes after the intravenous injection. The plasma gemcitabine concentration after the intravenous injection of (Gem)$_2$-[TGG]$_4$[TTG][TGG]$_5$ ((Gem)$_2$-SEQ ID NO: 11) means a concentration of gemcitabine released from the oligonucleotide, that is, [TGG]$_4$[TTG][TGG]$_5$ (SEQ ID NO: 11) by nucleic acid degradation enzyme ("nuclease") in the body. As a result of preliminary experiments, it was confirmed that (Gem)$_2$-[TGG]$_4$[TTG][TGG]$_5$ ((Gem)$_2$-SEQ ID NO: 11) was not released as gemcitabine in the process of plasma sample treatment (organic solvent such as acetonitrile or methanol). Further, since gemcitabine is a drug with a very low plasma protein binding rate, a concentration of gemcitabine measured in plasma after the intravenous injection of (Gem)$_2$-[TGG]$_4$[TTG][TGG]$_5$ ((Gem)$_2$-SEQ ID NO: 11) in rats indicates a gemcitabine free concentration by the nuclease in the body. The (Gem)$_2$-[TGG]$_4$[TTG][TGG]$_5$ ((Gem)$_2$-SEQ ID NO: 11) administration group showed a significantly lower gemcitabine plasma concentration than the gemcitabine administration group till 120 minutes. However, after 120 minutes (360 minutes, 720 minutes), the (Gem)$_2$-[TGG]$_4$[TTG][TGG]$_5$ ((Gem)$_2$-SEQ ID NO: 11) administration group showed a higher gemcitabine concentration than that of the gemcitabine administration group (see FIG. 8). This means that [TGG]$_4$[TTG][TGG]$_5$ (SEQ ID NO: 11) is metabolized to gemcitabine by the nuclease in the body, which in turn is slowly released into the plasma. As a result, a plasma elimination half-life (t$_{1/2}$) of gemcitabine in the (Gem)$_2$-[TGG]$_4$[TTG][TGG]$_5$ ((Gem)$_2$-SEQ ID NO: 11) administration group was statistically and significantly increased by about two times (177±28.5 minutes versus 360±54.8 minutes; see Table 8 above). Further, it could be understood that Vd$_{ss}$ (a distribution volume in the body) of gemcitabine in the (Gem)$_2$-[TGG]$_4$[TTG][TGG]$_5$ ((Gem)$_2$-SEQ ID NO: 11) administration group, which indicates affinity between the drug and the tissues in the body, was significantly increased by more than two times. (1150±223 mL/kg versus 2670±139 mL/kg; see Table 7 above). That is, it can be predicted that the (Gem)$_2$-[TGG]$_4$[TTG][TGG]$_5$ ((Gem)$_2$-SEQ ID NO: 11) administration group has a higher distribution of gemcitabine in the tissues of the body, thus to be distributed more greatly into the tissue than the gemcitabine administration group. In both groups, AUC$_t$ and AUC$_{inf}$ values of gemcitabine were similar and showed no statistical significance. In the case of (Gem)$_2$-[TGG]$_4$[TTG][TGG]$_5$ ((Gem)$_2$-SEQ ID NO: 11) administration group, a plasma concentration of dFdU as an inactive metabolite of gemcitabine was detected lower than that of the gemcitabine administration group up to 360 minutes after the administration (see FIG. 9). Since gemcitabine bound to [TGG]$_4$[TTG][TGG]$_5$ (SEQ ID NO: 11) is not metabolized to dFdU, a dFdU concentration measured in plasma means a concentration of dFdU produced by cytidine deaminase in plasma when gemcitabine is released from [TGG]$_4$[TTG][TGG]$_5$ (SEQ ID NO: 11) by nuclease in the body after the intravenous injection of (Gem)$_2$-[TGG]$_4$[TTG][TGG]$_5$ ((Gem)$_2$-SEQ ID NO: 11). After 360 minutes, the (Gem)$_2$-[TGG]$_4$[TTG][TGG]$_5$ ((Gem)$_2$-SEQ ID NO: 11) administration group showed higher plasma concentration of dFdU, however, no further confirmation was possible due to the relatively short sampling time limit. C$_{max}$ value of dFdU in the (Gem)$_2$-[TGG]$_4$[TTG][TGG]$_5$ ((Gem)$_2$-SEQ ID NO: 11) administration group showed a tendency to be reduced (364±52.3 ng/mL vs 477±87.9 ng/mL), but no statistical significance between the two groups was shown (see Table 8 above). In order to compare a ratio of dFdU production by cytidine deaminase in both groups, the metabolic conversion ratio was calculated by dividing the dFdU AUC$_t$ value by the gemcitabine AUC$_t$ value. From the result, the two groups showed similar values (0.190±0.019 vs 0.181±0.0124), which was not statistically significant. It is predicted that, in the case of (Gem)$_2$-[TGG]$_4$[TTG][TGG]$_5$ ((Gem)$_2$-SEQ ID NO: 11), gemcitabine bound to [TGG]$_4$[TTG][TGG]$_5$ (SEQ ID NO: 11) is slowly released into plasma and greatly distributed to tissues, but the released gemcitabine does not affect dFdU production by cytidine deaminase present in the plasma and tissues.

Table 9 below shows blood concentrations of gemcitabine over time after the administration of gemcitabine and (Gem)$_2$-[TGG]$_4$[TTG][TGG]$_5$ ((Gem)$_2$-SEQ ID NO: 11).

TABLE 9

| | Gemcitabine (ng/mL) | | | | | | | |
|---|---|---|---|---|---|---|---|---|
| | Gemcitabine administration group | | | | IO101L administration group | | | |
| Time (minute) | Rat 1 | Rat 2 | Rat 3 | Rat 4 | Rat 1 | Rat 2 | Rat 3 | Rat 4 |
| 0 | ND | ND | ND | ND | ND | ND | ND | ND |
| 1 | 6230 | 16200 | 9980 | 20900 | 2610 | 1720 | 2500 | 1540 |
| 5 | 3800 | 7770 | 8460 | 13800 | 3090 | 3010 | 2790 | 2420 |
| 15 | 5920 | 11400 | 8830 | 12200 | 2640 | 2550 | 3840 | 2450 |
| 30 | 5600 | 8750 | 8000 | 8800 | 2960 | 2730 | 3800 | 3035 |
| 45 | 3410 | 3390 | 4290 | 4790 | 1950 | 2220 | 2430 | 2100 |

TABLE 9-continued

| | Gemcitabine (ng/mL) | | | | | | | |
|---|---|---|---|---|---|---|---|---|
| | Gemcitabine administration group | | | | IO101L administration group | | | |
| Time (minute) | Rat 1 | Rat 2 | Rat 3 | Rat 4 | Rat 1 | Rat 2 | Rat 3 | Rat 4 |
| 60 | 3550 | 3210 | 4060 | 3960 | 2080 | 2190 | 2630 | 2290 |
| 120 | 2800 | 3060 | 3330 | 3680 | 2510 | 2250 | 2450 | 2300 |
| 360 | 1040 | 691 | 1110 | 1470 | 1690 | 1440 | 1210 | 1220 |
| 720 | 319 | 165 | 213 | 512 | 993 | 594 | 666 | 677 |

Table 10 below shows the blood concentration of dFdU over time after the administration of gemcitabine and (Gem)$_2$-[TGG]$_4$[TTG][TGG]$_5$ ((Gem)$_2$-SEQ ID NO: 11). BLLoQ means a value below the minimum quantification limit, and ND means undetected value.

TABLE 10

| | dFdU (ng/mL) | | | | | | | |
|---|---|---|---|---|---|---|---|---|
| | Gemcitabine administration group | | | | IO101L administration group | | | |
| Time (minute | Rat 1 | Rat 2 | Rat 3 | Rat 4 | Rat 1 | Rat 2 | Rat 3 | Rat 4 |
| 0 | ND | ND | ND | ND | ND | ND | ND | ND |
| 1 | BLLoQ | 40.1 | 24.2 | 47.6 | 11.3 | 28.3 | 13.9 | 16.9 |
| 5 | BLLoQ | 30.4 | 32.6 | 49.5 | 11.3 | 12.8 | 10.5 | 12.9 |
| 15 | 56.7 | 106 | 85.9 | 106 | 16.2 | 21.1 | 28.5 | 20.5 |
| 30 | 104.5 | 199 | 178 | 168 | 48.6 | 42.8 | 68 | 45.7 |
| 45 | 135 | 151 | 231 | 252 | 62.5 | 64.6 | 94.2 | 65.1 |
| 60 | 187 | 169 | 302 | 252 | 101 | 102 | 2.08 | 92.4 |
| 120 | 304 | 424 | 553 | 509 | 239 | 209 | 271 | 219 |
| 360 | 361 | 325 | 545 | 571 | 436 | 336 | 386 | 297 |
| 720 | 246 | 191 | 238 | 390 | 373 | 266 | 336 | 262 |

Example 5. Preparation of Medical Atelocollagen 5-1. Pig Skin Preparation Step

Pig skin was washed three times with tap water, washed three times with primary purified water, divided into 3 kg (20 cm×20 cm) and stored in a freezer at −20° C. The frozen pig skin was settled at 4° C. for 2 hours, thawed and finely cut in a size of 1.5 cm×8 cm. Thereafter, 7.5 L of 0.5 M acetic acid was added to the pig skin, followed by leaving overnight and observing swelling of the pig skin.

5-2. Fat Removal Step

The swollen pig skin was taken out, cut in a size of 1.5 cm×1.5 cm, and 7.5 L of 0.5M fresh acetic acid was added again. Then, after settling for several hours, only the dermis was filtered through a sieve. The dermis was washed with 10 L purified water. The washing process was repeated total five times. After adding 20 L of ethanol to the washed dermis, the mixture was stirred overnight at 4° C. After recovering the dermis only from the overnight stirred sample, 20 L of ethanol was added, followed by stirring again at 4° C. for 1 hour. The dermis was filtered using a sieve and settled for about 1 hour to remove ethanol. The dermis from which fat had been removed was subdivided into portions having an appropriate weight (500 g) and stored in a cryogenic freezer at −80° C.

5-3. Dermis Homogenization and Grinding 7.5 L of 0.5 M acetic acid was added to 3 kg frozen dermis thawed by leaving at 4° C., then settled for 30 minutes. After removing acetic acid by filtration using the sieve, the dermis was subdivided by 250 g portions. 250 g of dermis and 2 L of purified water were placed in a blender, followed by grinding for 2 minutes. Then, 2 L of purified water was further added, followed by grinding again for 2 minutes. 4 L of 0.73 M acetic acid was added to the ground tissues. The tissues were again ground for 3 minutes using a homogenizer. The grinding process was repeated four times to grind and blend 1 kg frozen dermis. Further, 18 L of 0.73 M acetic acid was added thereto, thereby adjusting the final acetic acid concentration to 0.5 M. Subsequently, it was confirmed that the pH was about 2.5 to 4. The mixture was stirred using a stirrer at a low speed for 3 hours.

5-4. Pepsin Treatment

15×10$^7$ units of pepsin per kg of dermis were added to the finished dermis sample, followed by gently stirring using a stirrer for 24 hours. 10 M NaOH was added to the pepsin-treated sample and stirred to reach pH 8 to 9, and further stirred for 10 minutes to inactivate the pepsin. After the inactivation of the pepsin by base treatment, 4 M HCl was added and stirred to reach pH 3.4, followed by further stirring for 10 minutes. After centrifugation of the sample using a centrifuge at 7800 rpm and 4° C. for 10 minutes, the fat on the supernatant surface was removed and the remaining supernatant was collected and stored.

5-5. Salting Out and Production of Atelocollagen Intermediate

5 M NaCl was slowly added to 1 L of the supernatant prepared from the dermis at a rate of 163 ml, stirred for 15 minutes, and then allowed to settle overnight at 4° C. for salting out. After salting out, the supernatant was removed by suction and the precipitate was centrifuged (7800 rpm, 4° C., 10 minutes) to completely remove the supernatant. 30 L ethanol was added to the precipitate and the mixture was washed while stirring overnight under a condition of 4° C. After centrifugation (7800 rpm, 4° C., 10 minutes), 30 L ethanol was added to the precipitate again, followed by stirring at 4° C. for 6 hours for second washing. After the centrifugation (7800 rpm, 4° C., 10 minutes), a weight of the precipitated atelocollagen intermediate was measured and subdivided and stored in a cryogenic freezer at −80° C.

5-6. Production of Medical Atelocollagen

After adding 2.8 L of 0.02 M urea to 200 g of atelocollagen intermediate, the mixture was stirred overnight. Diafiltration of atelocollagen was performed using Centramate (Tangential Flow Filtration System), and 0.5 M NaOH was added while stirring the recovered solution in a stirrer to reach pH7. The prepared neutral atelocollagen was thinly and flatly subdivided, followed by putting each subdivided portion in a zipper bag and storing the same in a cryogenic freezer at −80° C. After preliminary freezing (−40° C.) was performed in a lyophilizer for at least 1 hour, atelocollagen stored in the cryogenic freezer was moved to the lyophilizer and lyophilized. The lyophilized medical atelocollagen was cut in a suitable size and vacuum packed, followed by cold storage.

5-7. Preparation of an Atelocollagen Solution with Identified pH Neutrality by Substitution with Buffer Solution

5-7-1. Step of Dissolving Lyophilized Atelocollagen in a Sodium Acetate Buffer Solution (0.3 M Sodium Acetate (NaOAC), 45% Acetic Acid)

In order to prepare a 0.3 M NaOAC, 45% acetic acid buffer solution, 2.4 g of CH3CO2Na was dissolved in 55 ml of tertiary sterile water and 45 ml of acetic acid solution having 99% or higher purity. Then, the solution was titrated with acetic acid to reach pH 3.0 using a pH meter. 3 g of lyophilized atelocollagen was finely cut using sterile forceps and scissors, and the finely cut pieces were dissolved in 0.3 M NaOAC, 45% acetic acid solution. Specifically, the finely cut atelocollagen was slowly added to be completely dissolved while mixing the same with the solution by a stirring bar.

5-7-2. Dialysis Filtration Using a Tangential Flow Filter (TFF) System and Substitution of the Atelocollagen Solution with PBS 3% atelocollagen solution was pumped to enter the prepared TFF system using a pump as shown in the figure (through TFF 100 K), and the filtered sodium acetate buffer solution was transferred to a waste to be discarded, while the remaining solution was allowed to be returned to a reservoir through a retentate tube. 1×PBS buffer solution was added to the reservoir to maintain the 3.0% atelocollagen solution at a predetermined level, while dialysis filtration was continued. Specifically, dialysis filtration was continued using a PBS solution in a volume corresponding to 10 times of the initially prepared atelocollagen-sodium acetate buffer solution, thereby performing buffer exchange. When the buffer exchange was completed, the completion of the buffer exchange was confirmed by monitoring pH of the permeated solution so as to determine whether neutral pH is detected. After dialysis and filtration, 3% atelocollagen was aliquoted by 10 ml into sterilized tubes and stored in a refrigerator at 4° C.

Example 6. Production of Oligonucleotide Variant/Atelocollagen Composition

6-1. Preparation of Atelocollagen (AC) Dispersion 0.5%, 1.0%, 1.5%, 2.0% and 3.0% of high-purity medical atelocollagen (0.5 g, 1.0 g, 1.5 g, 2.0 g and 3.0 g of atelocollagen per 100 ml of buffer, respectively) were respectively placed in NaOAc/HAc solution (0.3 M sodium acetate, 45% acetic acid), maintained at pH 3.0 and completely dissolved while stirring. This solution was subjected to dialysis filtration using tangential flow filtration (TFF), and then, the atelocollagen solution was subjected to diafiltration with a 10-fold volume of 1×PBS solution, thereby preparing medical atelocollagen dispersion in PBS solution.

6-2. Production of IO101/Atelocollagen Sol-Gel Type and IO101L/Atelocollagen Sol-Gel Type After placing $(Gem)_2$-$[TGG]_4[TTG][TGG]_4$ (IO101) ((Gem)$_2$-SEQ ID NO: 10) or $(Gem)_2$-$[TGG]_4[TTG][TGG]_5$((Gem)$_2$-SEQ ID NO: 11) (IO101L) in PBS and completely dissolving the same by a mixer at room temperature, a solution in which IO101 or IO101L is mixed in PBS, was added thereto in an amount of 0.5 mg, 1.0 mg, 1.5 mg, 2.0 mg, 4.0 mg or 8.0 mg per 400 μl of atelocollagen dispersion (0.5%, 1.0%, 1.5%, 2.0%, 3.0%, respectively).

The above solution was mixed by a rotator cuff device at room temperature for 30 minutes to prepare a mixture. $(Gem)_2$-$[TGG]_4[TTG][TGG]_4$ ((Gem)$_2$-SEQ ID NO: 10) (IO101)/AC (sol-gel type) or $(Gem)_2$-$[TGG]_4[TTG][TGG]_5$ ((Gem)$_2$-SEQ ID NO: 11) (IO101L)/AC (sol-gel type), which are in a liquid state, may be solidified (gel) at 37° C. when directly injecting into a tumor in vivo. Further, as atelocollagen surrounding $(Gem)_2$-$[TGG][TTG][TGG]_4$ ((Gem)$_2$-SEQ ID NO: 10) (IO101) or $(Gem)_2$-$[TGG]_4[TTG][TGG]_5$ ((Gem)$_2$-SEQ ID NO: 11) (IO101L) is slowly dissolved, the drug is gradually released thus enabling effective tumor treatment.

6-3. Production of IO101/Atelocollagen Disk and IO101L/Atelocollagen Disk

The high-concentration collagen dispersion prepared above and $(Gem)_2$-$[TGG]_4[TTG][TGG]_4$ (IO101) ((Gem)$_2$-SEQ ID NO: 10) or $(Gem)_2$-$[TGG]_4[TTG][TGG]_5$ ((Gem)$_2$-SEQ ID NO: 11) (IO101L) were used to prepare a mixture in the same manner as the sol-gel type manufacturing method.

The prepared mixture was placed in a cylindrical silicone mold having a diameter of 1 cm and diffused to form a uniform film of 0.5 mm, followed by lyophilization at −80° C. The completely lyophilized sample was lyophilized again in a lyophilizer maintained at −70° C. for 30 hours to form a porous membrane. Hereinafter, the membrane prepared as described above is expressed as a disk or a patch.

Example 7. Assessment of Stability in Plasma of Oligonucleotide Variant/Atelocollagen Composition Gemcitabine and $(Gem)_x$-$[TGG]_m[TTG][TGG]_n$ in the plasma of rats, and gemcitabine and gemcitabine inactive metabolite, that is, dFdU released from the high-purity atelocollagen formulation were subjected to analysis of concentration. Sample treatment, calibration curve creation, and LC-MS/MS analysis conditions are the same as described above.

7-1. Assessment of (IO101L)/Atelocollagen Disk Stability in Rat Plasma

In order to assess the stability of gemcitabine/atelocollagen disk in plasma, the experiment was performed with 5 groups classified as listed in Table 12 below.

Gemcitabine/atelocollagen disks of group 2, group 3, group 4 and group 5 were added to 2 mL of rat plasma to reach a plasma concentration of 60 μg/ml, followed by incubation in a CO$_2$ incubator at 37° C. for 2 hours. Sample treatment was conducted as follows. After 2 hours, in order to remove collagen adhered to gemcitabine/atelocollagen disk in plasma, 500 μL of plasma containing gemcitabine was added to Ultracell-3K, followed by performing centrifugation at 15,000 rpm and 20° C. for 30 minutes. Thereafter, the supernatant was taken and then centrifuged again under the same conditions as above. Then, 5 μL of the concentrate was taken and diluted by 10-fold using the same rat plasma in order to measure a concentration in plasma ("plasma concentration"). A concentration of gemcitabine concentrated in an upper portion of Ultracell-3K and another concentration of gemcitabine in plasma filtered at a lower portion were measured. Further, a concentration of gemcitabine eluted from the disk after the incubation for 2 hours was also measured. The above sample treatment was conducted in the same manner as the calibration curve creation, followed by performing sample analysis under the same LC-MS/MS conditions.

As a result of analyzing gemcitabine (dFdC) and its metabolite, that is, dFdU in rat plasma, the minimum quantitation limit was 10 ng/mL. Further, in gemcitabine (dFdC) analysis, the measurement was conducted while giving a gradient to a mobile phase to prevent each peak from being affected, whereby gemcitabine (dFdC) has a retention time different from dFdU due to an occurrence of a cross-talk phenomenon, in which dFdU peaks are generated. Therefore, the retention times of gemcitabine and dFdU were measured as 2.1 minutes and 4.23 minutes, respectively. As a result of analyzing the standard plasma sample, all samples were determined to have accuracy within ±15%, such that the concentration of the sample as determined above was reliable (see Table 11 below).

TABLE 11

| Standard plasma sample (ng/mL) | Gemcitabine Concentration (ng/mL) | Accuracy (%) | dFdU Concentration (ng/mL) | Accuracy (%) |
| --- | --- | --- | --- | --- |
| DOUBLE BLANK | 696 | N/A | 461 | N/A |
| ZERO BLANK | <0 | N/A | 0.949 | N/A |
| 10 | 9.75 | 97.5 | 9.93 | 99.3 |
| 20 | 20.1 | 100 | 21 | 105 |
| 40 | 43 | 107 | 38.7 | 96.8 |
| 100 | 104 | 104 | 89.9 | 89.9 |
| 500 | 508 | 102 | 464 | 92.9 |
| 1000 | 1040 | 104 | 1020 | 102 |
| 2500 | 2150 | 86 | 2850 | 114 |

7-2. Assessment of In Vivo Stability of (IO101L)/Atelocollagen Disk

In order to evaluate the stability of the IO101L/atelocollagen disk formulation in rat plasma, experiments were conducted with 5 groups (Groups 1-5) (see Table 12 below). Normal collagen (SK Co.) was used for comparison with atelocollagen.

TABLE 12

| Group 1 | Group 2 | Group 3 | Group 4 | Group 5 |
| --- | --- | --- | --- | --- |
| Gemcitabine 20 mM | gem + 2.0% atelocollagen Disk | gem + 2.0% collagen Disk | Io101L + 2.0% atelocollagen Disk | Io101L + 2.0% collagen Disk |

As a result of incubation in a CO2 incubator for 2 hours, the concentration of gemcitabine in the gemcitabine/atelocollagen disk groups 2 and 3 was low unlike group 1 in a stock state. Groups 4 and 5 as $(Gem)_2$-$[TGG]_4[TTG][TGG]_5$((Gem)$_2$-SEQ ID NO: 11)/atelocollagen disk formulations were determined to have lower concentration than groups 2 and 3 containing collagen alone. As a result of preliminary experiments, it could be seen that a release rate of the IO101L/atelocollagen disk formulation in rat plasma was stable and sustained. Further, the formulation bound with atelocollagen showed that a metabolism rate of gemcitabine into 2',2'-difluorodeoxyuridine as an inactive metabolite of gemcitabine was considerably low (see Table 13 below).

TABLE 13

| Analysis target | dFdC Blood concentration (μg/mL) | dFdU Blood concentration (μg/mL) | dFdU/dFdC ratio |
| --- | --- | --- | --- |
| Group 1 | 218 | 0.276 | 0.13 |
| Group 2 | 99 | 0.025 | 0.03 |
| Group 3 | 76.5 | 0.024 | 0.03 |
| Group 4 | 2.825 | 0.010 | 0.35 |
| Group 5 | 1.02 | 0.010 | 0.94 |
| Supernatant of group 1 | 232 | 0.596 | 0.26 |
| Supernatant of group 2 | 130.5 | 0.067 | 0.05 |
| Supernatant of group 3 | 133 | 0.051 | 0.04 |
| Supernatant of group 4 | 23.1 | 0.010 | 0.04 |
| Supernatant of group 5 | 9.8 | 0.011 | 0.11 |

Example 8. Assessment of Anti-Cancer Efficacy of Oligonucleotide Variant/Atelocollagen Composition

8-1. Anticancer Efficacy of IO101/Atelocollagen (Sol-Gel Type) Using Subcutaneous Pancreatic Cancer Animal Model Pancreatic cancer treatment effects of IO101/Atelocollagen (sol-gel type) were verified using a subcutaneous pancreatic cancer animal model implanted with pancreatic cancer cell lines.

8-1-1. Evaluation of Anticancer Efficacy to IO101 Content

It was confirmed that IO101/Atelocollagen (sol-gel type) was superior over gemcitabine/atelocollagen (sol-gel type) in terms of pancreatic cancer inhibitory efficacy. In order to respond to different clinical situations, a sol type drug for topical injection treatment was used. After the injection, treatment effects were verified by determining a change in tumor size and histochemical variations.

In other words, after pancreatic cancer cell line Capan-1 cells were cultured in a recommended medium (RPMI, 10% FBX, 1% AA), $1 \times 10^6$ cells were injected subcutaneously into a nude mouse. The tumor size was measured with a caliper, and a mouse having the tumor size reaching a diameter of 0.5 cm was selected as a treatment target. For statistical analysis, medical efficacy was evaluated from 5 or more mice per group. After directly injecting IO101/Atelocollagen (sol-gel type) into the tumor, a size of the tumor was measured to determine treatment effects. At the end of 30 days of treatment, the animals were sacrificed and tumors were removed to determine treatment effects.

Figure 10:
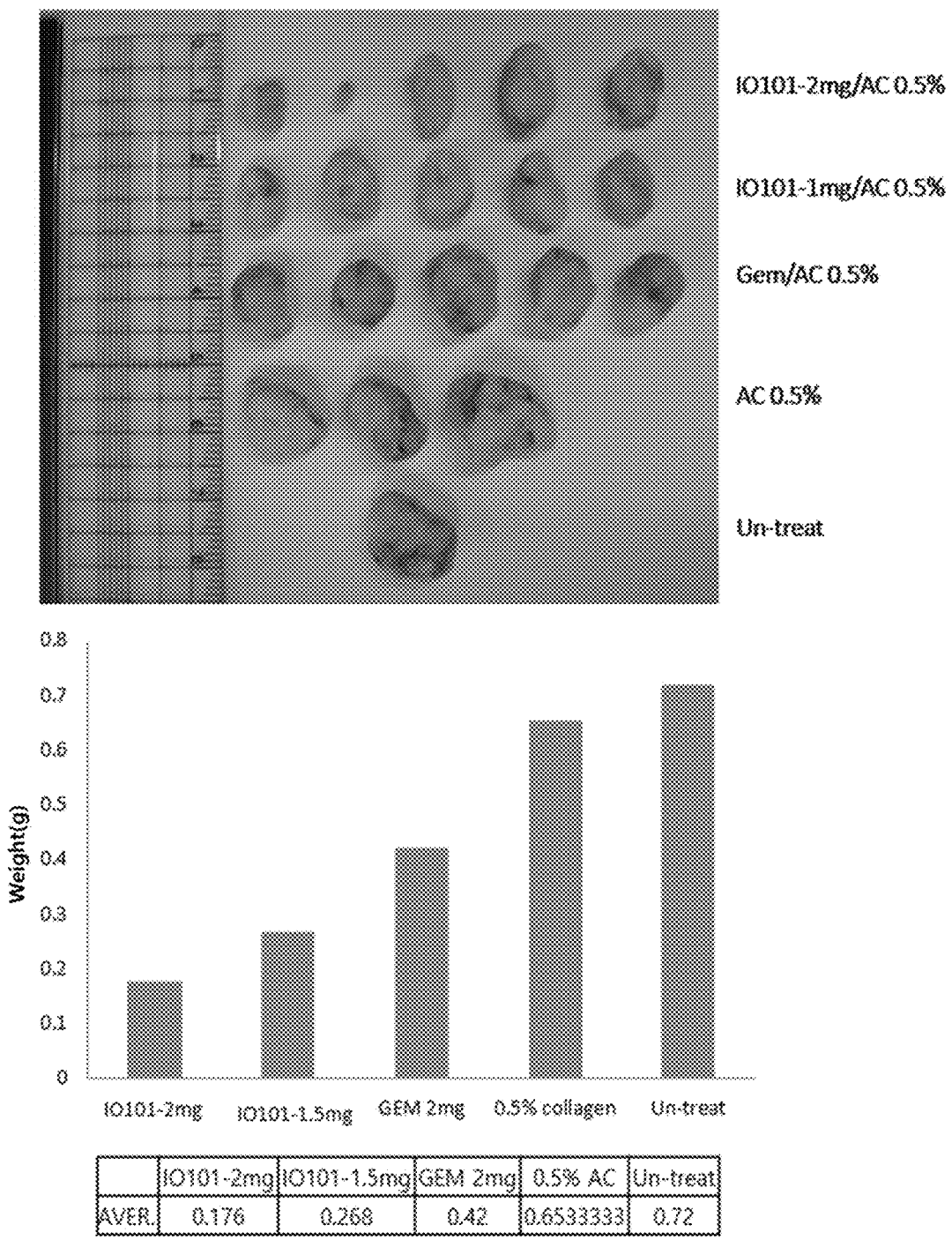
FIG. 10 shows the result of determining a size of tumor 30 days after injection of sol-gel type IO101-0.5 mg/AC (Atellocollagen), IO101-1.0 mg/AC, IO101-1.5 mg/AC and IO101-2.0 mg/AC, respectively, into mice with subcutaneous pancreatic cancer.
Figure 11:
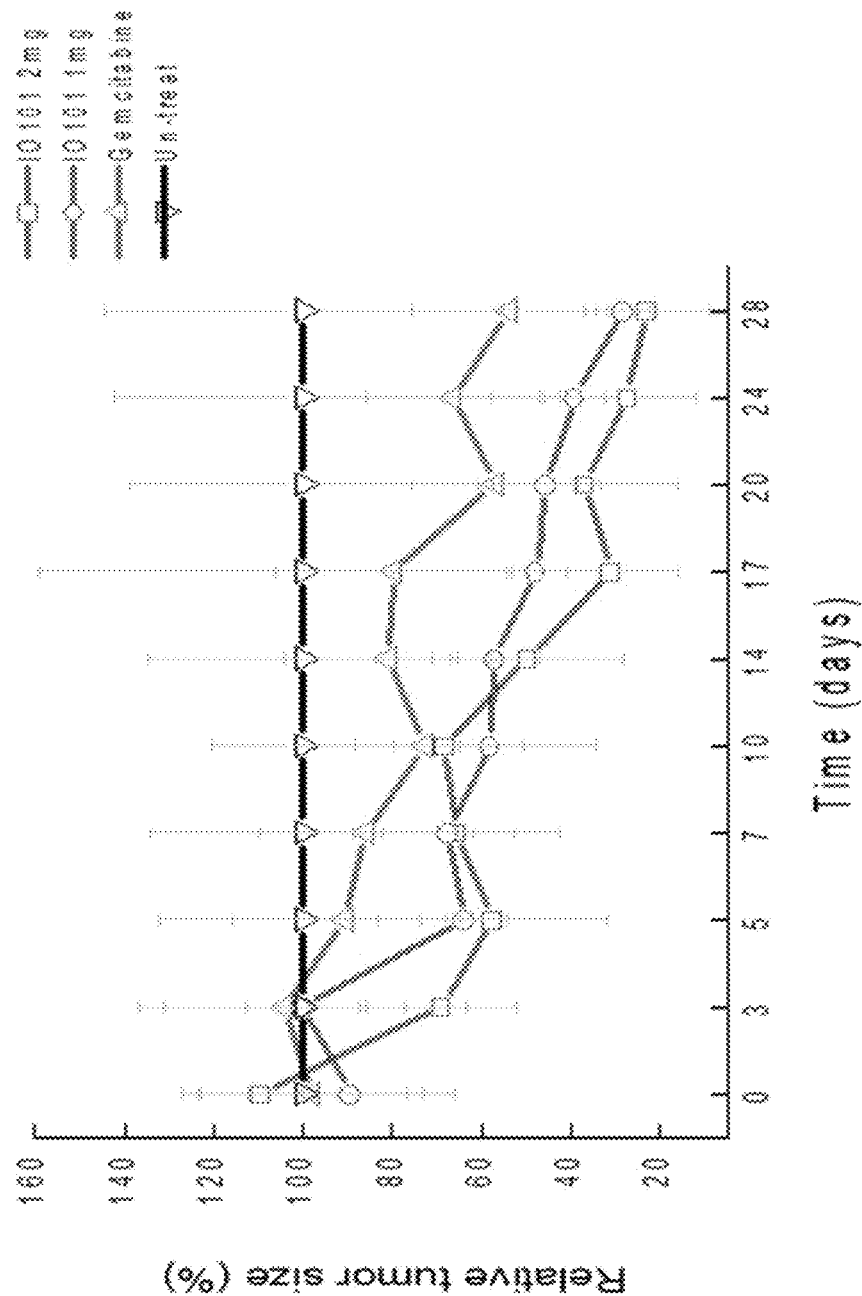
FIG. 11 illustrates a relative change in a tumor size for 30 days after injection of sol-gel type IO101-1.0 mg/AC and IO101-2.0 mg/AC, respectively, into mice with subcutaneous pancreatic cancer.

By mixing 0.5 mg, 1.0 mg, 1.5 mg and 2.0 mg of IO101 dispersion with the atelocollagen dispersion per 400 μL thereof, respectively, IO101/Atelocollagen (sol-gel type) formulations with different doses (IO101-0.5 mg/AC, IO101-1.0 mg/AC, IO101-1.5 mg/AC and IO101-2.0 mg/AC) were subcutaneously injected into mice with pancreatic cancer, followed by extraction of tumors 30 days later and then comparison of size. It was confirmed that tumors were best suppressed at IO101-2 mg/AC (sol-gel type) (see FIGS. 10 and 11).

8-1-2. Assessment of Anticancer Efficacy to Atelocollagen Concentration

Figure 12:
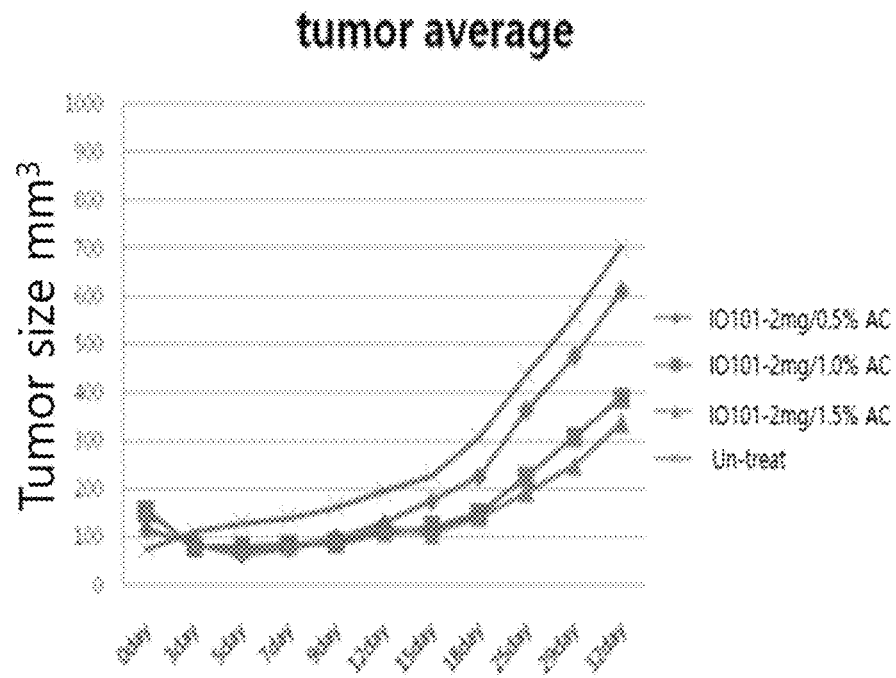
FIG. 12 shows results of confirming anti-cancer treatment effects by altering the concentration of atelocollagen while fixing the dose of IO101 at 2 mg.
Figure 12:
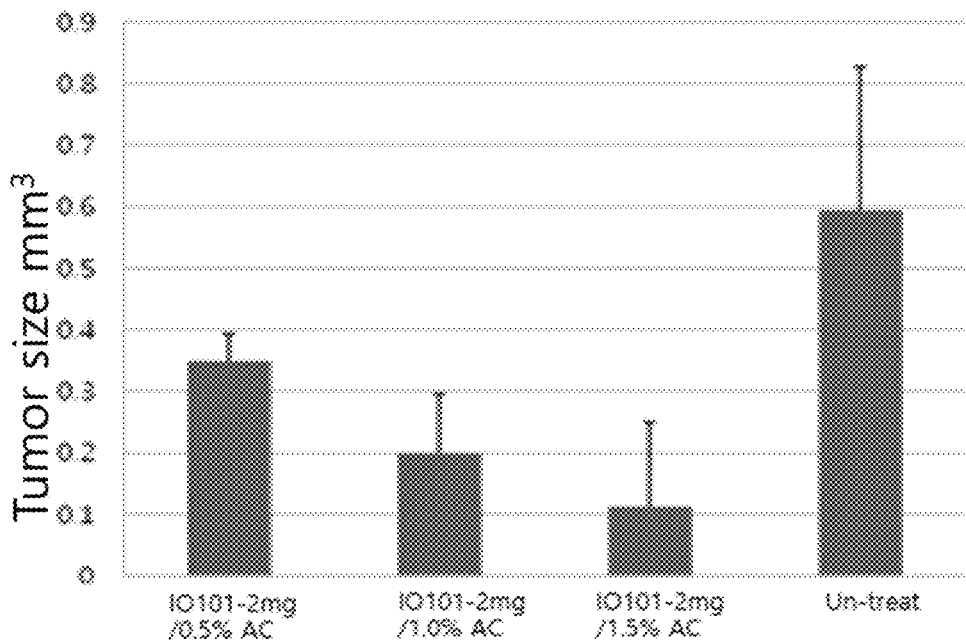

After subcutaneous injection of IO101/Atelocollagen (sol-gel type), a weight loss and toxicity of the animals were evaluated so as to set the dose of IO101 to 2 mg per 400 μL of the atelocollagen dispersion. Since a duration of the drug and therapeutic effects thereof may vary depending on the concentration of atelocollagen (AC), comparative experiments were conducted in regard to atelocollagen at a concentration of 0.5%, 1.0%, and 1.5% (g number per 100 ml of buffer), respectively. It was confirmed that the therapeutic effects were highest in mice with subcutaneous pancreatic cancer when 1.5% concentration (g number per 100 ml buffer) of atelocollagen was used (see FIG. 12).

Figure 13:
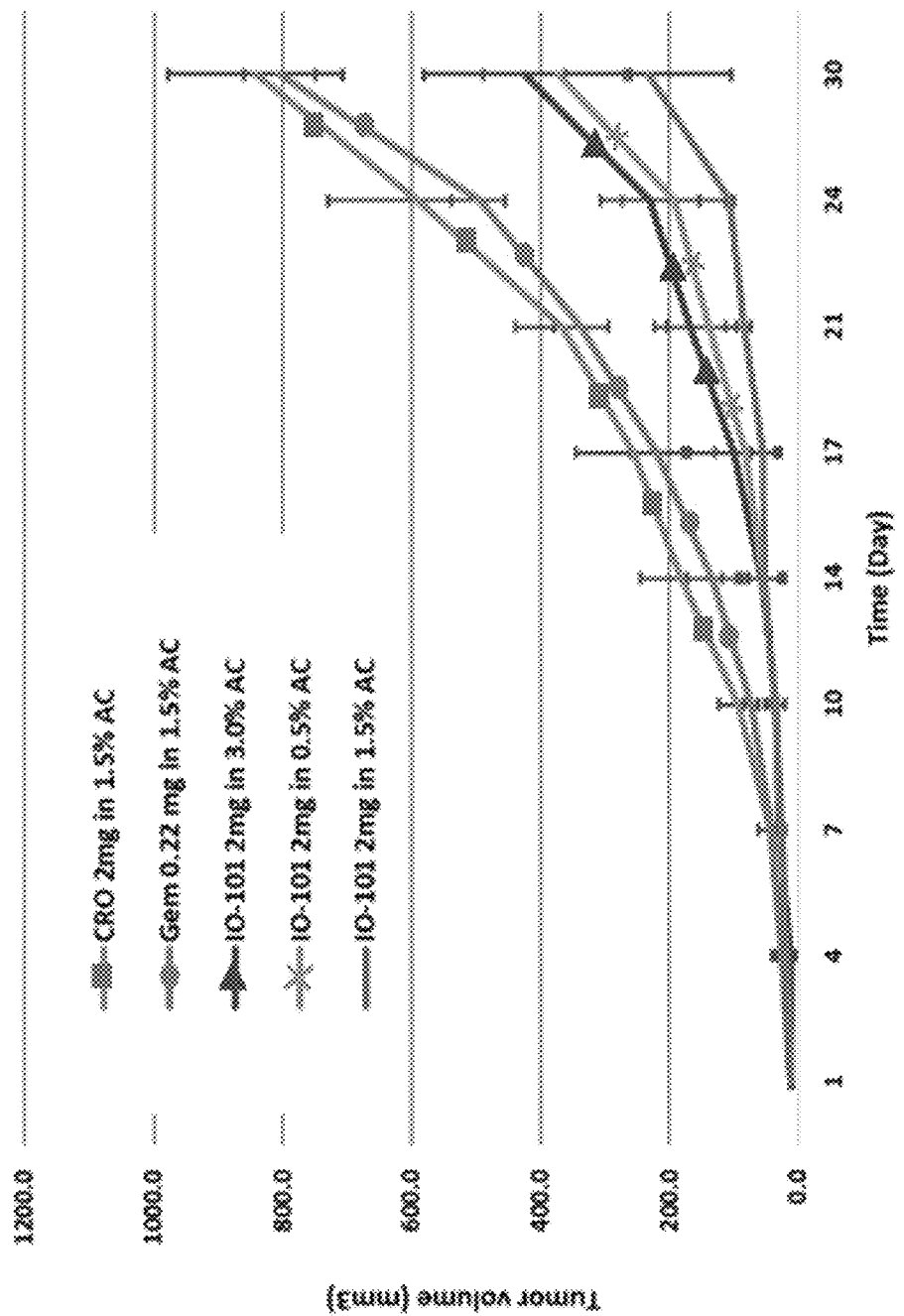
FIG. 13 illustrates a graph of change in a pancreatic cancer tumor size of mice after implantation of IO101/AC disk.
Figure 14:
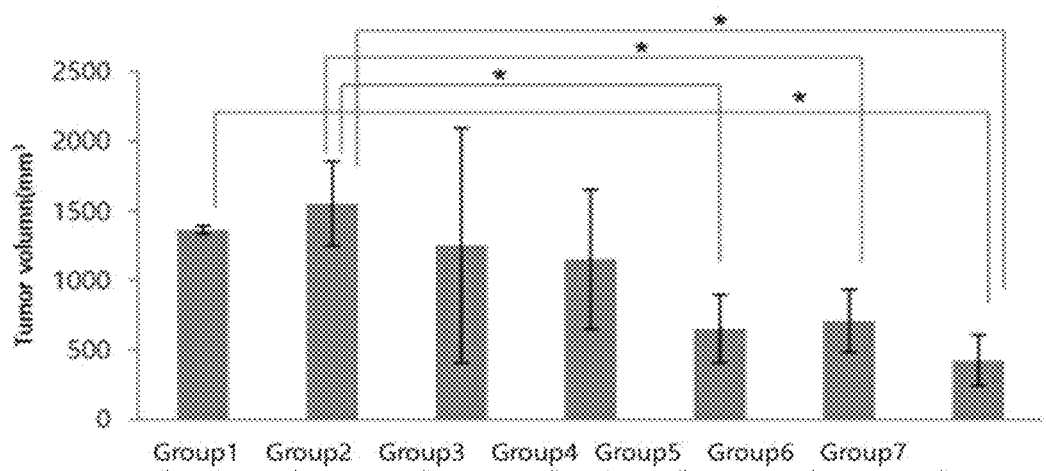
FIG. 14 shows the pancreatic cancer tumor size of mice after implantation of IO101/AC disk.
Figure 14:
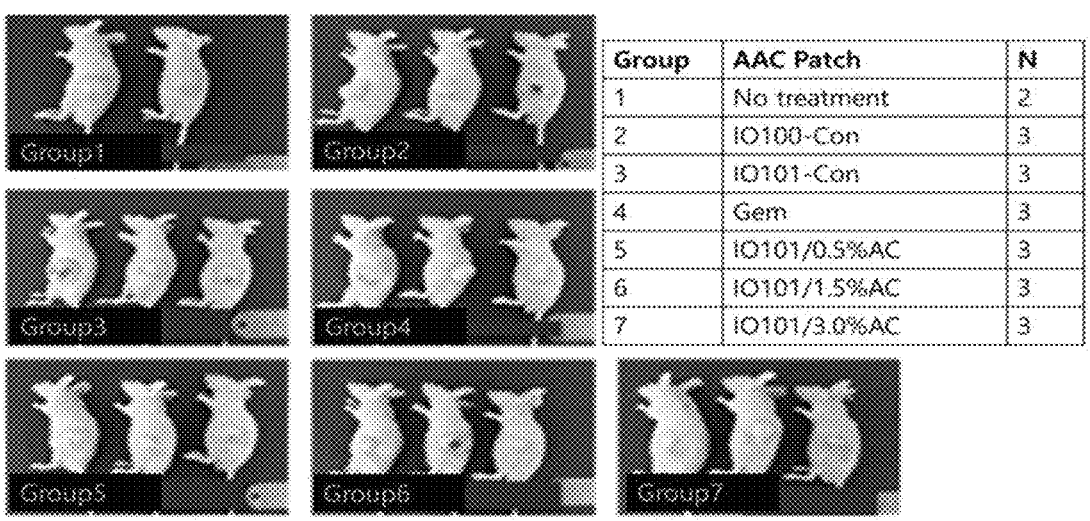
Figure 14:
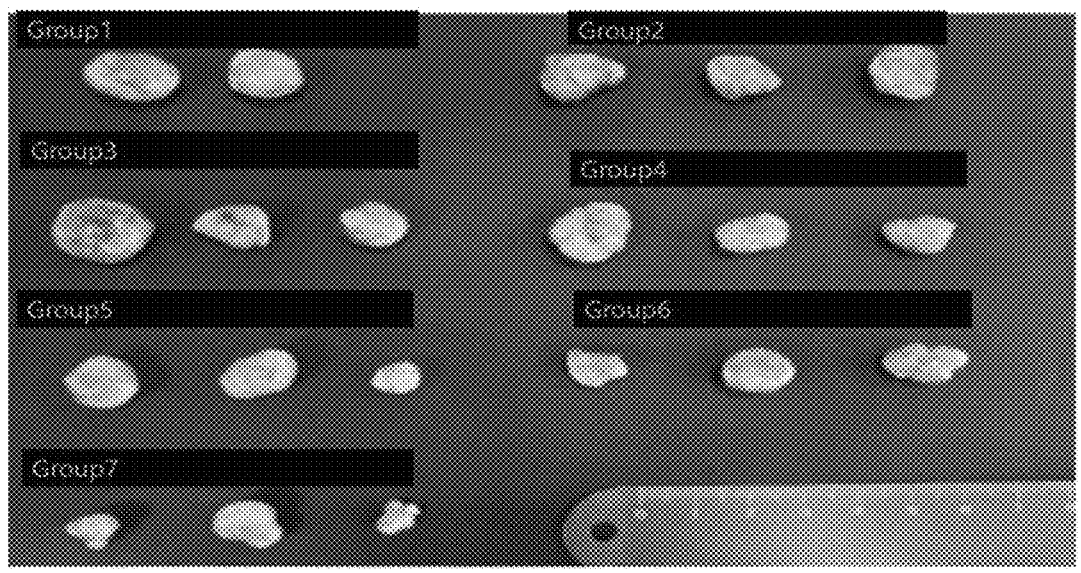

8-2. In Vivo Anti-Cancer Efficacy of IO101/Atelocollagen (Disk) in Subcutaneous Pancreatic Cancer Cell Line Transplantation Animal Pancreatic cancer cell line, BXPC3, was subcutaneously transplanted in BALB/C nude mouse by $2 \times 10^6$ cells. Three days later, 3 disks were implanted per group on the tumor. After the transplantation, the tumor volume of the mouse was measured twice a week for 30 days using a caliper at 2×0.5 (long axis×short axis), and the weight was measured twice a week. It could be seen that IO101/AC disk better suppressed pancreatic cancer than other groups. After the disk implantation, the tumor size was observed in POD30 mouse image. It could be visually confirmed that the IO101/AC disk has a smaller tumor volume than other groups. In fact, the IO101/AC disk was found to be considerably small in tumor volume, and especially, the IO101-2 mg/1.5 to 3.0% AC groups had the smallest tumor volume (see FIGS. 13 and 14).

Figure 15:
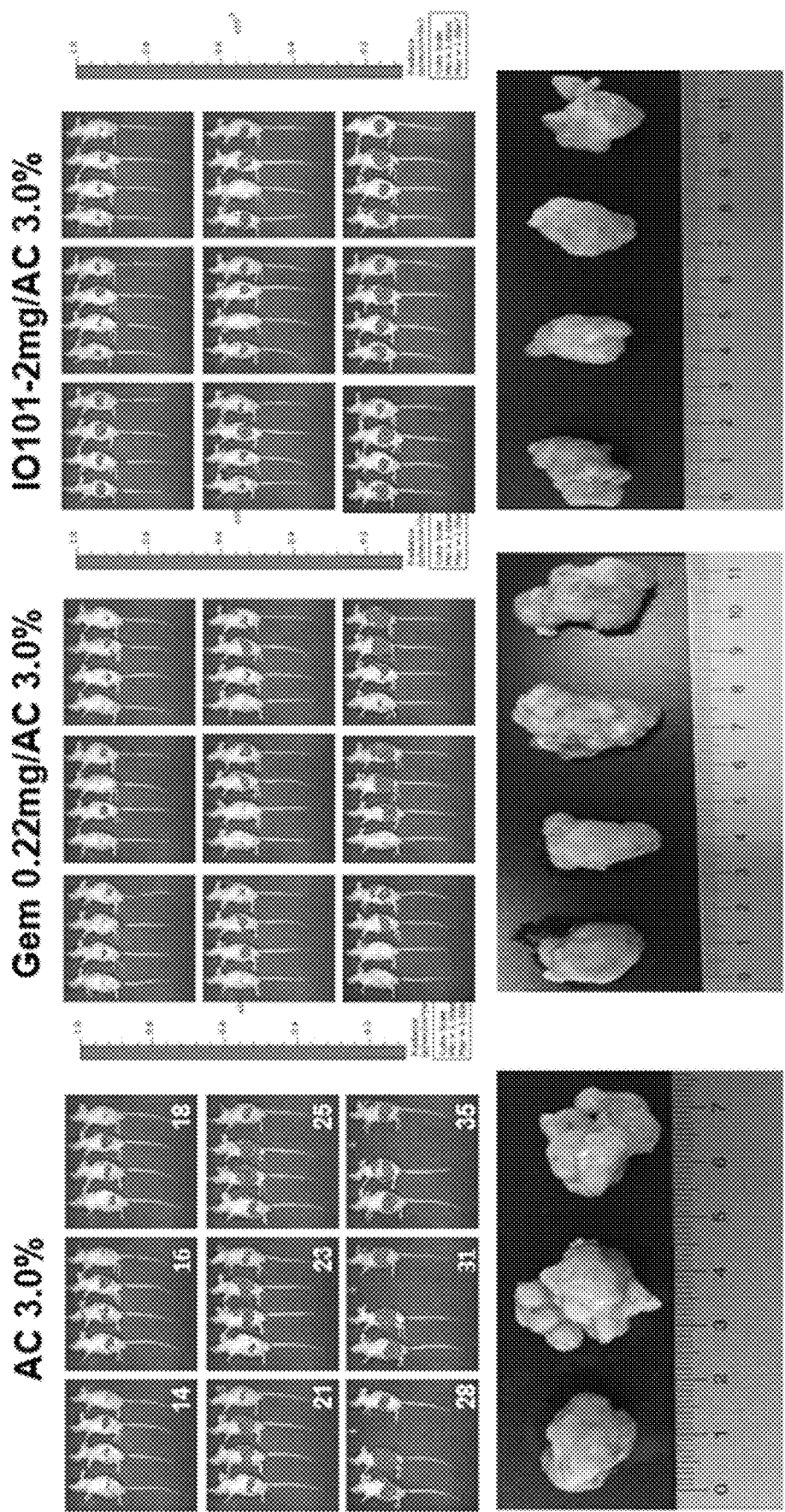
FIG. 15 shows results of measuring the pancreatic cancer tumor size over time after implantation of IO101/AC disk.
Figure 16:
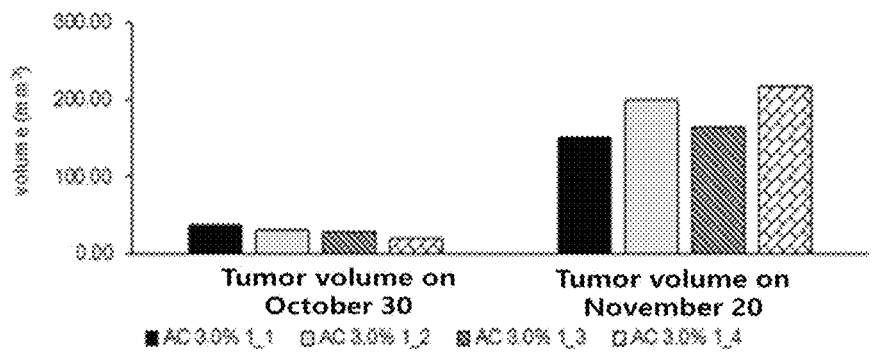
FIG. 16 illustrates a graph of comparing tumor sizes before and after implantation of IO101/AC disk and Gem/AC disk, respectively.
Figure 16:
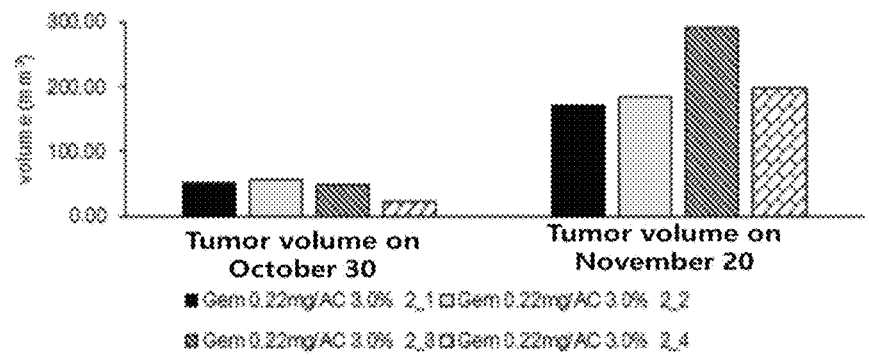
Figure 16:
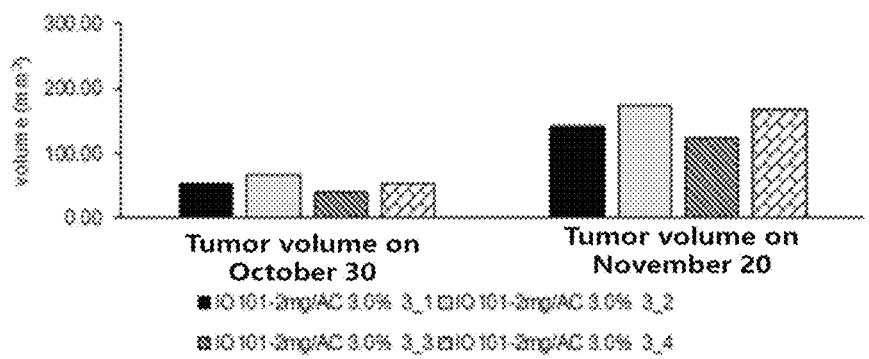

8-3. Pancreatic Cancer Treatment Efficacy of IO101/Atelocollagen (Disk) in Orthotopic Xenograft Pancreatic Cancer Mouse Model $5 \times 10^5$ BxPC3 cancer cell lines that express luciferase by substitution of a specific vector, as well as saline were injected into pancreas of Balb/c-nude mice (male, 6 weeks old, 30 animals). At 2 weeks when the pancreatic cancer mouse model was constructed, luciferase imaging was conducted to confirm tumors. In order to reduce auto-fluorescence, a non-fluorescent feed was provided 1 week before imaging. IO101/AC disk and comparative drugs were inserted intraperitoneally (intra-abdominal cavity insertion using surgery). Immediately after the construction of model, luciferase imaging was conducted to measure tumor and tumor size by means of in-vivo IVIS spectrum instrument. Using IVIS spectrum instrument, the luciferase imaging was conducted by time (6th, 18th, 21th, 23th, 25th, 28th, 31th, and 35th days). After the last in-vivo IVIS spectrum imaging, animals were sacrificed to perform ex-vivo measurement for each organ (spleen, liver, heart, lung, kidney and pancreas including tumors). Sizes of the extracted tumors were measured and compared by a caliper. A change in the tumor size was monitored over time by luciferase imaging immediately after inserting the disk drug into the experimental animal. Further, a variation in luciferase imaging was determined as described below using IVIS spectrum (see FIG. 15). The actual size of the tumor was ex-vivo measured after sacrifice of the experimental animal. Table 14 below enumerates the actual size change in the extracted tumors, which is graphically shown in FIG. 16.

TABLE 14

| GROUP | NO. | 2017 Oct. 30 long | 2017 Oct. 30 short | 2017 Nov. 20 Long | 2017 Nov. 20 short | Start measure data Volume(mm³) | End measure data Volume(mm³) |
|---|---|---|---|---|---|---|---|
| AC 3.0% | 1_1 | 7.00 | 5.20 | 12.50 | 12.00 | 36.40 | 150.00 |
|  | 1_2 | 5.50 | 5.50 | 17.00 | 11.70 | 30.25 | 198.90 |
|  | 1_3 | 5.60 | 5.20 | 13.64 | 11.94 | 29.12 | 162.86 |
|  | 1_4 | 4.40 | 4.40 | 17.40 | 12.40 | 19.36 | 215.76 |
| Gem 0.22 mg/AC 3.0% | 2_1 | 7.10 | 7.10 | 15.60 | 11.00 | 50.41 | 171.60 |
|  | 2_2 | 7.50 | 7.50 | 14.50 | 12.70 | 56.25 | 184.15 |
|  | 2_3 | 7.00 | 7.00 | 22.00 | 13.20 | 49.00 | 290.40 |
|  | 2_4 | 4.80 | 4.80 | 16.00 | 12.30 | 23.04 | 196.80 |
| IO101-2 mg/AC 3.0% | 3_1 | 7.30 | 7.30 | 15.00 | 9.50 | 53.29 | 142.50 |
|  | 3_2 | 8.20 | 8.20 | 13.30 | 13.00 | 67.24 | 172.90 |
|  | 3_3 | 6.30 | 6.30 | 11.70 | 10.60 | 39.69 | 124.02 |
|  | 3_4 | 7.30 | 7.30 | 15.80 | 10.60 | 53.29 | 167.48 |

Figure 17:
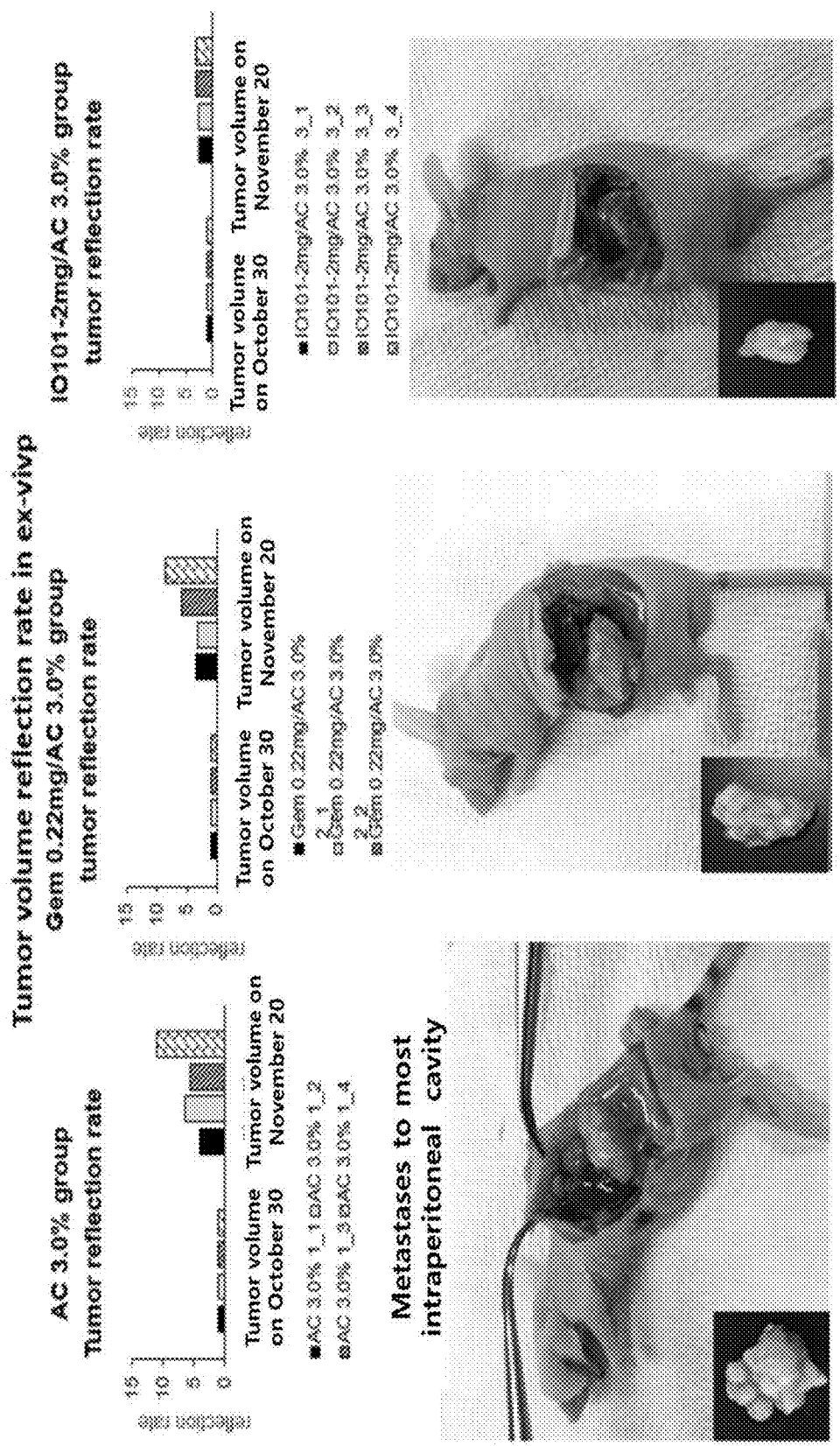
FIG. 17 shows observation and comparison of tumor suppression and intraperitoneal metastasis in regard to pancreatic cancer between IO101/AC disk and Gem/AC disk, respectively.

In addition, with regard to the group implanted with AC disk alone, it was confirmed that the tumor had a larger size than other groups and progressed to most intraperitoneal metastatic cancers. The liver, spleen, and kidney showed the most metastasis, and it was confirmed that the tumor was spread throughout all organs in the abdominal cavity. Even in the group implanted with the Gem/AC disk, there was no significant difference in the tumor size as compared to the AC disk group, and intraperitoneal metastasis was confirmed. In the IO101/AC disk, an increase in the tumor size was suppressed, while the Gem/AC disk and AC disk implants were observed to be mostly transferred to the intraperitoneal liver and diaphragm. However, the IO101/AC disk did not show intraperitoneal cancer metastasis (see FIG. 17).

Figure 18:
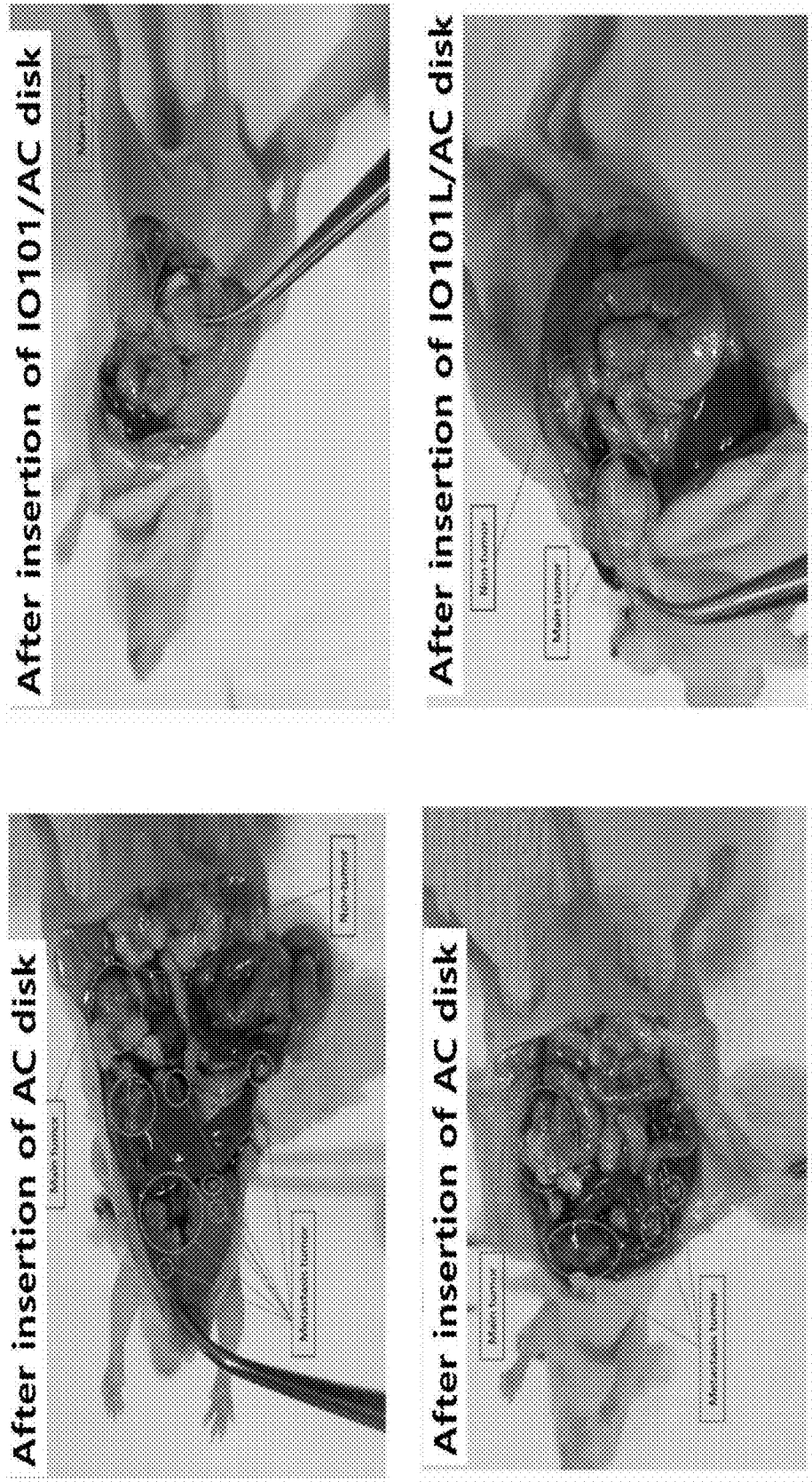
FIG. 18 shows effects of inhibiting intraperitoneal metastasis of pancreatic cancer after implantation of IO101/AC and IO101L/AC disk, respectively.

8-4. Pancreatic Cancer Metastasis Inhibitory Efficacy of IO101/Atelocollagen (Disk) and IO101L/Atelocollagen (Disk) in Orthotopic Xenograft Pancreatic Cancer Mouse Model $5 \times 10^5$ BxPC3 cancer cell lines that express luciferase by substitution of a specific vector, as well as saline were injected into pancreas of Balb/c-nude mice (male, 6 weeks old, 30 animals). At 2 weeks when the pancreatic cancer mouse model was constructed, luciferase imaging was conducted to confirm tumors. In order to reduce auto-fluorescence, a non-fluorescent feed was provided 1 week before imaging. IO101/AC disk and comparative drugs were inserted intraperitoneally (intra-abdominal cavity insertion using surgery). Immediately after the construction of model, luciferase imaging was conducted to measure tumor and tumor size by means of in-vivo IVIS spectrum instrument. Using IVIS spectrum instrument, the luciferase imaging was conducted by time (6th, 18th, 21th, 23th, 25th, 28th, 31th, and 35th days). After the last in-vivo IVIS spectrum imaging, animals were sacrificed to perform ex-vivo measurement for each organ (spleen, liver, heart, lung, kidney and pancreas including tumors). Whether the organs have intra-peritoneal metastasis was observed. Specifically, it was observed that AC disk was mostly transferred to the liver, kidney and/or diaphragm within the abdominal cavity. However, intraperitoneal cancer metastasis was not observed in IO101/AC disk and IO101L/AC disk (see FIG. 18).

8-5. Change in Survival Rate after Implantation of IO101L/Atelocollagen (Disk)

Figure 19:
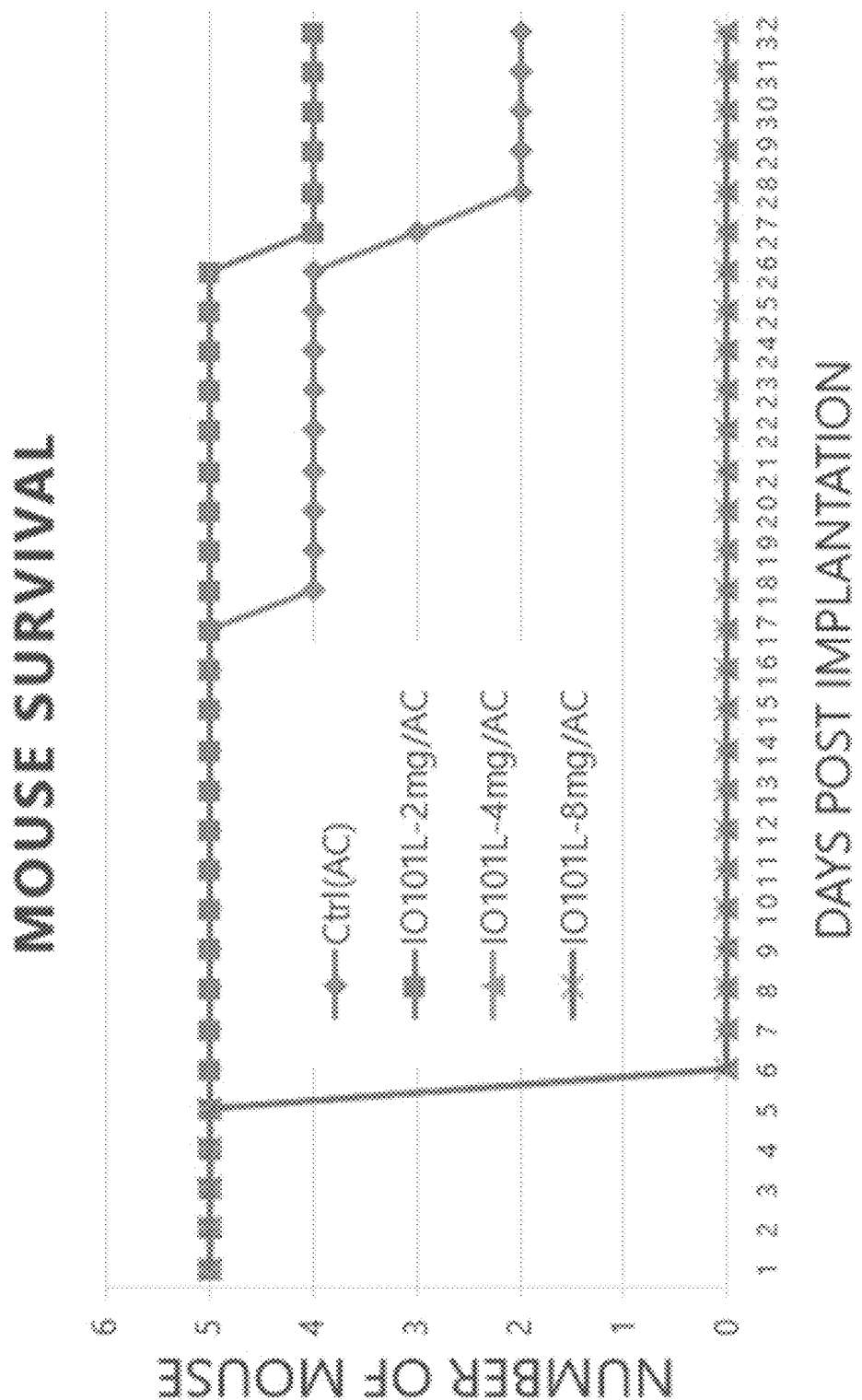
FIG. 19 illustrates a change in a survival rate of mice after implantation of IO101L/AC disk.

In the orthotopic mouse model of pancreatic cancer, the survival rate by concentration after IO101L/AC disk implantation was compared. After the transplantation of AC disk alone, 2 of 5 animals were survived after 32 days. Further, in the case of IO101L-2 mg (mixed with IO101L 2 mg per 400 µL atelocollagen dispersion)/AC disk implantation, 4 of 5 animals were survived till 32 days. Further, in the case of IO101L-4 mg (IO101L 4 mg mixed per 400 µL atelocollagen dispersion)/AC disk and IO101L-8 mg (IO101L 8 mg mixed per 400 µL atelocollagen dispersion)/AC disk, all 5 animals died on day 6 (see FIG. 19).

Figure 20:
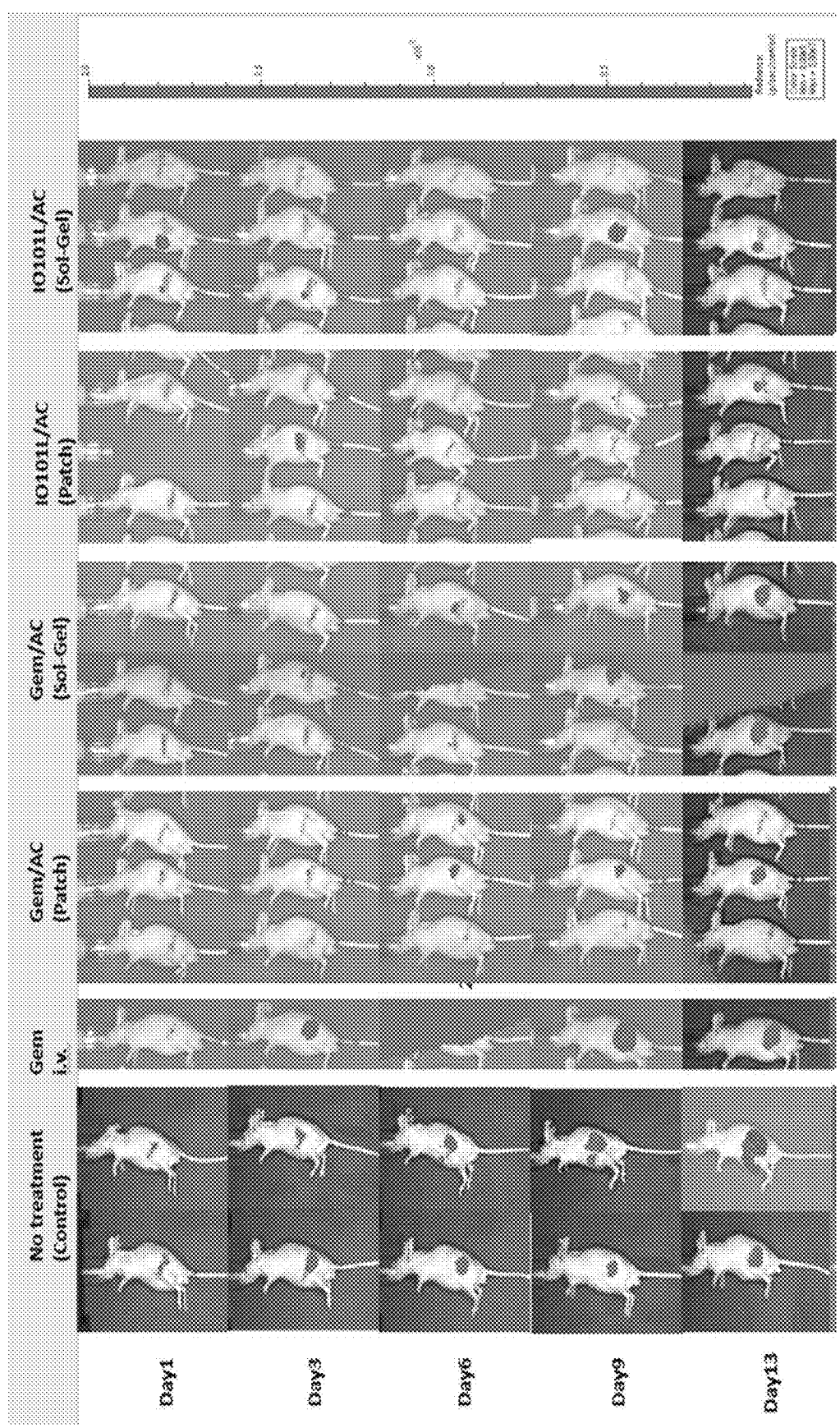
FIG. 20 shows tumor inhibitory effects or metastasis suppression effects after removal of residual tumor and then implantation of IO101L/AC sol-gel type or insertion of dick in a pancreatic cancer orthotopic mouse model.

8-6. Tumor Inhibitory Effect and Metastasis Suppression Effect of IO101L/Atelocollagen (Sol-Gel Type) and IO101L/Atelocollagen (Disk) after Removal of Residual Cancer in Orthotopic Xenograft Pancreatic Cancer Mouse Model 8-6-1. BxPC3 Pancreatic Cancer Transplant Mouse Experiment After removal of the tumor by surgical operation in the orthotopic pancreatic cancer mouse, IO101L/AC sol-gel type or IO101L/AC disk drugs were inserted, followed by performing observation to confirm whether residual tumors were inhibited and metastasis to other organs in the abdominal cavity was suppressed. Specifically, $5 \times 10^5$ BxPC3 cancer cell line (25 µL) that expresses luciferase by substituting a specific vector in Balb/c-nude mice (male, 6 weeks old, 21 animals) was prepared. A pancreas was taken out by cutting the abdominal region of an intraperitoneally anesthetized mouse, followed by injection of BxPC-3-Luc cells into the prepared pancreas. At 2 weeks when the pancreatic cancer mouse model was constructed, luciferase imaging was conducted to confirm tumors. The tumor cell line used herein was BxPC-3-Luc cells that express luciferase by substituting a specific vector in the BxPC3 cell, and the tumor was measured using luciferin. In order to reduce auto-fluorescence, a non-fluorescent feed was provided 1 week before imaging. After removing the pancreatic cancer by incising the abdominal region of an intraperitoneally-anesthetized mouse, IO101L/AC sol-gel type, IO101L/AC disk, Gem/atelocollagen sol-gel or Gem/atelocollagen disk was transplanted to the remaining tumor site (Intra-Abdominal cavity insertion using surgery). A tumor size and metastasis were confirmed by luciferase imaging, and results thereof are shown in FIG. 20.

8-6-2. Capan-1 Pancreatic Cancer Transplant Mouse Experiment

Figure 21:
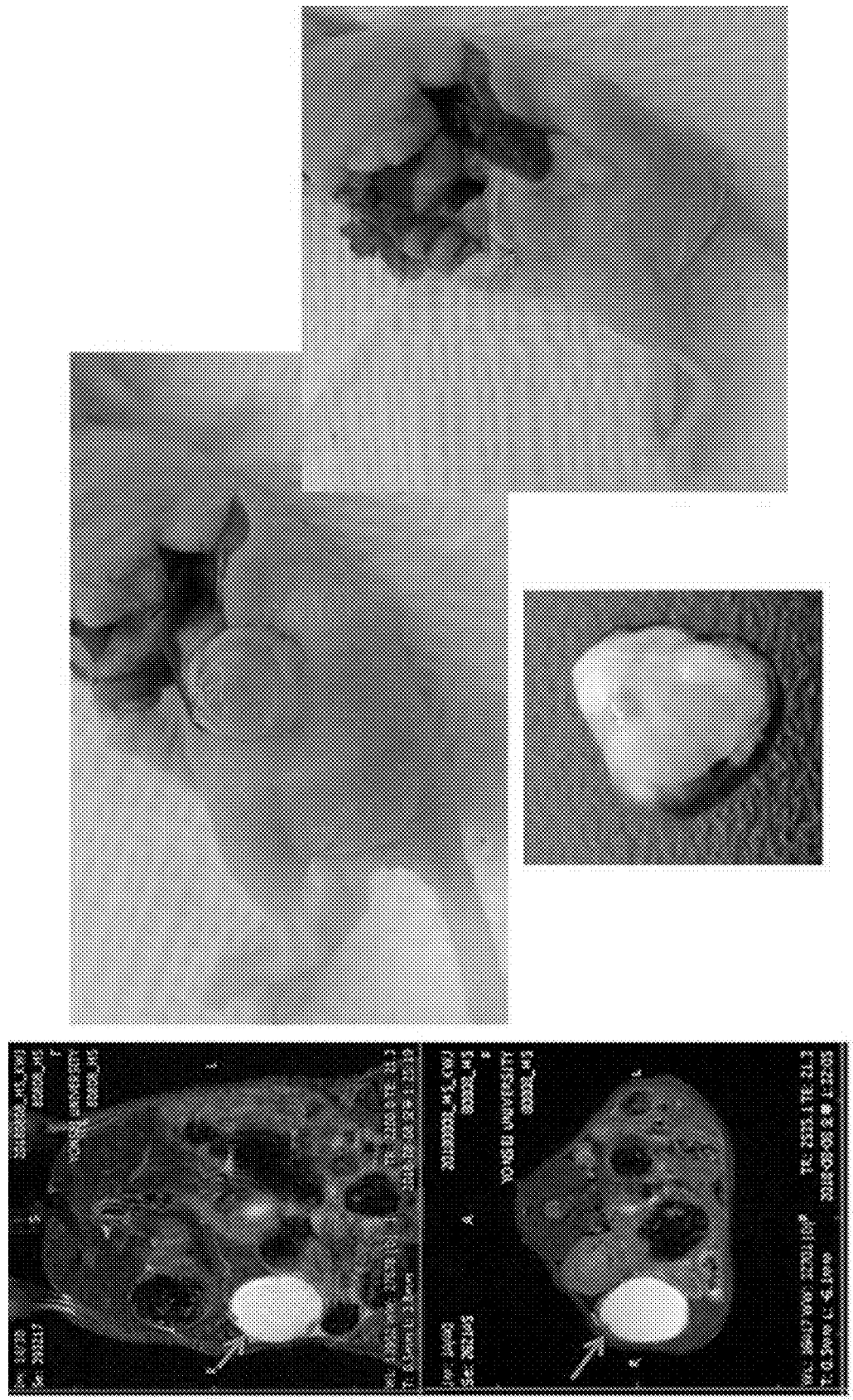
FIG. 21 illustrates a process for preparation of a Capan-1 pancreatic cancer mouse model.

When a mouse ordered for the production of a pancreatic cancer orthotopic mouse model is provided, a term of 1 week is held for acclimation. During the acclimation period, capan-1 cells were prepared at $1 \times 10^6$ cells/100 µl. The mouse skin was opened by 2 mm, the spleen was tucked up and the above cells were injected directly into the pancreas with a syringe. After 4 weeks, it was confirmed that the tumor has a diameter of 5 to 6 mm by MRI. When the cancer cell diameter was determined to be 5 to 6 mm, the abdomen was opened and then the pancreatic cancer was removed as much as possible. After removal, the IO101L/AC disk and the atelocollagen disk (control) were inserted in the remaining cancer portions and sealed (see FIG. 21).

Figure 22:
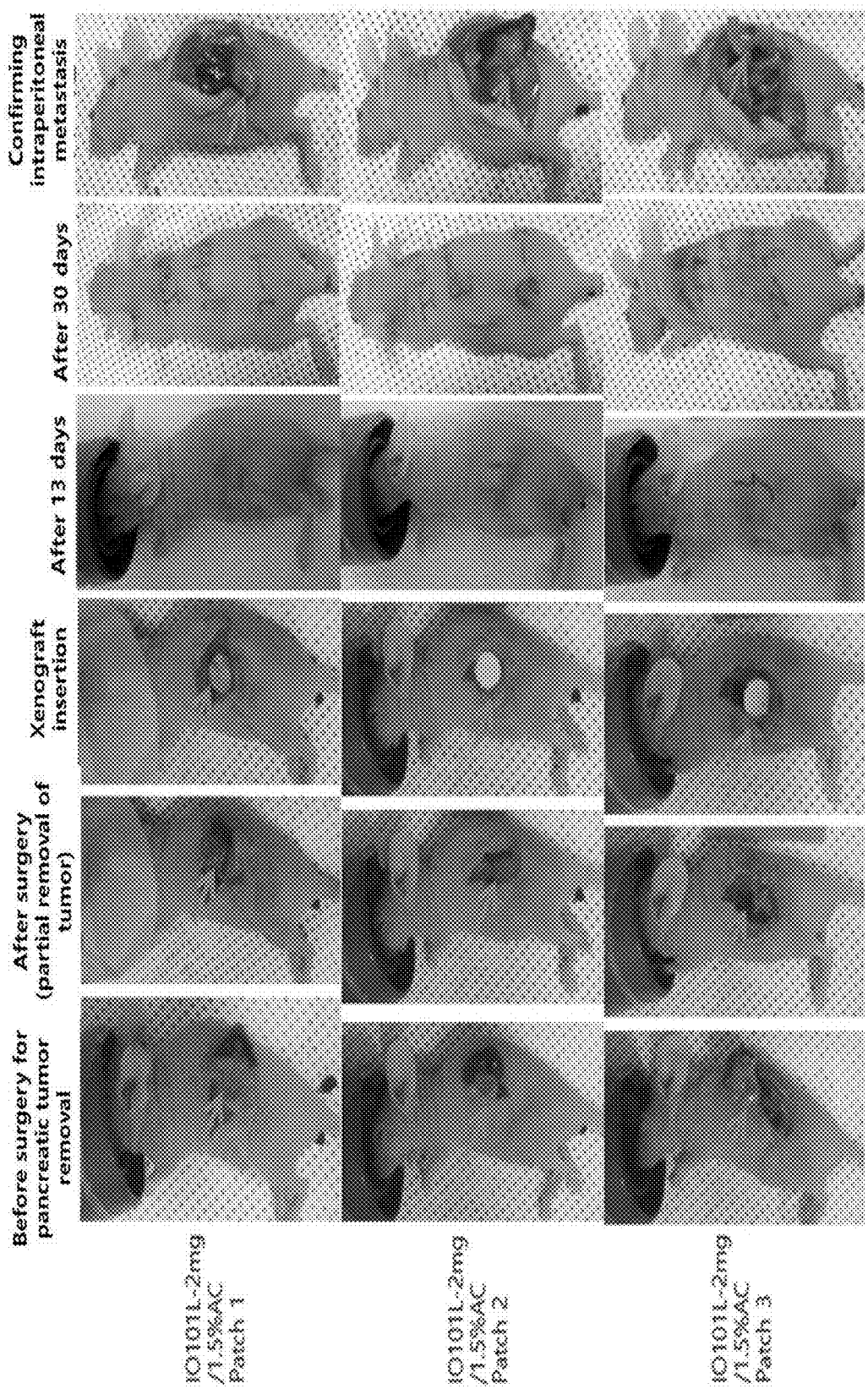
FIG. 22 shows effects of suppressing intraperitoneal metastasis 1 month after implantation of IO101L/AC disk in the Capan-1 pancreatic cancer mouse model.
Figure 23:
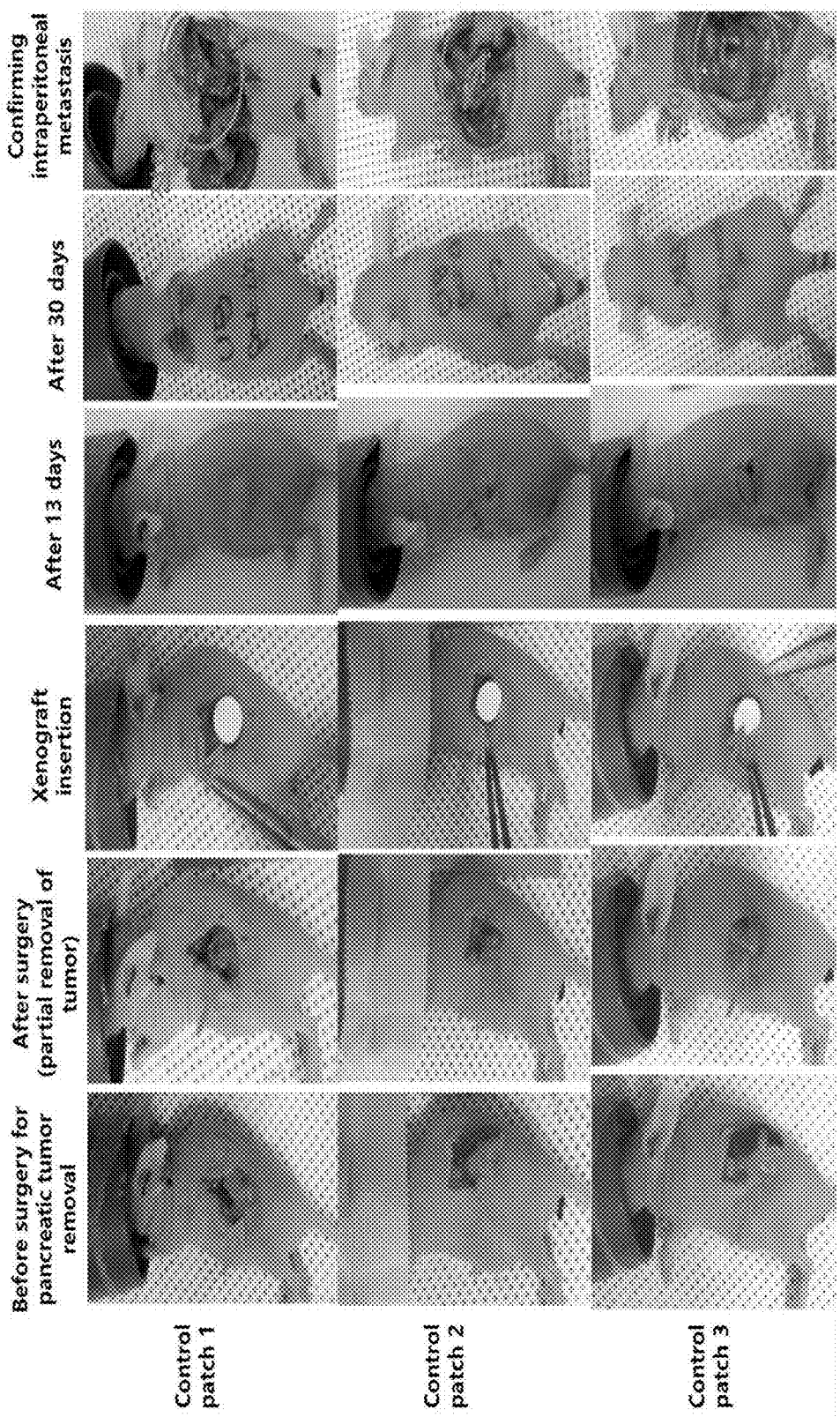
FIG. 23 shows results of metastasis in the liver, diaphragm and kidney 1 month after implantation of atelocollagen disk (control) into the Capan-1 pancreatic cancer mouse model.

After 1 month, the tumor size was monitored by MRI. After taking all images, the mice were euthanized using a CO2 chamber in an operation room. The intraperitoneal tumor metastasis was confirmed in each of the groups and each tumor tissue was obtained and fixed with 10% formalin. The tissue pathology was confirmed by immunostaining using H&E and the corresponding antibody. No metastasis occurred in the abdominal cavity with IO101L/AC disk inserted, whereas metastasis to the spleen and liver in the abdominal cavity was found in the atelocollagen disk (control) (see FIG. 22). Further, in the case of the atelocollagen disk (control), metastasis to the liver, diaphragm, kidney, etc. in the abdominal cavity was observed after 1 month (see FIG. 23).

Figure 24:
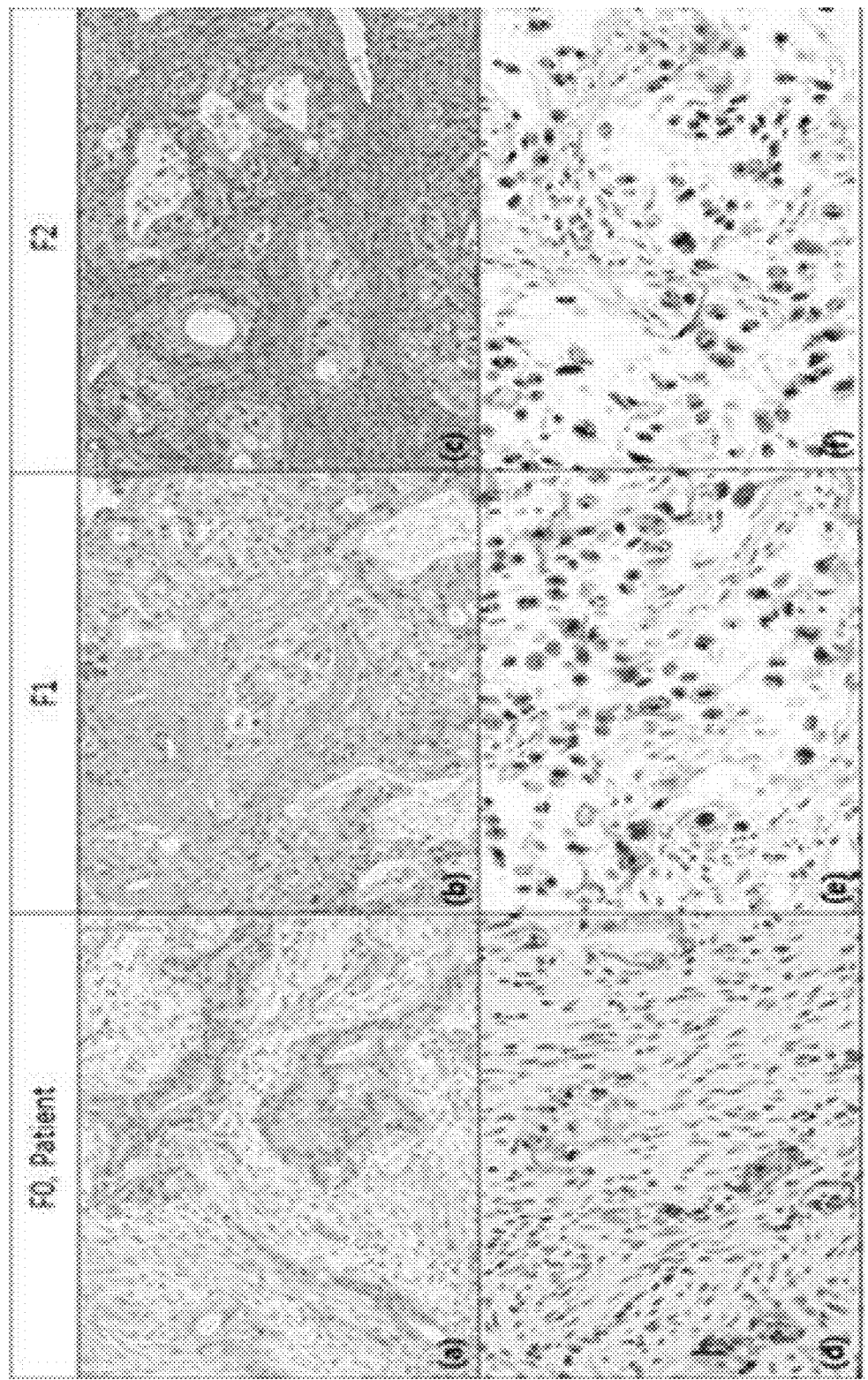
FIG. 24 shows histological similar characteristics of primary tumors as compared to a patient-derived xenograft (PDX) pancreatic cancer model using patient-derived pancreatic cancer cells.

8-7. Anticancer Efficacy in Patient-Derived Xenograft (PDX) Pancreatic Cancer Mouse Model Using Patient-Derived Pancreatic Cancer Cells 8-7-1. Construction of PDX Pancreatic Cancer Mouse Model Using Patient-Derived Pancreatic Cancer Cells A PDX model was successfully established using resected pancreatic cancer in a 65-year-old female patient who had laparoscopic pancreatic amniotic resection. A pathological examination revealed a ductal adenocarcinoma of the pancreas that has a size of 3.2 cm and shows frequent lymphatic infiltration. One metastatic lymph node was found among the searched seven lymph nodes (AJCC 8th T2N1M0, IIB). When comparing histological features of PDX and original primary tumors by H&E and nucleolin immunostaining, overall histological similarities were found between the primary tumor and the PDX tumor (see FIG. 24).

Male obese diabetes/severe combined immunodeficiency mice, NOD/Shi-scid, IL-2RγKO mice (NOG mice®) (Central Lab Animal Inc., Saeronbio Inc., Seoul) and female nu/nu athymic mice (Orientbio) were maintained in 12 hours light/12 hours dark cycle under pathogen-free conditions. At the time of surgery, 10 new pancreatic tumor specimens stored in the patient's primary tumor (Institutional Examination Committee No. 4-2017-0594) was placed on ice-cooled RPMI medium, PDX SOP of PDTX Cleanbench Department Laboratory Animal Resources (Yonsei Biomedical Research Institute, Seoul) was washed with cold PBS, and non-necrotic fragments were cut into small pieces (2×2×2 mm) to remove blood or lipid portions. Then, after Matrigel coating the above fragment on Petri-dish, a single piece was implanted into right and left sides of a 6-week-old mouse by a Precision Trochar 10 gauge (MP182, Innovative Research of America), followed by suturing with a 5-0 suture (VCP490G, ETHICON). When a size of the grown tumor reached 1500 mm, donor mouse (F1) tumors, and the same tumors and the remaining tumors were then stored as liquid N2 in frozen vials containing 5% dimethylsulfide/ 95% fetal bovine serum, which in turn were implanted in cohort mouse (F2). The subcutaneously grown tumor (1500 mm$^3$) was excised from F1 mouse and sub-passaged to the following passage cohort mouse (F2). About 150-200 mm$^3$ tumors from the same patient xenograft have took about 50 days to reach a palpable tumor in each of the compartments. A pair of primary tumors (F0) and F1 (passage 1) and F2 (passage 2) samples were used in 2 patients. When the tumor reached a touchable size (average size=266.5±58.0 mm$^3$), mice (n=8 to 13/n=4/patient) were randomly divided into five (5) groups: Group 1 (no treatment control); Group 2 in which gemcitabine (100 µg) suspended in PBS was administered intraperitoneally to mice once 4 weeks; Group 3 in which IO101 (100 µg) suspended in PBS was administered intraperitoneally to mice once 4 weeks; and Groups 4, 5 and 6 which were implanted in three types of patches. Untreated control mice were also included for comparison.

Figure 25:
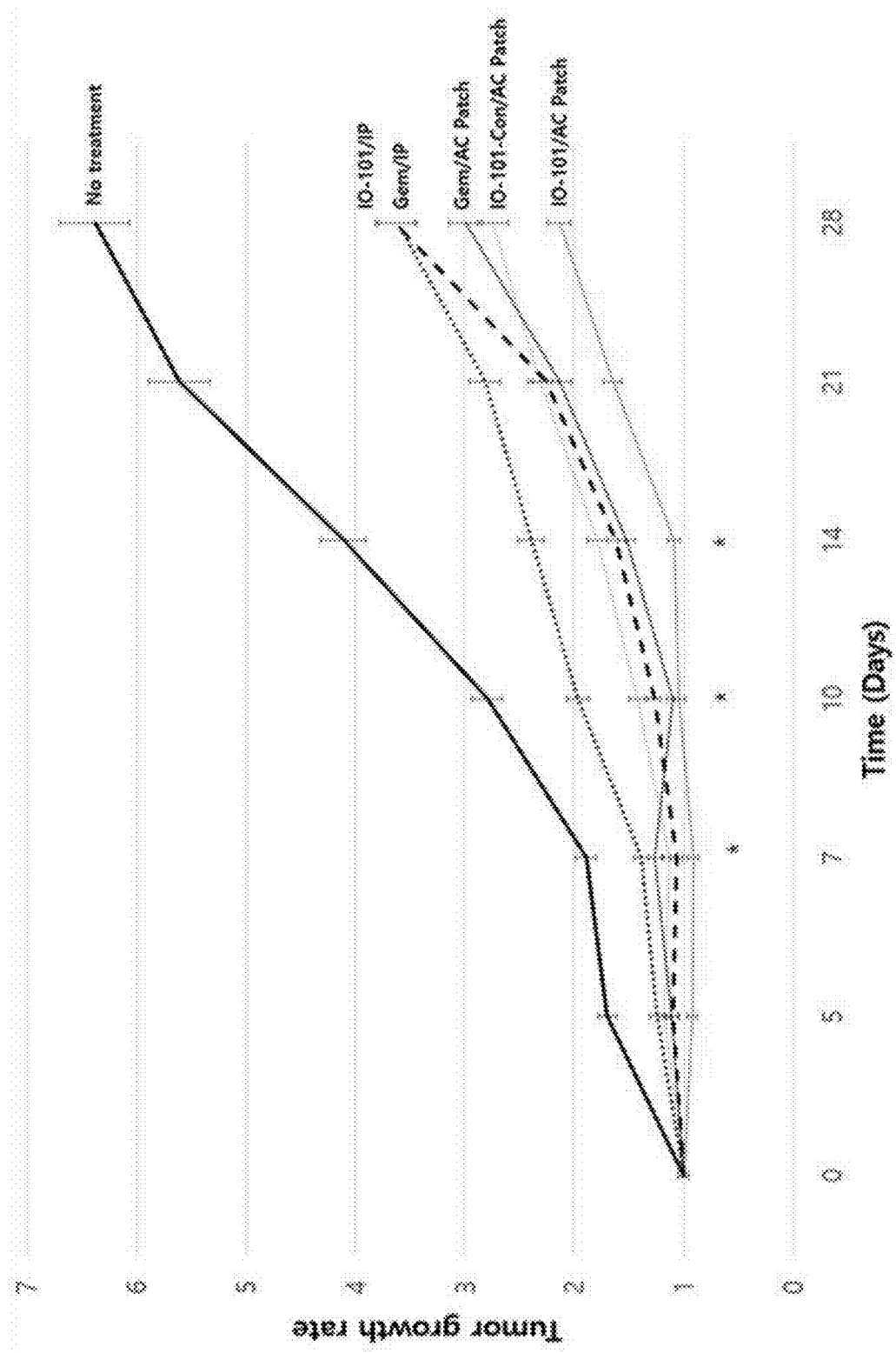
FIG. 25 shows tumor inhibitory effects after implantation of a control (No treatment), Gem-IP, IO101-IP, IO101/AC disk (2.0 mg/3.0%), IO101-Con/AC disk (2.0 mg/3.0%) and Gem/atelocollagen disk (0.12 mg/3.0%), respectively, in the PDX mouse model.

After transplanting the tumor tissue obtained from the patient having pancreatic cancer into an NSG (NOD/SCID/IL-2Rg KO) mouse, an animal model that has been successfully grown was subjected to multigenerational transplantation and individual augmentation through sphere cell formation so as to prepare a PDX model useable for evaluation of therapeutic effects. For subcutaneous infusion surgery without manipulation, tumor sizes, tumor markers (CA 19-9, CFB) and weights were determined 1 week after surgery, 2 weeks after surgery, 3 weeks after surgery, 4 weeks after surgery, 5 weeks after surgery, and 6 weeks after surgery, followed by performing histological examination and confirming survival.

in drug-treated animals was expressed as a tumor growth rate (tumor volume/initial tumor volume) compared to vehicle-treated mice. Statistical significance of data was calculated by means of IBM® SPPS® Statistics version 23. All results were expressed as means±standard deviation, Mann-Whitney U was applied to compare continuous variables according to different groups, and P values less than 0.05 were considered significant (see FIG. 25).

Figure 26:
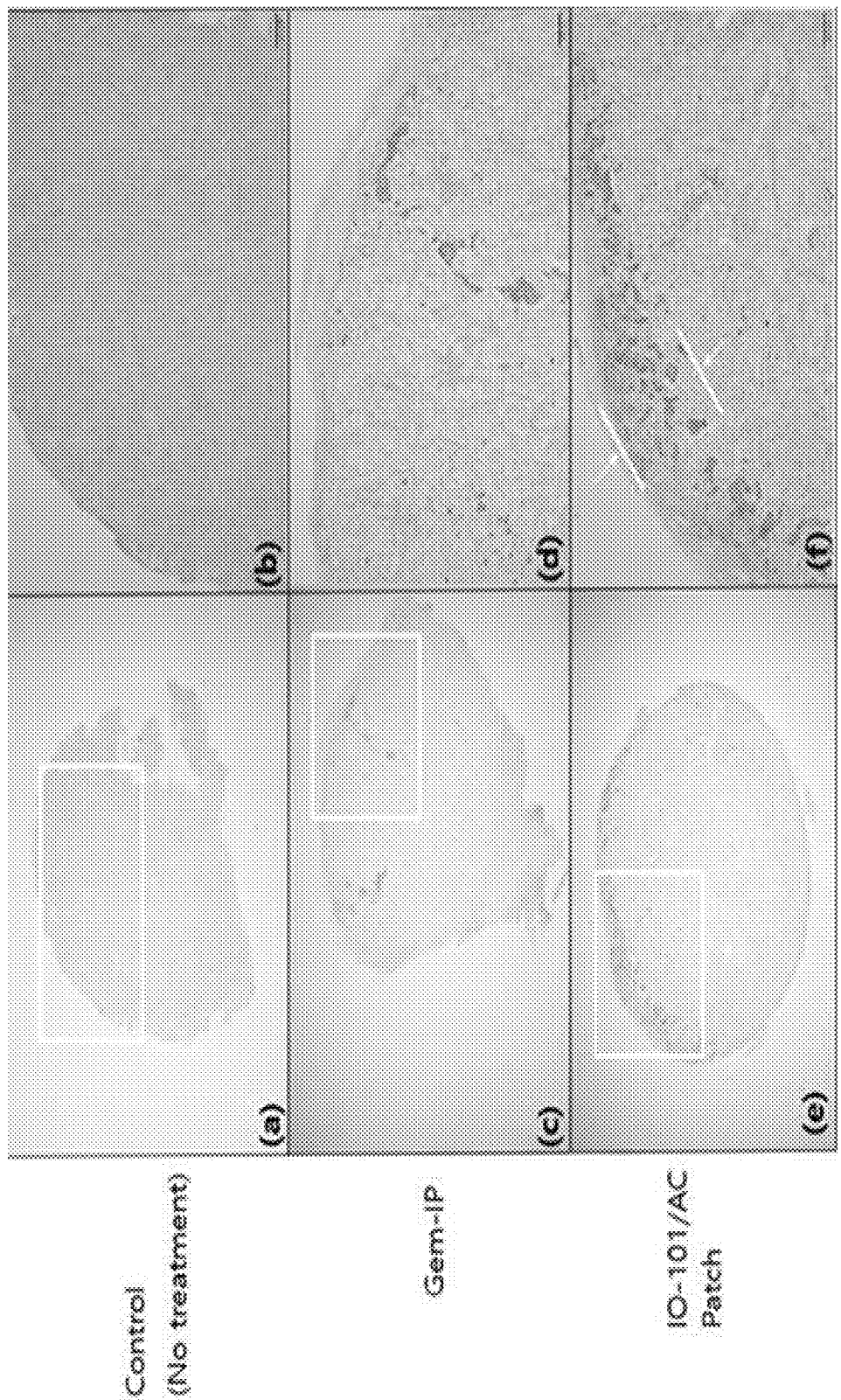
FIG. 26 shows results of apoptosis analysis through TUNEL staining in pancreatic cancer tumors.

1 month after the disk implantation, mice were sacrificed, and tissue samples and blood were collected. The extracted tumor was weighed on a balancer and recorded with a Nikon digital camera (Japan). For hematology measurement, blood samples were collected from BD Microtainer tubes containing K2E (K$^2$EDTA) for anticoagulant and toxicity testing in serum collecting BD Microtainer chemistry tube SST (BD, USA). The anti-cancer effect of IO101/AC disk was verified by TUNEL analysis. No tumor necrosis or cell death was found in the control. In the Gem-IP group, an apoptosis process was confirmed and TUNNEL-positive cancer cells in the tumor were found in the transplanted cancer tissues. On the other hand, the IO101/AC disk group showed a significant apoptosis process, but the TUNNEL-positive cancer cells along a surface layer of the tumor surface was found (see FIG. 26).

Figure 27:
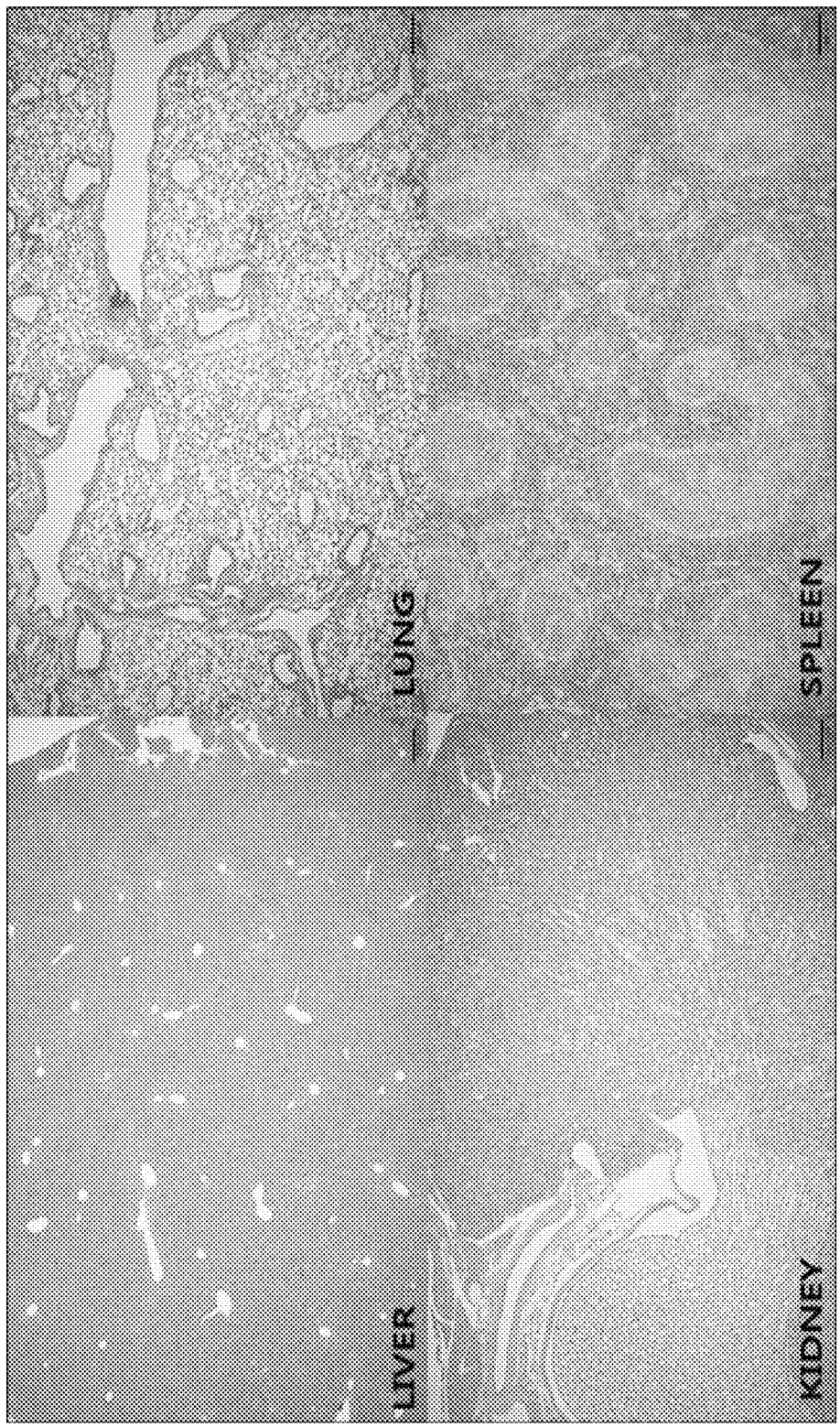
FIG. 27 shows results demonstrating that no side effect is involved in other organs after implantation of IO101/AC disk in the PDX model.

8-7-3. Assessment of Side Effects in Other Organs after Implantation of 10101 Disk in a PDX Pancreatic Cancer Mouse Model Using Patient-Derived Pancreatic Cancer Cells Microscopic examination confirmed that there was no evidence suggesting potential toxicity (such as inflammation or necrotic changes) in the liver, lung, kidney and spleen tissues (see FIG. 27). Leukopenia, anemia and neutropenia were not observed in the IO101/AC disk group. On the other hand, leukopenia (WBC) (3.2±2.9 vs 5.4±2.9, P=0.028), a low hemoglobin level (HB) (10.3±4.6 vs 18.5±11.9) and neutropenia (0.76±0.71 vs 2.69±2.66, p=0.010) in the IP-GEM group associated with systemic effects of gemcitabine were demonstrated. Table 15 below shows the blood test results.

TABLE 15

| Parameter (unit) | Control | IP-GEM | IO101/AC disk | p-value[1] | p-value[2] |
|---|---|---|---|---|---|
| WBC (X1000/µl) | 5.8 ± 2.5 | 3.2 ± 2.9 | 5.4 ± 2.9 | 0.679 | 0.028 |
| HB (g/dL) | 16.5 ± 1.3 | 10.3 ± 4.6 | 18.5 ± 11.9 | 0.768 | 0.010 |
| PLT (X1000/µl) | 1265.8 ± 477.5 | 684.1 ± 246.3 | 770.4 ± 284.1 | 0.040 | 0.447 |
| Neutrophil (X1000/µl) | 1.6 ± 0.9 | 0.76 ± 0.71 | 2.69 ± 2.66 | 0.594 | 0.010 |
| Lymphocyte (X1000/µl) | 3.6 ± 1.6 | 1.87 ± 1.74 | 7.97 ± 18.23 | 0.310 | 0.113 |

[1]Mann-Whitney U between Control and Patch I; [2]Mann-Whitney U between IP-GEM and Patch I)

8-7-2. Assessment of Tumor Inhibitory Effects in PDX Pancreatic Cancer Mouse Model Using Patient-Derived Pancreatic Cancer Cells of IO101/AC Disk After skin incision in PDX mice, the control (No treatment), Gem-IP (; sol-gel type), IO101-IP (; sol-gel type), IO101/AC disk (2.0 mg/3.0%), IO101-Con/AC (2.0 mg/3.0%) and Gem/atelocollagen disk (0.12 mg/3.0%), respectively, were implanted locally by subcutaneous anesthetic dissection between skin and tumor. A tumor size was measured three times per week by caliper measurement (Mitutoyo, Absolute AOS Digmatic, Kawasaki, Japan), and a volume was calculated as described above. Tumor growth Example 9. Screening for In Vitro Efficacy of Oligonucleotide Variants $(N)_x$-[TGG]$_4$[TTG][TGG]$_4$ or $_5$ ((N)$_x$-(SEQ ID NO: 10 or 11), [TGG]$_4$[TTG][TGG]$_4$ or $_5$-(N)$_x$, ((N)$_x$-(SEQ ID NO: 10 or 11)-(N)$_x$ and (N)$_x$-[TGG]$_4$[TTG][TGG]$_4$ $_{or\ 5}$-(N)$_y$, ((N)$_x$-(SEQ ID NO: 10 or 11)-(N)$_x$ were subjected to verification of cell proliferation inhibitory efficacy to BxPC3 (pancreatic cancer), MD-MBA 231 (breast cancer), Uuh-7 (liver cancer), HT29 (colon cancer) and Mv4-11 (AML) cell lines.

Figure 28:
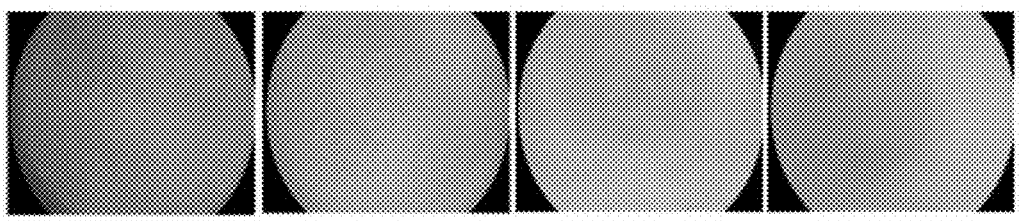
FIG. 28 shows results of cell proliferation suppression efficacy in regard to BxPC3 (pancreatic cancer), MD-MBA 231 (breast cancer), Uuh-7 (liver cancer), HT29 (colon cancer) and Mv4-11 (AML).
Figure 28:
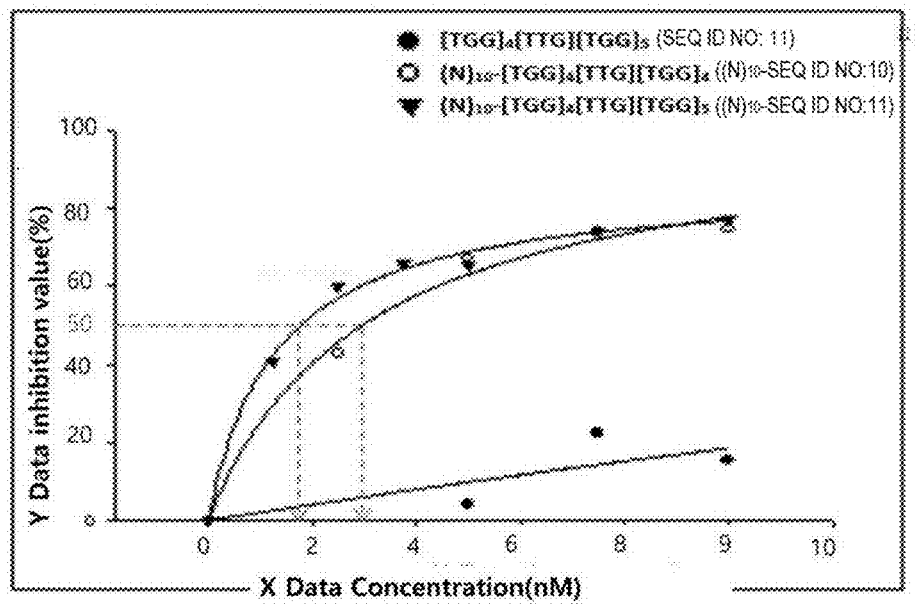
Figure 29:
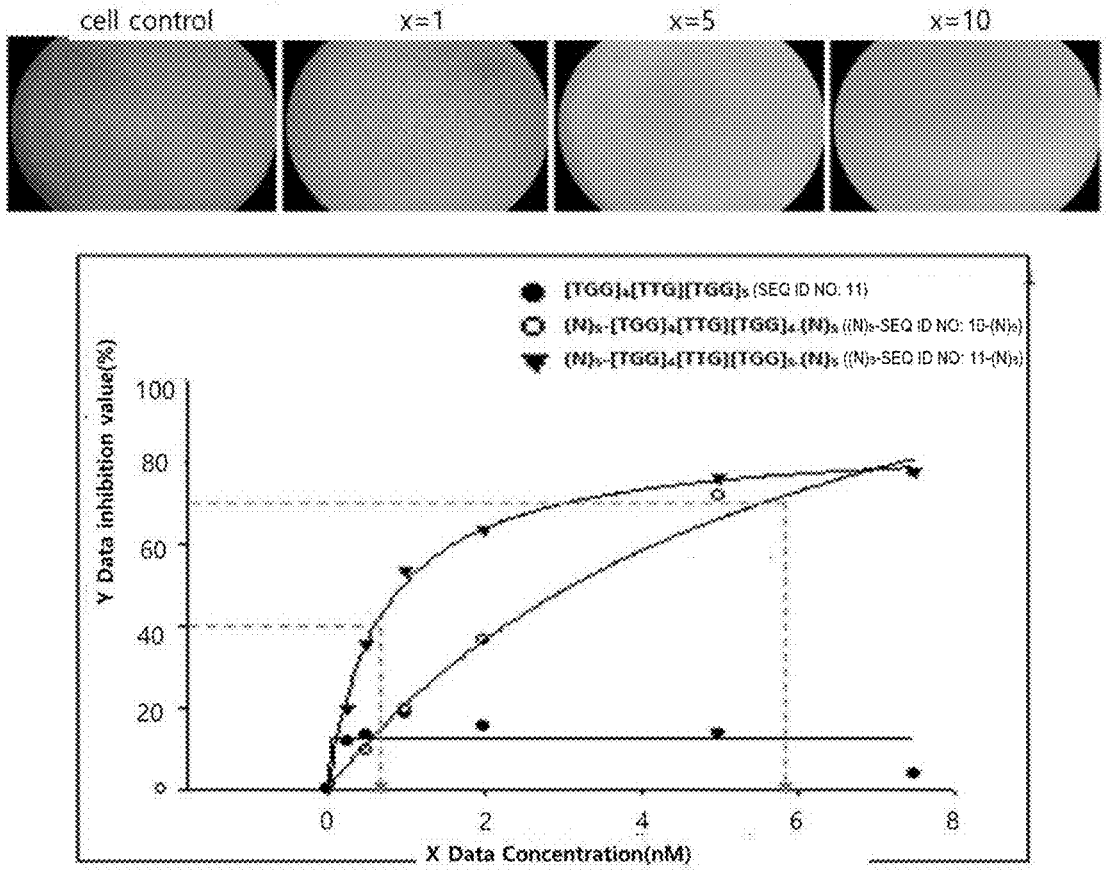
FIG. 29 shows results of cell proliferation suppression efficacy in regard to BxPC3 (pancreatic cancer), MD-MBA 231 (breast cancer), Uuh-7 (liver cancer), HT29 (colon cancer) and Mv4-11 (AML).

2.5 to 5.0×10$^5$ cells/well, which is the cell number defined by cell test to determine the appropriate cell concentration in the pancreatic cancer cell line B x PC3 cell (ATCC, IMDM+ 10% PBS), were seeded in a 96 well plate and incubated for one day. After heating each sample at 95° C. for 5 minutes, the temperature was slowly lowered to room temperature, and then the sample was treated immediately for each well by concentration. The treated BxPC3 cells were incubated in a 5% $CO_2$ incubator for 3 days, treated with 20 μL of reagent solution for MTT assay (Cell Proliferation KitII, Roche), and then incubated hourly (10 minutes, 30 minutes, 60 minutes), followed by measuring absorbance at 490 nm by a reader through ELISA (See FIGS. 28 and 29).

Cell proliferation inhibitory efficacy against other cell lines MD-MBA 231 (breast cancer), Uuh-7 (liver cancer), HT29 (colon cancer) and Mv4-11 (AML) was also verified in the same manner as described above. Cell viability for each cell line is listed in Table 16 below.

TABLE 16

| Type of modified nucleic acid (N) | Oligonucleotide variant $((N)_x-[TGG]_m[TTG][TGG]_n)$ | $IC_{50}$ (nM) Pancreatic cancer BxPC3 | Breast cancer MD-MB231 |
|---|---|---|---|
| 2',2'-difluorodeoxytidine | $(N)_1$-$[TGG]_4[TTG][TGG]_4$($(N)_1$-SEQ ID NO: 10) | 20 | 29 |
| | $(N)_2$-$[TGG]_4[TTG][TGG]_4$($(N)_2$-SEQ ID NO: 10) | 8.9 | 18 |
| | $(N)_3$-$[TGG]_4[TTG][TGG]_4$($(N)_3$-SEQ ID NO: 10) | 9.2 | 16 |
| | $(N)_4$-$[TGG]_4[TTG][TGG]_4$($(N)_4$-SEQ ID NO: 10) | 10 | 14 |
| | $(N)_5$-$[TGG]_4[TTG][TGG]_4$($(N)_5$-SEQ ID NO: 10) | 8.3 | 15 |
| | $(N)_1$-$[TGG]_4[TTG][TGG]_5$($(N)_1$-SEQ ID NO: 11) | 18 | 26 |
| | $(N)_2$-$[TGG]_4[TTG][TGG]_5$($(N)_2$-SEQ ID NO: 11) | 8.5 | 15 |
| | $(N)_3$-$[TGG]_4[TTG][TGG]_5$($(N)_3$-SEQ ID NO: 11) | 7.9 | 14 |
| | $(N)_4$-$[TGG]_4[TTG][TGG]_5$($(N)_4$-SEQ ID NO: 11) | 8.2 | 16 |
| | $(N)_5$-$[TGG]_4[TTG][TGG]_5$($(N)_5$-SEQ ID NO: 11) | 7.8 | 13 |
| | | Liver cancer Huh-7 | Colon cancer HT29 |
| 5-fluoro-deoxyuridine | $(N)_1$-$[TGG]_4[TTG][TGG]_4$($(N)_1$-SEQ ID NO: 10) | 932 | 848 |
| | $(N)_5$-$[TGG]_4[TTG][TGG]_4$($(N)_5$-SEQ ID NO: 10) | 397 | 483 |
| | $(N)_{10}$-$[TGG]_4[TTG][TGG]_4$($(N)_{10}$-SEQ ID NO: 10) | 3.0 | 48 |
| | $(N)_1$-$[TGG]_4[TTG][TGG]_5$($(N)_1$-SEQ ID NO: 11) | 889 | 784 |
| | $(N)_5$-$[TGG]_4[TTG][TGG]_5$($(N)_5$-SEQ ID NO: 11) | 354 | 383 |
| | $(N)_{10}$-$[TGG]_4[TTG][TGG]_5$($(N)_{10}$-SEQ ID NO: 11) | 1.3 | 39 |

TABLE 16-continued

| | | AML Mv4-11 |
|---|---|---|
| Cytosine arabinoside | $(N)_1$-[TGG]$_4$[TTG][TGG]$_4$((N)$_1$-SEQ ID NO: 10) | 92 |
| | $(N)_2$-[TGG]$_4$[TTG][TGG]$_4$((N)$_2$-SEQ ID NO: 10) | 39 |
| | $(N)_3$-[TGG]$_4$[TTG][TGG]$_4$((N)$_3$-SEQ ID NO: 10) | 29 |
| | $(N)_1$-[TGG]$_4$[TTG][TGG]$_5$((N)$_1$-SEQ ID NO: 11) | 89 |
| | $(N)_2$-[TGG]$_4$[TTG][TGG]$_5$((N)$_2$-SEQ ID NO: 11) | 35 |
| | $(N)_3$-[TGG]$_4$[TTG][TGG]$_5$((N)$_3$-SEQ ID NO: 11) | 26 |

| Type of modified nucleic acid (N) | Oligonucleotide variant ([TGG]$_m$[TTG][TGG]$_n$-(N)$_x$) | Pancreatic cancer BxPC3 | Breast cancer MD-MB231 |
|---|---|---|---|
| 2',2'-difluorodeoxytidine | [TGG]$_4$[TTG][TGG]$_4$-(N)$_1$((N)$_1$-SEQ ID NO: 10) | 42 | 58 |
| | [TGG]$_4$[TTG][TGG]$_4$-(N)$_2$((N)$_2$-SEQ ID NO: 10) | 17 | 37 |
| | [TGG]$_4$[TTG][TGG]$_4$-(N)$_3$((N)$_3$-SEQ ID NO: 10) | 18 | 33 |
| | [TGG]$_4$[TTG][TGG]$_4$-(N)$_4$((N)$_4$-SEQ ID NO: 10) | 20 | 29 |
| | [TGG]$_4$[TTG][TGG]$_4$-(N)$_5$((N)$_5$-SEQ ID NO: 10) | 16 | 33 |
| | [TGG]$_4$[TTG][TGG]$_5$-(N)$_1$((N)$_1$-SEQ ID NO: 11) | 38 | 40 |
| | [TGG]$_4$[TTG][TGG]$_5$-(N)$_2$((N)$_2$-SEQ ID NO: 11) | 19 | 21 |
| | [TGG]$_4$[TTG][TGG]$_5$-(N)$_3$((N)$_3$-SEQ ID NO: 11) | 18 | 16 |
| | [TGG]$_4$[TTG][TGG]$_5$-(N)$_4$((N)$_4$-SEQ ID NO: 11) | 17 | 18 |
| | [TGG]$_4$[TTG][TGG]$_5$-(N)$_5$((N)$_5$-SEQ ID NO: 11) | 15 | 17 |

| | | Liver cancer Huh-7 | Colon cancer HT29 |
|---|---|---|---|
| 5-fluoro-deoxyuridine | [TGG]$_4$[TTG][TGG]$_4$-(N)$_1$((N)$_1$-SEQ ID NO: 10) | 1098 | 1240 |
| | [TGG]$_4$[TTG][TGG]$_4$-(N)$_5$((N)$_5$-SEQ ID NO: 10) | 609 | 560 |
| | [TGG]$_4$[TTG][TGG]$_4$-(N)$_{10}$((N)$_{10}$-SEQ ID NO: 10) | 119 | 109 |
| | [TGG]$_4$[TTG][TGG]$_5$-(N)$_1$((N)$_1$-SEQ ID NO: 11) | 1310 | 1290 |
| | [TGG]$_4$[TTG][TGG]$_5$-(N)$_5$((N)$_5$-SEQ ID NO: 11) | 789 | 592 |
| | [TGG]$_4$[TTG][TGG]$_5$-(N)$_{10}$((N)$_{10}$-SEQ ID NO: 11) | 58 | 106 |

| | | AML Mv4-11 |
|---|---|---|
| Cytosine arabinoside | [TGG]$_4$[TTG][TGG]$_4$-(N)$_1$((N)$_1$-SEQ ID NO: 10) | 132 |
| | [TGG]$_4$[TTG][TGG]$_4$-(N)$_2$((N)$_2$-SEQ ID NO: 10) | 49 |
| | [TGG]$_4$[TTG][TGG]$_4$-(N)$_3$((N)$_3$-SEQ ID NO: 10) | 39 |
| | [TGG]$_4$[TTG][TGG]$_5$-(N)$_1$((N)$_1$-SEQ ID NO: 11) | 109 |
| | [TGG]$_4$[TTG][TGG]$_5$- | 45 |

TABLE 16-continued

| | (N)$_2$((N)$_2$-SEQ ID NO: 11) [TGG]$_4$[TTG][TGG]$_5$- (N)$_3$((N)$_3$-SEQ ID NO: 11) | 29 | |
|---|---|---|---|
| Type of modified nucleic acid (N) | Oligonucleotide variant ((N)$_x$-[TGG]$_m$[TTG][TGG]$_n$-(N)$_y$) | Pancreatic cancer BxPC3 | Breast cancer MD-MB231 |
| 2',2'-difluorodeoxytidine | (N)$_1$-[TGG]$_4$[TTG][TGG]$_4$-(N)$_1$((N)$_1$-SEQ ID NO: 10) | 40 | 69 |
| | (N)$_3$-[TGG]$_4$[TTG][TGG]$_4$-(N)$_3$((N)$_3$-SEQ ID NO: 10) | 18 | 43 |
| | (N)$_5$-[TGG]$_4$[TTG][TGG]$_4$-(N)$_5$((N)$_5$-SEQ ID NO: 10) | 19 | 38 |
| | (N)$_1$-[TGG]$_4$[TTG][TGG]$_5$-(N)$_1$((N)$_1$-SEQ ID NO: 11) | 59 | 87 |
| | (N)$_3$-[TGG]$_4$[TTG][TGG]$_5$-(N)$_3$((N)$_3$-SEQ ID NO: 11) | 24 | 36 |
| | (N)$_5$-[TGG]$_4$[TTG][TGG]$_5$-(N)$_5$((N)$_5$-SEQ ID NO: 11) | 38 | 27 |
| | | Liver cancer Huh-7 | Colon cancer HT29 |
| 5-fluoro-deoxyuridine | (N)$_1$-[TGG]$_4$[TTG][TGG]$_4$-(N)$_1$((N)$_1$-SEQ ID NO: 10) | 873 | 1090 |
| | (N)$_3$-[TGG]$_4$[TTG][TGG]$_4$-(N)$_3$((N)$_3$-SEQ ID NO: 10) | 490 | 549 |
| | (N)$_5$-[TGG]$_4$[TTG][TGG]$_4$-(N)$_5$((N)$_5$-SEQ ID NO: 10) | 6.0 | 84 |
| | (N)$_1$-[TGG]$_4$[TTG][TGG]$_5$-(N)$_1$((N)$_1$-SEQ ID NO: 11) | 908 | 982 |
| | (N)$_3$-[TGG]$_4$[TTG][TGG]$_5$-(N)$_3$((N)$_3$-SEQ ID NO: 11) | 482 | 507 |
| | (N)$_5$-[TGG]$_4$[TTG][TGG]$_5$-(N)$_5$((N)$_5$-SEQ ID NO: 11) | 1.0 | 89 |
| | | AML Mv4-11 | |
| Cytosine arabinoside | (N)$_1$-[TGG]$_4$[TTG][TGG]$_4$-(N)$_1$((N)$_1$-SEQ ID NO: 10) | 102 | |
| | (N)$_3$-[TGG]$_4$[TTG][TGG]$_4$-(N)$_3$((N)$_3$-SEQ ID NO: 10) | 34 | |
| | (N)$_5$-[TGG]$_4$[TTG][TGG]$_4$-(N)$_5$((N)$_5$-SEQ ID NO: 10) | 27 | |
| | (N)$_1$-[TGG]$_4$[TTG][TGG]$_5$-(N)$_1$((N)$_1$-SEQ ID NO: 11) | 99 | |
| | (N)$_3$-[TGG]$_4$[TTG][TGG]$_5$-(N)$_3$((N)$_3$-SEQ ID NO: 11) | 35 | |
| | (N)$_5$-[TGG]$_4$[TTG][TGG]$_5$-(N)$_5$((N)$_5$-SEQ ID NO: 11) | 19 | |

A sequence listing electronically submitted with the present application on Apr. 19, 2021 as an ASCII text file named 20210419_Q48921LC05_TU_SEQ, created on Apr. 8, 2021 and having a size of 6,000 bytes, is incorporated herein by reference in its entirety.

What is claimed is:

1. An oligonucleotide variant having a structure of Formula 1 below:

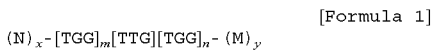

wherein, N and M are independently deoxyuridine (dU), deoxycytidine (dC), uridine (U), or cytidine (C), in which a halogen or hydroxy group is bound to 5- or 2'-position thereof; x and y are independently integers of 0 to 10 with a proviso that x and y are not simultaneously 0, n is an integer of 4 to 6; and m is an integer of 4 to 6.

2. The oligonucleotide variant according to claim 1, wherein N and M are independently selected from the group consisting of 5-fluorodeoxyuridine, 5-fluorouridine, 5-fluorodeoxycytidine, 5-fluorocytidine, 5-iododeoxyuridine, 5-iodouridine, 5-iododeoxycytidine, 5-iodocytidine, cytosine arabinoside, 2',2'-difluorodeoxycytidine, capecitabine and bromovinyldeoxyuridine.

3. The oligonucleotide variant according to claim 1, wherein the structure of Formula 1 is any one of the following Formula 11 to Formula 34:

$(N)_2$-$[TGG]_4[TTG][TGG]_4$ ($(N)_2$-SEQ ID NO: 10)   [Formula 11]

$(N)_2$-$[TGG]_4[TTG][TGG]_5$ ($(N)_2$-SEQ ID NO: 11)   [Formula 12]

$(N)_2$-$[TGG]_5[TTG][TGG]_4$ ($(N)_2$-SEQ ID NO: 12)   [Formula 13]

$(N)_2$-$[TGG]_5[TTG][TGG]_5$ ($(N)_2$-SEQ ID NO: 13)   [Formula 14]

$(N)_2$-$[TGG]_5[TTG][TGG]_6$ ($(N)_2$-SEQ ID NO: 14)   [Formula 15]

$(N)_2$-$[TGG]_6[TTG][TGG]_5$ ($(N)_2$-SEQ ID NO: 15)   [Formula 16]

$(N)_2$-$[TGG]_6[TTG][TGG]_6$ ($(N)_2$-SEQ ID NO: 16)   [Formula 17]

$[TGG]_4[TTG][TGG]_4$-$(M)_1$ (SEQ ID NO: 10-$(M)_1$)   [Formula 18]

$[TGG]_4[TTG][TGG]_4$-$(M)_2$ (SEQ ID NO: 10-$(M)_2$)   [Formula 19]

$[TGG]_4[TTG][TGG]_4$-$(M)_3$ (SEQ ID NO: 10-$(M)_3$)   [Formula 20]

$[TGG]_4[TTG][TGG]_4$-$(M)_4$ (SEQ ID NO: 10-$(M)_4$)   [Formula 21]

$[TGG]_4[TTG][TGG]_4$-$(M)_5$ (SEQ ID NO: 10-$(M)_5$)   [Formula 22]

$[TGG]_4[TTG][TGG]_5$-$(M)_1$ (SEQ ID NO: 11-$(M)_1$)   [Formula 23]

$[TGG]_4[TTG][TGG]_5$-$(M)_2$ (SEQ ID NO: 11-$(M)_2$)   [Formula 24]

$[TGG]_4[TTG][TGG]_5$-$(M)_3$ (SEQ ID NO: 11-$(M)_3$)   [Formula 25]

$[TGG]_4[TTG][TGG]_5$-$(M)_4$ (SEQ ID NO: 11-$(M)_4$)   [Formula 26]

$[TGG]_4[TTG][TGG]_5$-$(M)_5$ (SEQ ID NO: 11-$(M)_5$)   [Formula 27]

$[TGG]_4[TTG][TGG]_4$-$(M)_{10}$ (SEQ ID NO: 10)-$(M)_{10}$)   [Formula 28]

$(N)_1$-$[TGG]_4[TTG][TGG]_4$-$(M)_1$ ($(N)_1$-SEQ ID NO: 10-$(M)_1$)   [Formula 29]

$(N)_3$-$[TGG]_4[TTG][TGG]_4$-$(M)_3$, ($(N)_3$-SEQ ID NO: 10-$(M)_3$)   [Formula 30]

$(N)_5$-$[TGG]_4[TTG][TGG]_4$-$(M)_5$ ($(N)_5$-SEQ ID NO: 10-$(M)_5$)   [Formula 31]

$(N)_1$-$[TGG]_4[TTG][TGG]_5$-$(M)_1$ ($(N)_1$-SEQ ID NO: 11-$(M)_1$)   [Formula 32]

-continued

[Formula 33]

(N)$_3$-[TGG]$_4$[TTG][TGG]$_5$-(M)$_3$ ((N)$_3$-SEQ ID NO: 11-(M)$_3$)

[Formula 34]

(N)$_5$-[TGG]$_4$[TTG][TGG]$_5$-(M)$_5$ ((N)$_5$-SEQ ID NO: 11-(M)$_5$).

4. The oligonucleotide variant according to claim 1, wherein n is an integer of 4 to 5, and m is an integer of 4 to 5.

5. The oligonucleotide variant according to claim 1, wherein x and y are independently an integer of 0 to 5 (except for the case where x and y are simultaneously 0).

6. A method for treating cancer, the method comprising administering to a subject in need thereof a composition comprising the oligonucleotide variant of claim 1.

7. The method of claim 6, wherein the cancer is selected from the group consisting of leukemia, lymphoma, breast cancer, liver cancer, stomach cancer, ovarian carcinoma, cervical carcinoma, glioma cancer, colon cancer, lung cancer, pancreatic cancer, prostate cancer, gastric cancer, uterine cancer, bladder cancer, thyroid cancer, ovarian cancer, melanoma and cervical cancer.

8. The method of claim 6, wherein the composition is an atelocollagen dispersion formulation.

9. The method of claim 8, wherein the atelocollagen dispersion contains 0.5 to 5.5 g of atelocollagen per 100 ml of phosphate buffered saline (PBS) solution.

10. The method of claim 6, wherein the composition is in a form of a sol-gel or a patch.

11. The method of claim 8, wherein the atelocollagen is prepared by a process comprising: a) treating a collagen-containing animal tissue with at least one of alkalase, catalase, pepsin and papain to extract a material; b) firstly filtering the extracted material and salting it out by adding a neutral salt to the obtained filtrate, followed by performing second filtration; c) dissolving collagen salts obtained by the second filtration to adsorb fat, followed by performing third filtration; d) lyophilizing the obtained filtrate after the third filtration and recovering lyophilized powder; and e) dissolving and concentrating the lyophilized powder in diluted hydrochloric acid (dil-HCl), diluted acetic acid or phosphate buffer at pH 4 to pH 8 to prepare an atelocollagen solution, injecting the prepared atelocollagen solution in 5 to 20% by volume of a column bed volume into a column filled with polymer beads, and developing the same in diluted hydrochloric acid, diluted acetic acid or phosphate buffer at pH 4 to pH 8 thus to recover atelocollagen.

* * * * *

SEQUENCE LISTING

<160> NUMBER OF SEQ IDS NOS: 29

<210> SEQ ID NO 1
<211> LENGTH: 29
<212> TYPE: DNA
<213> ORGANISM: Artificial Sequence
<220> FEATURE:
<223> OTHER INFORMATION: oligo_1

<400> SEQUENCE: 1
ggtggtggtg gttgtggtgg tggtggtgg                                     29

<210> SEQ ID NO 2
<211> LENGTH: 12
<212> TYPE: DNA
<213> ORGANISM: Artificial Sequence
<220> FEATURE:
<223> OTHER INFORMATION: oligo_2

<400> SEQUENCE: 2
tggttgtggt gg                                                            12

<210> SEQ ID NO 3
<211> LENGTH: 12
<212> TYPE: DNA
<213> ORGANISM: Artificial Sequence
<220> FEATURE:
<223> OTHER INFORMATION: oligo_3

<400> SEQUENCE: 3
tggtggttgt gg                                                            12

<210> SEQ ID NO 4
<211> LENGTH: 15
<212> TYPE: DNA
<213> ORGANISM: Artificial Sequence
<220> FEATURE:
<223> OTHER INFORMATION: oligo_4

<400> SEQUENCE: 4
tggtggttgt ggtgg                                                         15

<210> SEQ ID NO 5
<211> LENGTH: 18
<212> TYPE: DNA
<213> ORGANISM: Artificial Sequence
<220> FEATURE:
<223> OTHER INFORMATION: oligo_5

<400> SEQUENCE: 5
tggtggttgt ggtggtgg                                                      18

<210> SEQ ID NO 6
<211> LENGTH: 18
<212> TYPE: DNA
<213> ORGANISM: Artificial Sequence
<220> FEATURE:
<223> OTHER INFORMATION: oligo_6

<400> SEQUENCE: 6
tggtggtggt tgtggtgg                                                      18

<210> SEQ ID NO 7
<211> LENGTH: 21
<212> TYPE: DNA
<213> ORGANISM: Artificial Sequence
<220> FEATURE:
<223> OTHER INFORMATION: oligo_7

<400> SEQUENCE: 7
tggtggtggt tgtggtggtg g                                                  21

<210> SEQ ID NO 8
<211> LENGTH: 24
<212> TYPE: DNA
<213> ORGANISM: Artificial Sequence
<220> FEATURE:

```
<223> OTHER INFORMATION: oligo_8

<400> SEQUENCE: 8
tggtggtggt tgtggtggtg gtgg                                              24

<210> SEQ ID NO 9
<211> LENGTH: 24
<212> TYPE: DNA
<213> ORGANISM: Artificial Sequence
<220> FEATURE:
<223> OTHER INFORMATION: oligo_9

<400> SEQUENCE: 9
tggtggtggt ggttgtggtg gtgg                                              24

<210> SEQ ID NO 10
<211> LENGTH: 27
<212> TYPE: DNA
<213> ORGANISM: Artificial Sequence
<220> FEATURE:
<223> OTHER INFORMATION: oligo_10

<400> SEQUENCE: 10
tggtggtggt ggttgtggtg gtggtgg                                           27

<210> SEQ ID NO 11
<211> LENGTH: 30
<212> TYPE: DNA
<213> ORGANISM: Artificial Sequence
<220> FEATURE:
<223> OTHER INFORMATION: oligo_11

<400> SEQUENCE: 11
tggtggtggt ggttgtggtg gtggtggtgg                                        30

<210> SEQ ID NO 12
<211> LENGTH: 30
<212> TYPE: DNA
<213> ORGANISM: Artificial Sequence
<220> FEATURE:
<223> OTHER INFORMATION: oligo_12

<400> SEQUENCE: 12
tggtggtggt ggtggttgtg gtggtggtgg                                        30

<210> SEQ ID NO 13
<211> LENGTH: 33
<212> TYPE: DNA
<213> ORGANISM: Artificial Sequence
<220> FEATURE:
<223> OTHER INFORMATION: oligo_13

<400> SEQUENCE: 13
tggtggtggt ggtggttgtg gtggtggtgg tgg                                    33

<210> SEQ ID NO 14
<211> LENGTH: 36
<212> TYPE: DNA
<213> ORGANISM: Artificial Sequence
<220> FEATURE:
<223> OTHER INFORMATION: oligo_14

<400> SEQUENCE: 14
tggtggtggt ggtggttgtg gtggtggtgg tggtgg                                 36
```

```
<210> SEQ ID NO 15
<211> LENGTH: 36
<212> TYPE: DNA
<213> ORGANISM: Artificial Sequence
<220> FEATURE:
<223> OTHER INFORMATION: oligo_15

<400> SEQUENCE: 15
tggtggtggt ggtggtggtt gtggtggtgg tggtgg                          36

<210> SEQ ID NO 16
<211> LENGTH: 39
<212> TYPE: DNA
<213> ORGANISM: Artificial Sequence
<220> FEATURE:
<223> OTHER INFORMATION: oligo_16

<400> SEQUENCE: 16
tggtggtggt ggtggtggtt gtggtggtgg tggtggtgg                       39

<210> SEQ ID NO 17
<211> LENGTH: 42
<212> TYPE: DNA
<213> ORGANISM: Artificial Sequence
<220> FEATURE:
<223> OTHER INFORMATION: oligo_17

<400> SEQUENCE: 17
tggtggtggt ggtggtggtt gtggtggtgg tggtggtggt gg                   42

<210> SEQ ID NO 18
<211> LENGTH: 42
<212> TYPE: DNA
<213> ORGANISM: Artificial Sequence
<220> FEATURE:
<223> OTHER INFORMATION: oligo_18

<400> SEQUENCE: 18
tggtggtggt ggtggtggtg gttgtggtgg tggtggtggt gg                   42

<210> SEQ ID NO 19
<211> LENGTH: 45
<212> TYPE: DNA
<213> ORGANISM: Artificial Sequence
<220> FEATURE:
<223> OTHER INFORMATION: oligo_19

<400> SEQUENCE: 19
tggtggtggt ggtggtggtg gttgtggtgg tggtggtggt ggtgg                45

<210> SEQ ID NO 20
<211> LENGTH: 48
<212> TYPE: DNA
<213> ORGANISM: Artificial Sequence
<220> FEATURE:
<223> OTHER INFORMATION: oligo_20

<400> SEQUENCE: 20
tggtggtggt ggtggtggtg gttgtggtgg tggtggtggt ggtggtgg             48

<210> SEQ ID NO 21
<211> LENGTH: 48
<212> TYPE: DNA
<213> ORGANISM: Artificial Sequence
<220> FEATURE:
<223> OTHER INFORMATION: oligo_21
```

```
<400> SEQUENCE: 21
tggtggtggt ggtggtggtg gtggttgtgg tggtggtggt ggtggtgg                    48

<210> SEQ ID NO 22
<211> LENGTH: 51
<212> TYPE: DNA
<213> ORGANISM: Artificial Sequence
<220> FEATURE:
<223> OTHER INFORMATION: oligo_22

<400> SEQUENCE: 22
tggtggtggt ggtggtggtg gtggttgtgg tggtggtggt ggtggtggtg g                51

<210> SEQ ID NO 23
<211> LENGTH: 54
<212> TYPE: DNA
<213> ORGANISM: Artificial Sequence
<220> FEATURE:
<223> OTHER INFORMATION: oligo_23

<400> SEQUENCE: 23
tggtggtggt ggtggtggtg gtggttgtgg tggtggtggt ggtggtggtg gtgg             54

<210> SEQ ID NO 24
<211> LENGTH: 54
<212> TYPE: DNA
<213> ORGANISM: Artificial Sequence
<220> FEATURE:
<223> OTHER INFORMATION: oligo_24

<400> SEQUENCE: 24
tggtggtggt ggtggtggtg gtggtggttg tggtggtggt ggtggtggtg gtgg             54

<210> SEQ ID NO 25
<211> LENGTH: 57
<212> TYPE: DNA
<213> ORGANISM: Artificial Sequence
<220> FEATURE:
<223> OTHER INFORMATION: oligo_25

<400> SEQUENCE: 25
tggtggtggt ggtggtggtg gtggtggttg tggtggtggt ggtggtggtg gtggtgg          57

<210> SEQ ID NO 26
<211> LENGTH: 60
<212> TYPE: DNA
<213> ORGANISM: Artificial Sequence
<220> FEATURE:
<223> OTHER INFORMATION: oligo_26

<400> SEQUENCE: 26
tggtggtggt ggtggtggtg gtggtggttg tggtggtggt ggtggtggtg gtggtggtgg       60

<210> SEQ ID NO 27
<211> LENGTH: 60
<212> TYPE: DNA
<213> ORGANISM: Artificial Sequence
<220> FEATURE:
<223> OTHER INFORMATION: oligo_27

<400> SEQUENCE: 27
tggtggtggt ggtggtggtg gtggtggtgg ttgtggtggt ggtggtggtg gtggtggtgg       60

<210> SEQ ID NO 28
<211> LENGTH: 63
```

```
<212> TYPE: DNA
<213> ORGANISM: Artificial Sequence
<220> FEATURE:
<223> OTHER INFORMATION: oligo_28

<400> SEQUENCE: 28
tggtggtggt ggtggtggtg gtggtggtgg ttgtggtggt ggtggtggtg gtggtggtgg   60
tgg                                                                 63

<210> SEQ ID NO 29
<211> LENGTH: 29
<212> TYPE: DNA
<213> ORGANISM: Artificial Sequence
<220> FEATURE:
<223> OTHER INFORMATION: oligo_29

<400> SEQUENCE: 29
cctcctcctc cttctcctcc tcctcctcc                                     29
```